(12) United States Patent
Clough

(10) Patent No.: US 7,364,239 B2
(45) Date of Patent: *Apr. 29, 2008

(54) SEAT HEADREST

(76) Inventor: Robert Clough, 28846 Shadyview Way, Santa Clarita, CA (US) 91351

( * ) Notice: Subject to any disclaimer, the term of this patent is extended or adjusted under 35 U.S.C. 154(b) by 490 days.

This patent is subject to a terminal disclaimer.

(21) Appl. No.: 10/856,232

(22) Filed: May 27, 2004

(65) Prior Publication Data

US 2004/0217639 A1 Nov. 4, 2004

Related U.S. Application Data

(63) Continuation-in-part of application No. 10/744,808, filed on Dec. 22, 2003, now Pat. No. 7,040,705, which is a continuation-in-part of application No. 10/172,477, filed on Jun. 14, 2002, now Pat. No. 6,666,517, which is a continuation-in-part of application No. 09/886,924, filed on Jun. 20, 2001, now Pat. No. 6,467,846, which is a continuation-in-part of application No. 09/665,992, filed on Sep. 20, 2000, now Pat. No. 6,250,716.

(51) Int. Cl.
*A47C 7/38* (2006.01)

(52) U.S. Cl. .................... 297/391; 297/408; 297/410

(58) Field of Classification Search ................ 297/391, 297/410, 353, 408; 16/342
See application file for complete search history.

(56) References Cited

U.S. PATENT DOCUMENTS

| | | | | |
|---|---|---|---|---|
| 2,462,304 A | * | 2/1949 | Burdick | 296/97.12 |
| 2,464,435 A | * | 3/1949 | Conradt | 297/397 |
| 5,079,799 A | * | 1/1992 | Rude et al. | 16/342 |
| 5,586,810 A | * | 12/1996 | Liu | 297/406 |
| 5,697,125 A | * | 12/1997 | Gannon | 16/342 |
| 6,305,749 B1 | * | 10/2001 | O'Connor et al. | 297/397 |
| 6,725,994 B2 | * | 4/2004 | Bacon | 16/342 |
| D498,097 S | * | 11/2004 | Schwyzer | D6/501 |

* cited by examiner

*Primary Examiner*—Peter R. Brown

(57) ABSTRACT

An adjustable headrest that provides both support and comfort to the user and one that can be used in connection with various types of passenger vehicles. The headrest includes slide means for permitting easy height adjustment of the headrest and also includes means for adjusting the headrest forwardly and rearwardly. Further, the headrest includes easily adjustable, wing-like, side-support members that are pivotally connected to a centrally located, vertically adjustable head support member by means of specially designed hinges.

11 Claims, 45 Drawing Sheets

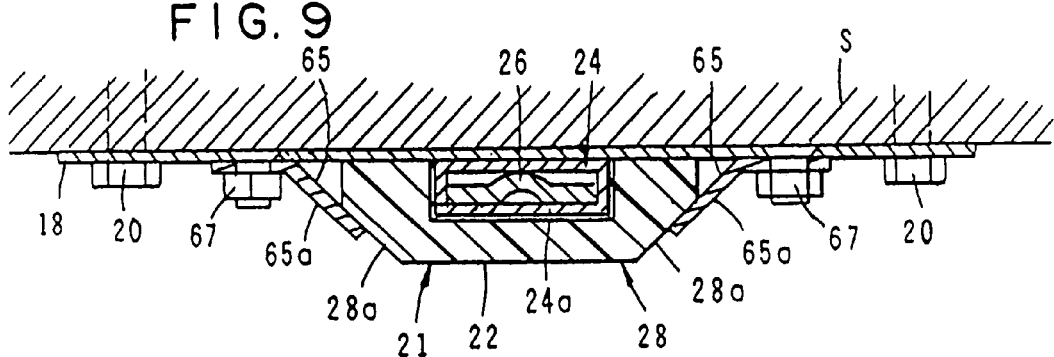
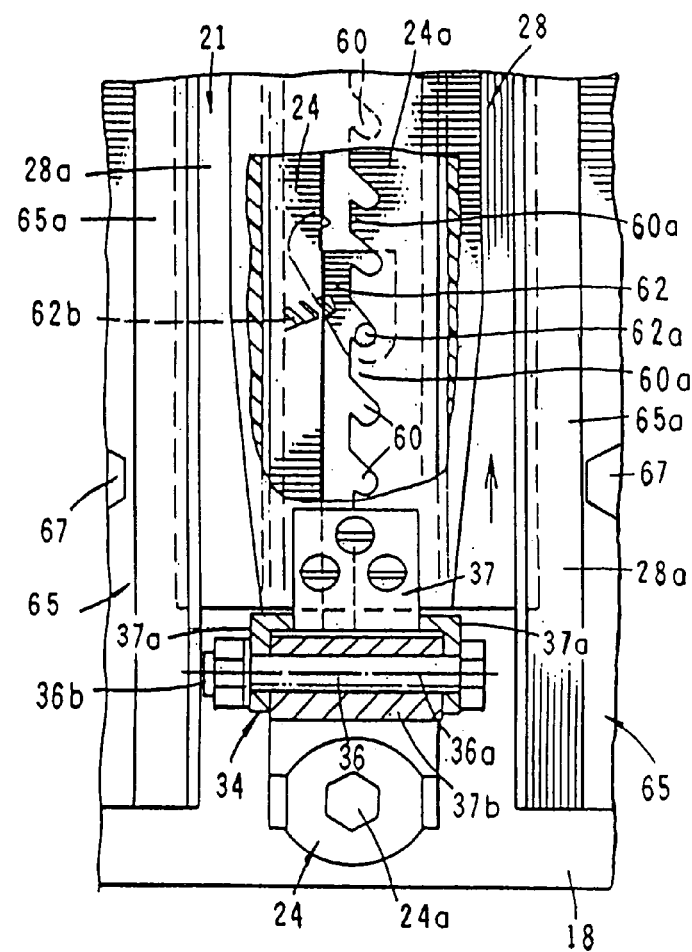
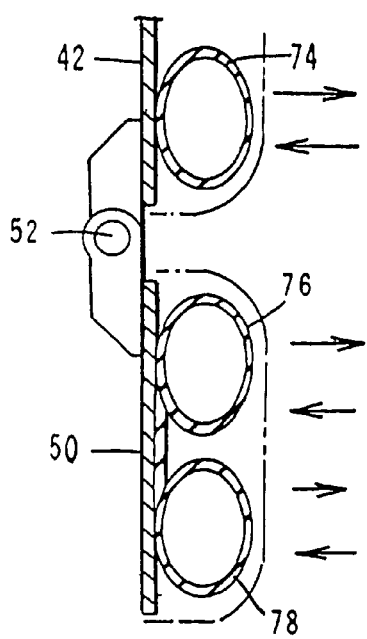

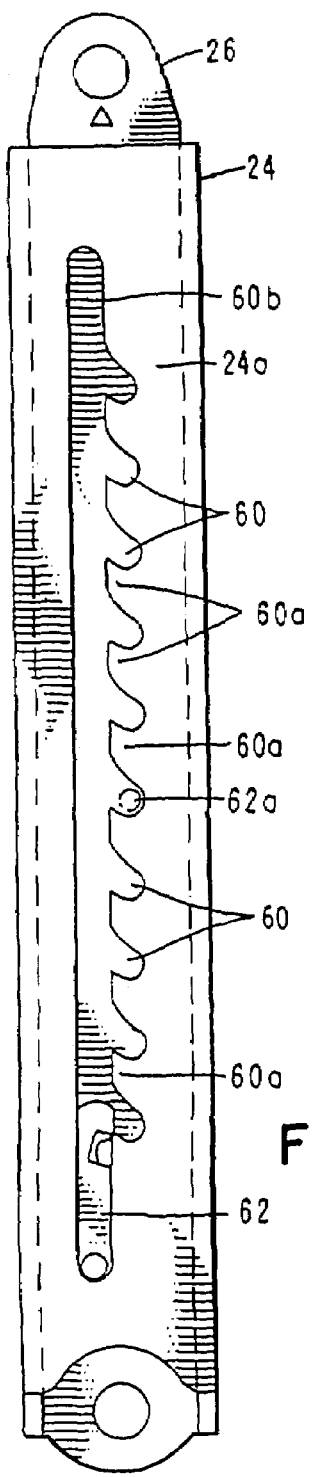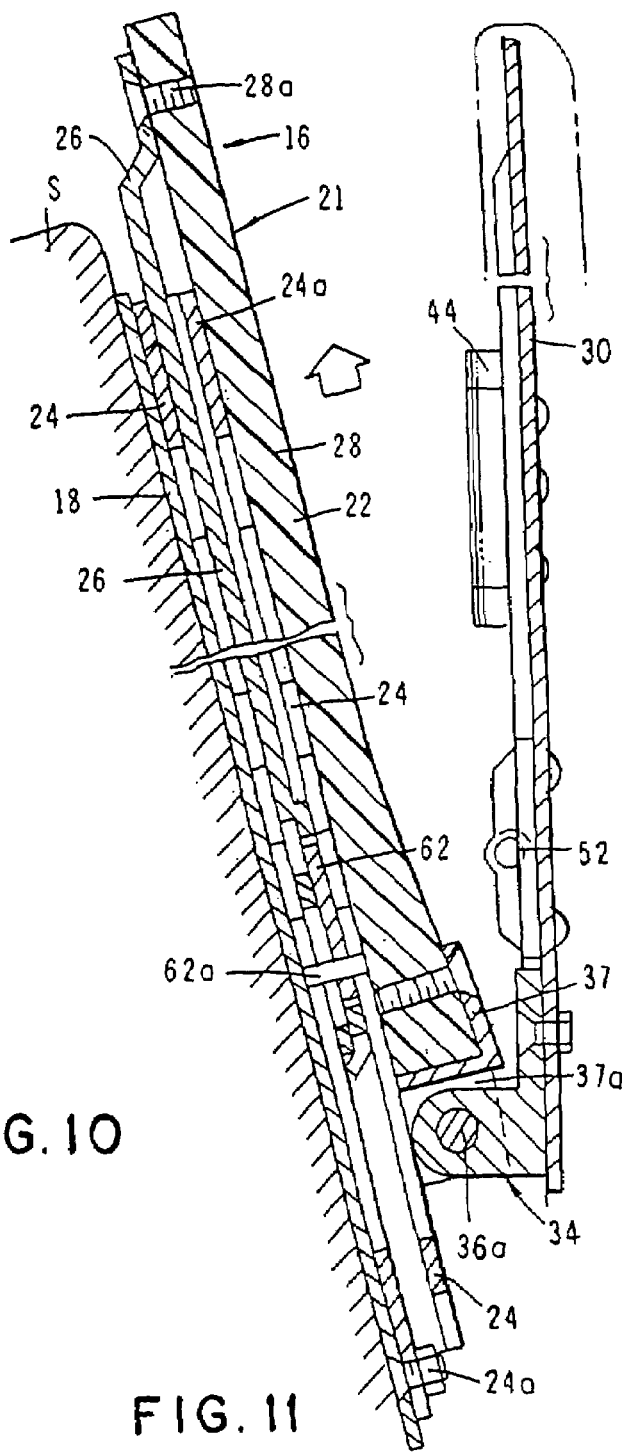
FIG. 10
FIG. 11

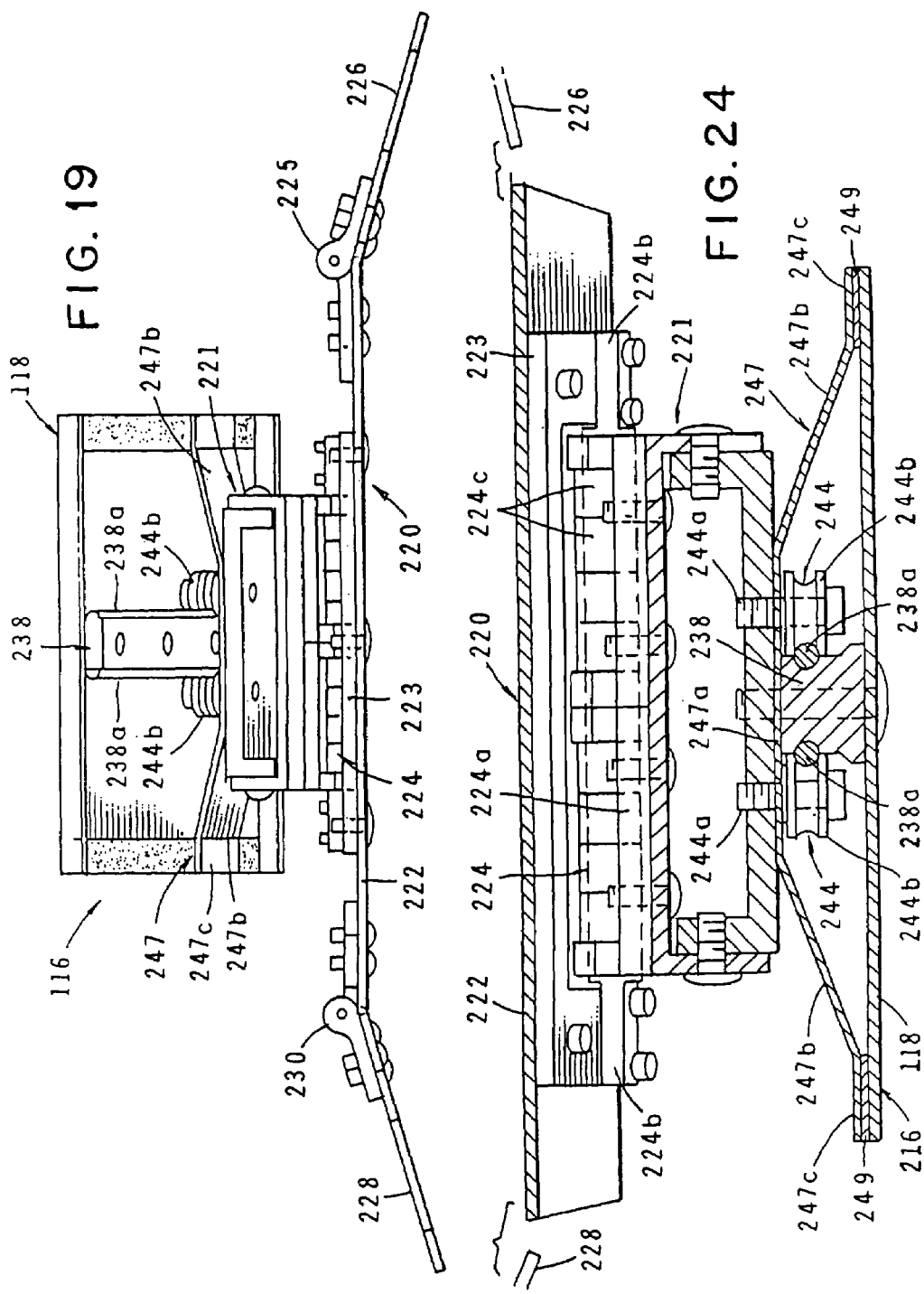

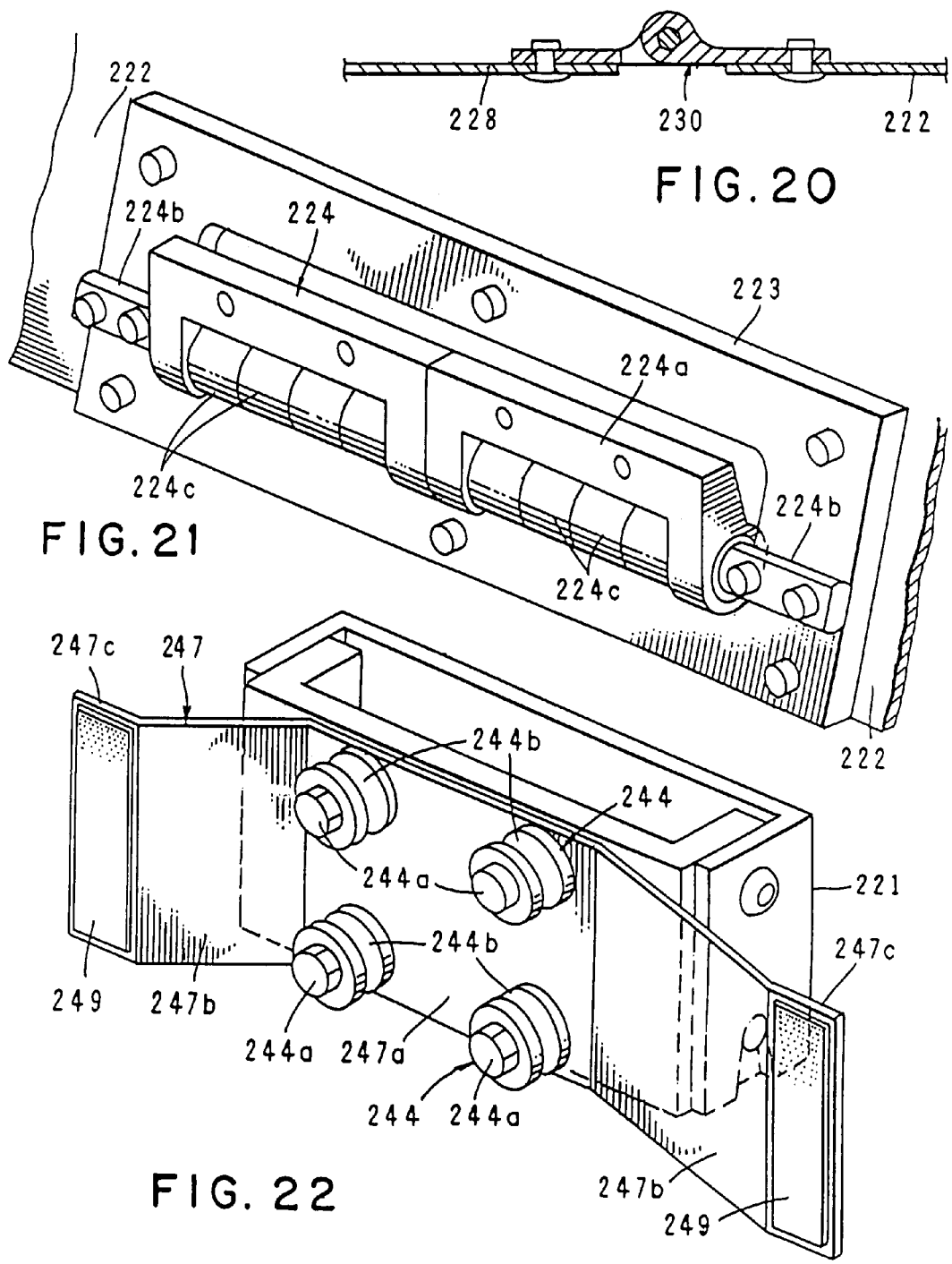

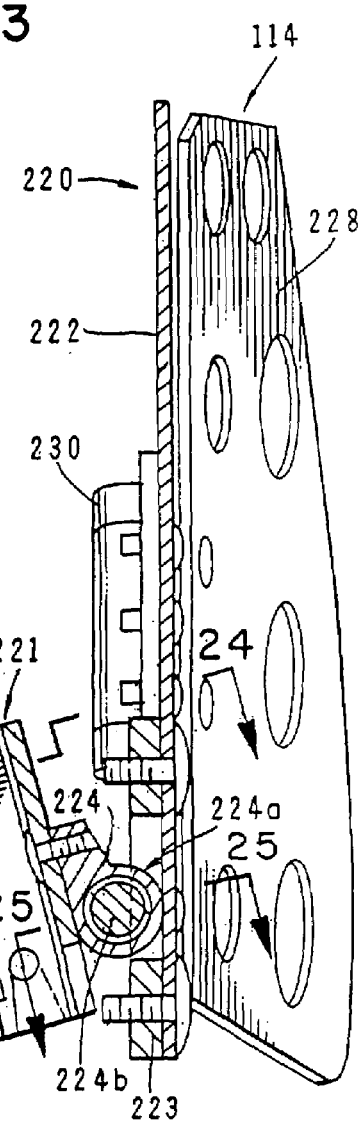
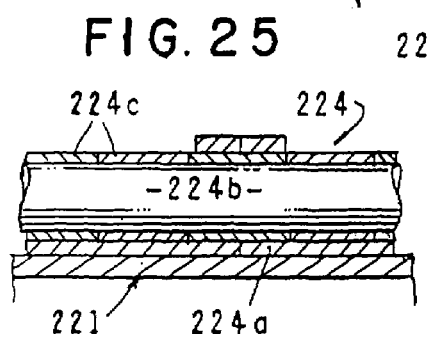
FIG. 23
FIG. 25

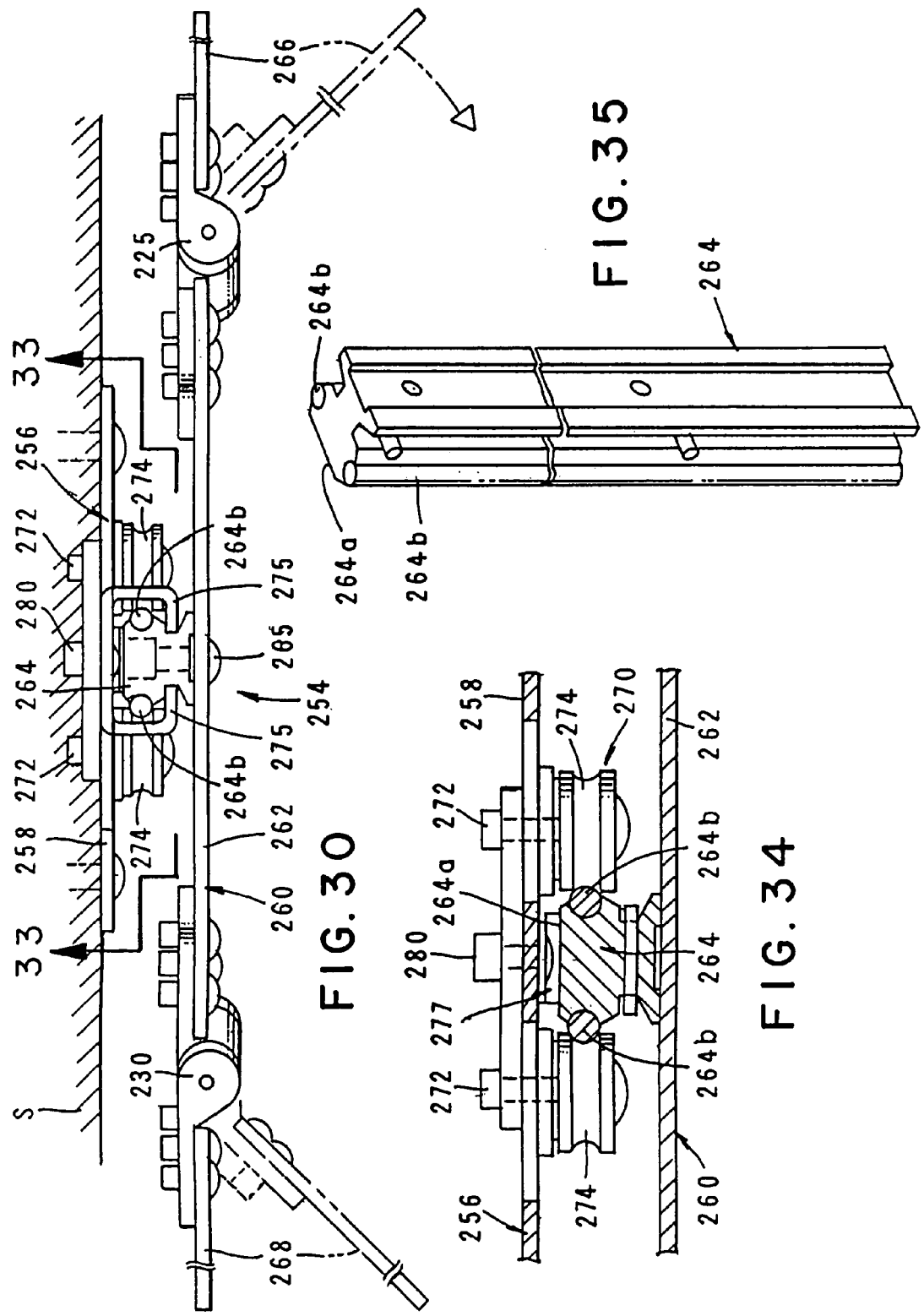

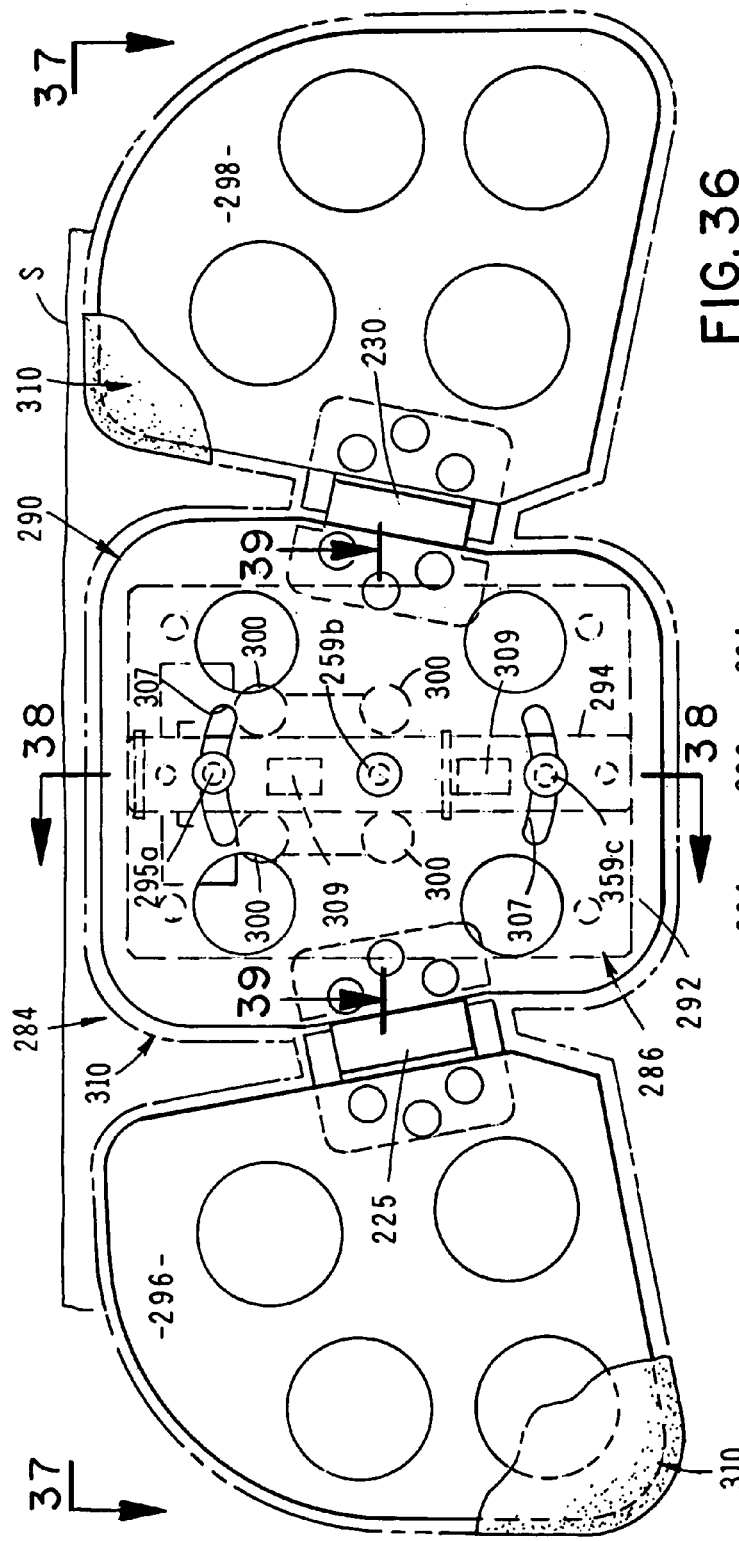
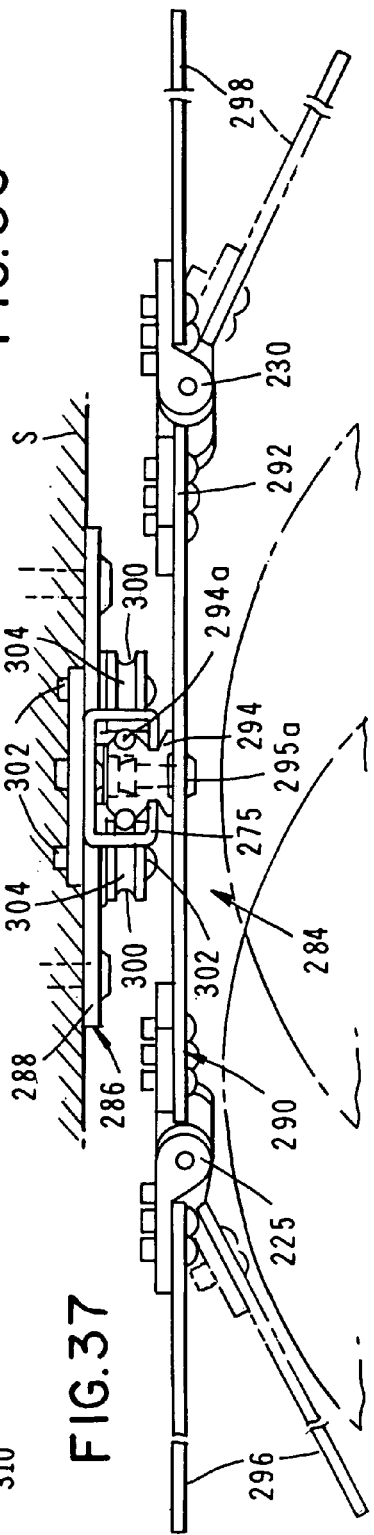
FIG. 36
FIG. 37

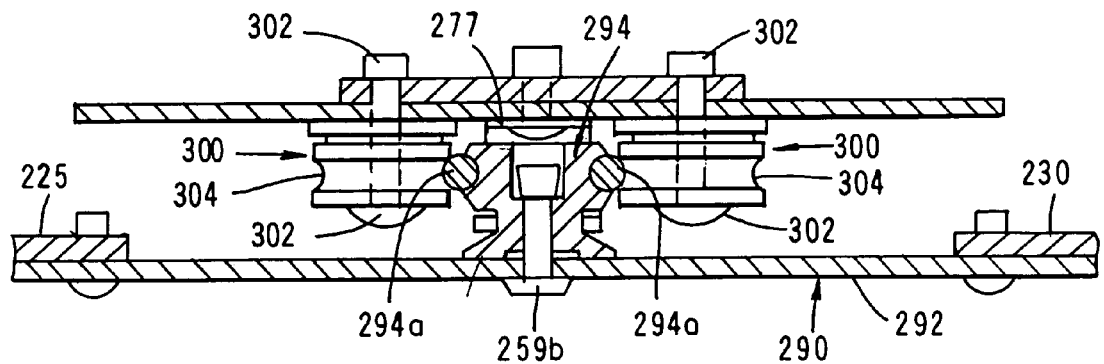
FIG. 38   FIG. 39
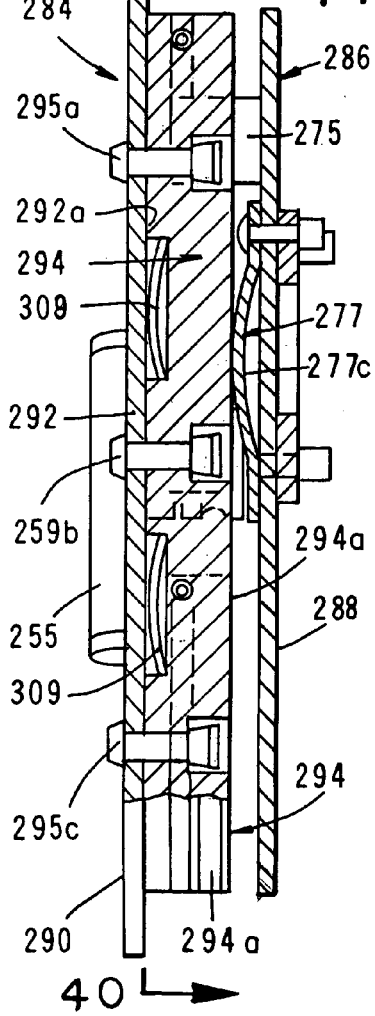
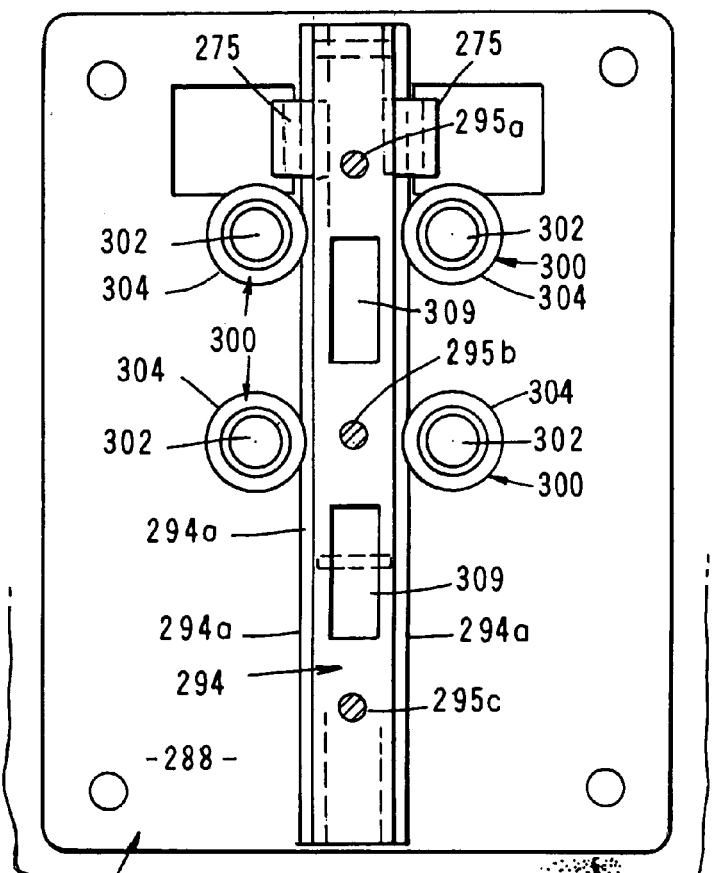
FIG. 40

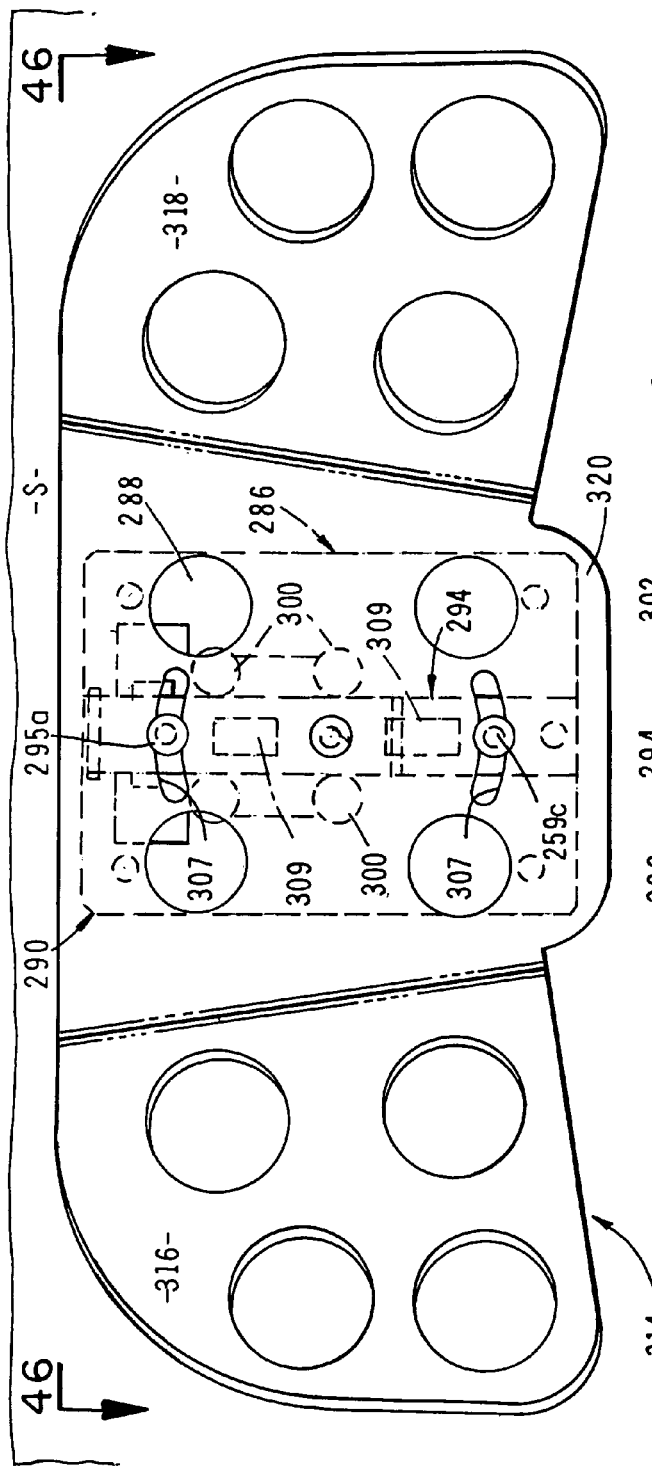
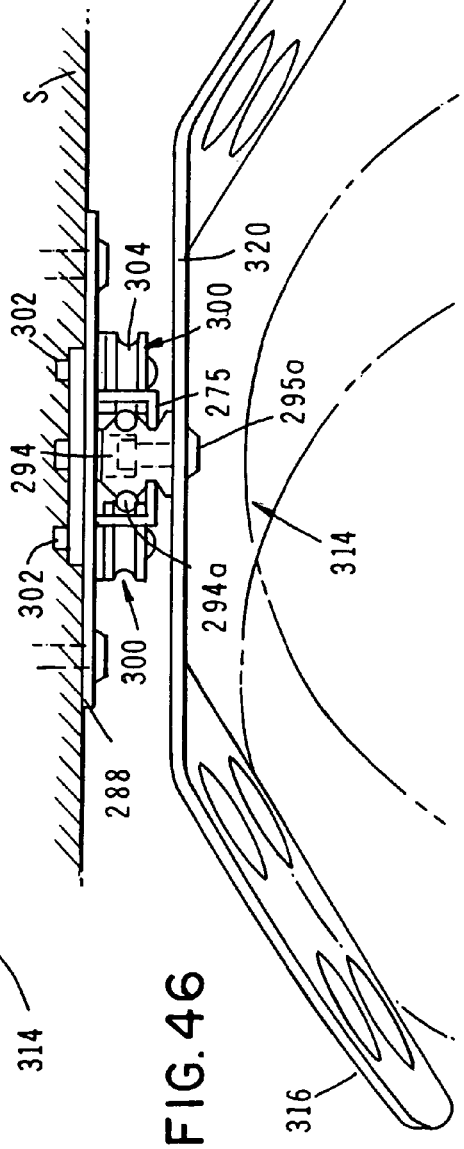
FIG. 45
FIG. 46

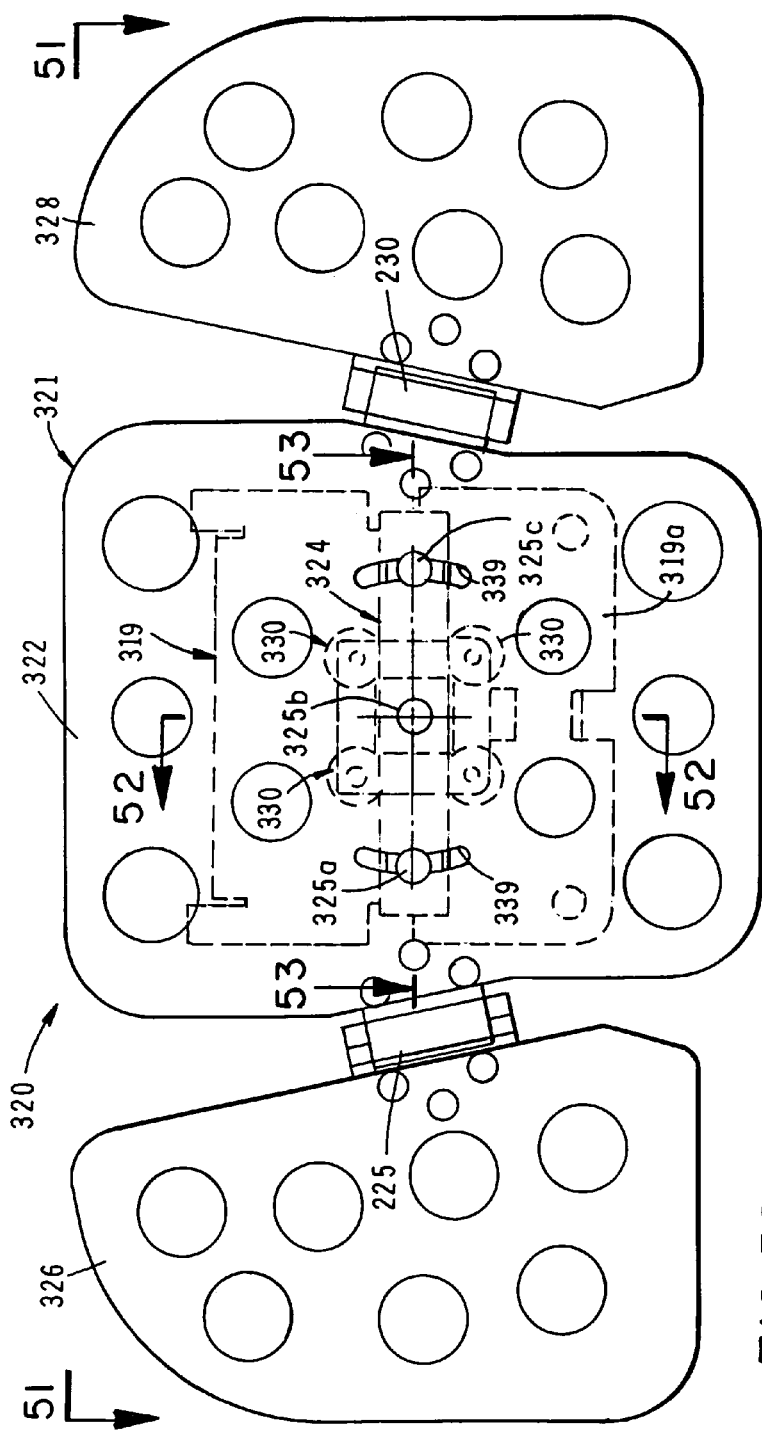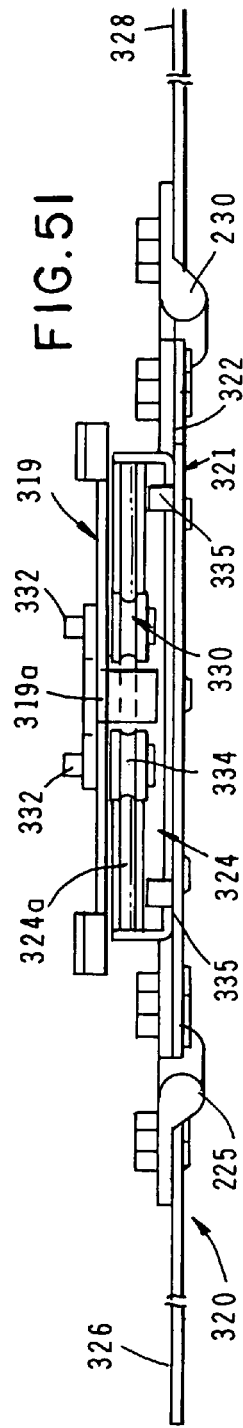
FIG. 50
FIG. 51

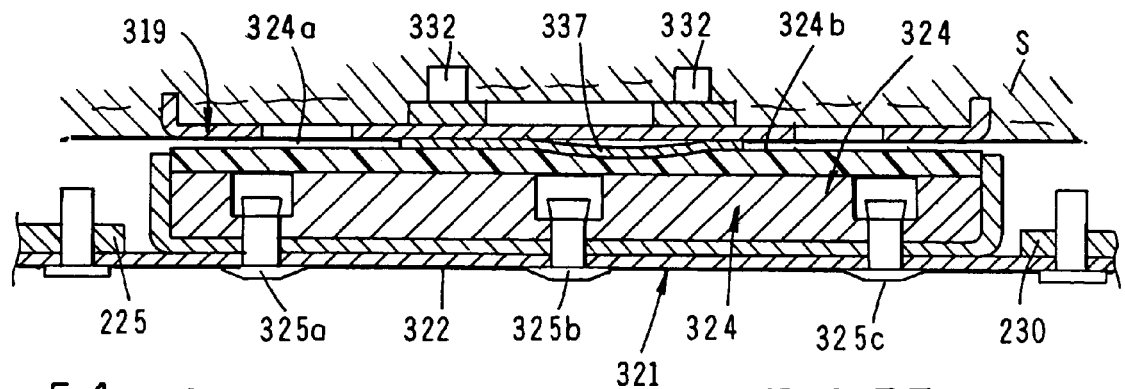
FIG.53
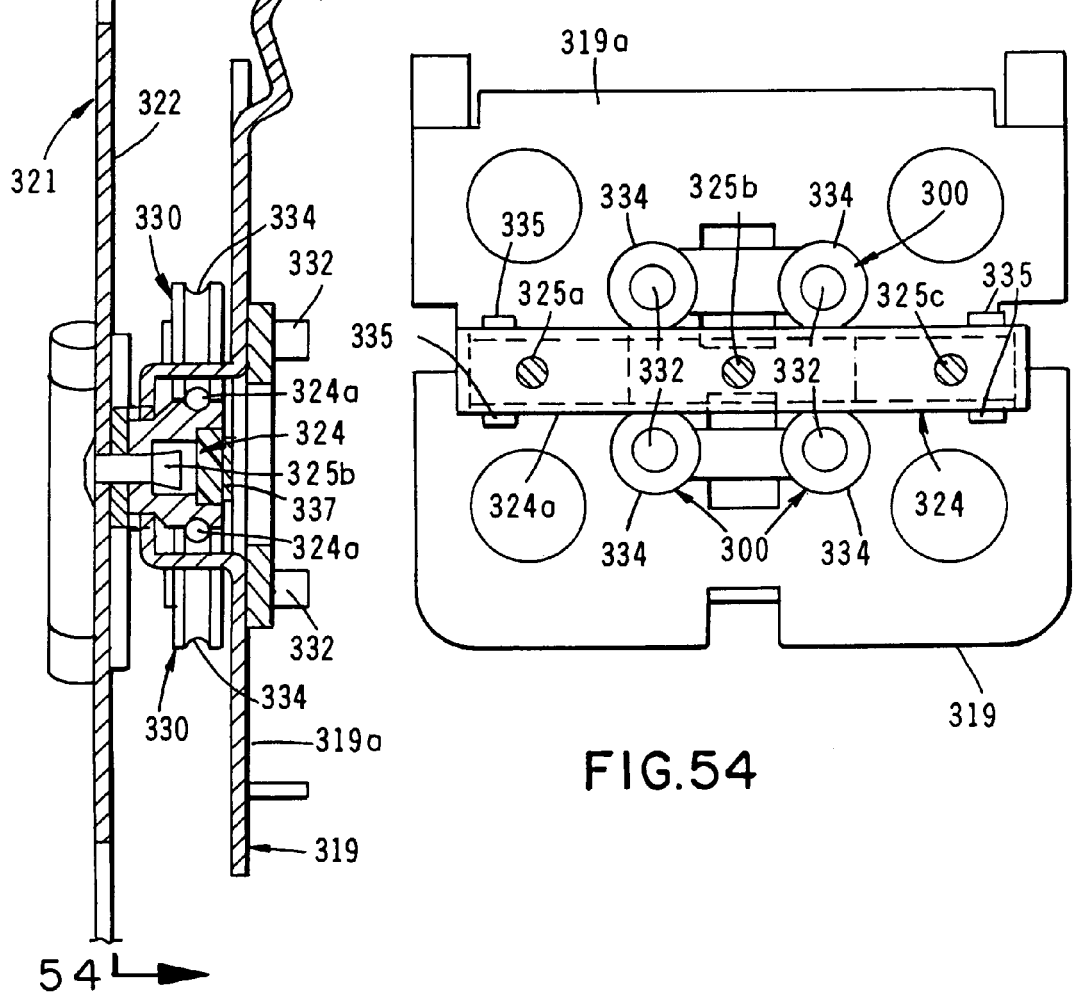
FIG.52
FIG.54

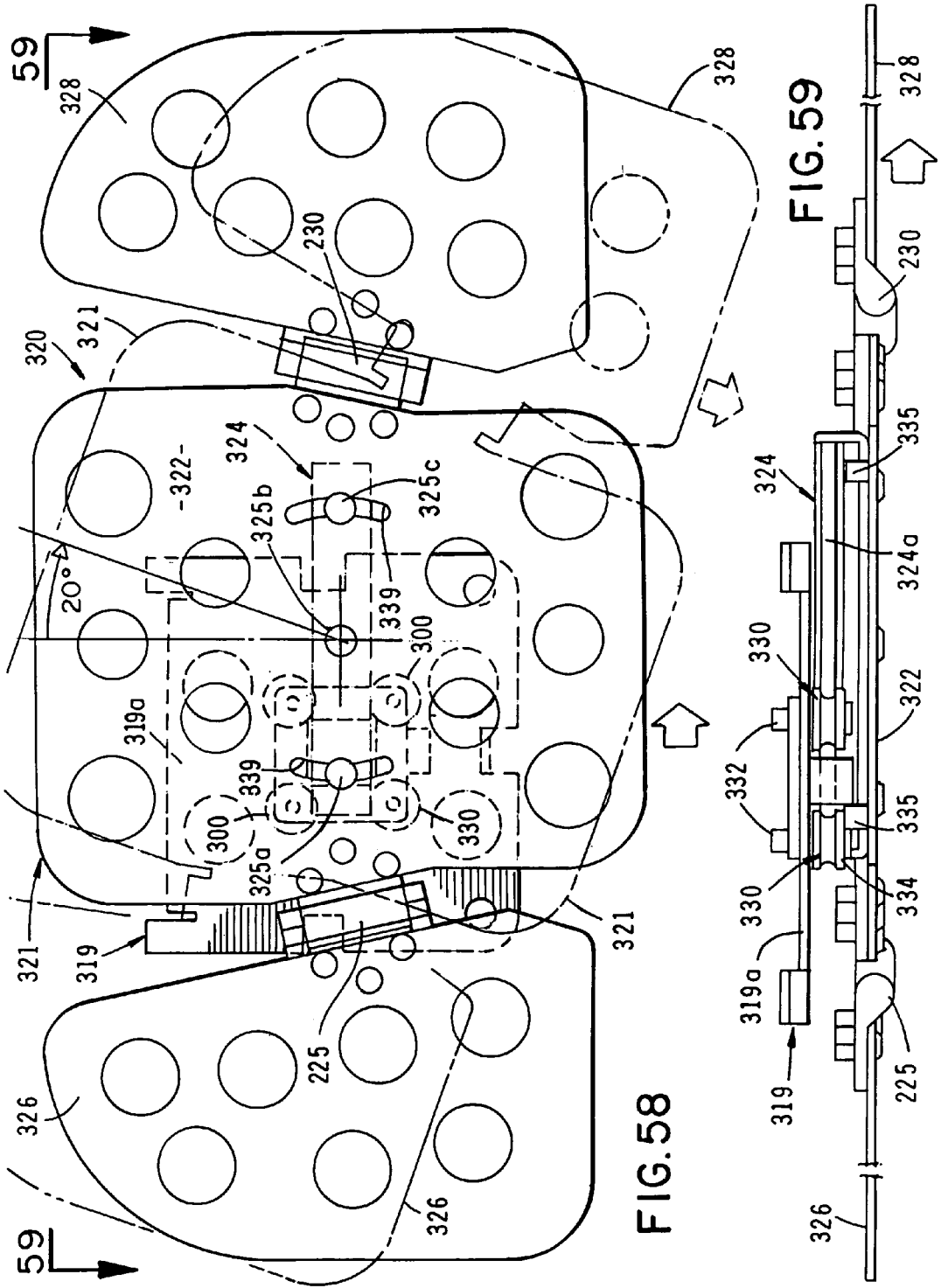

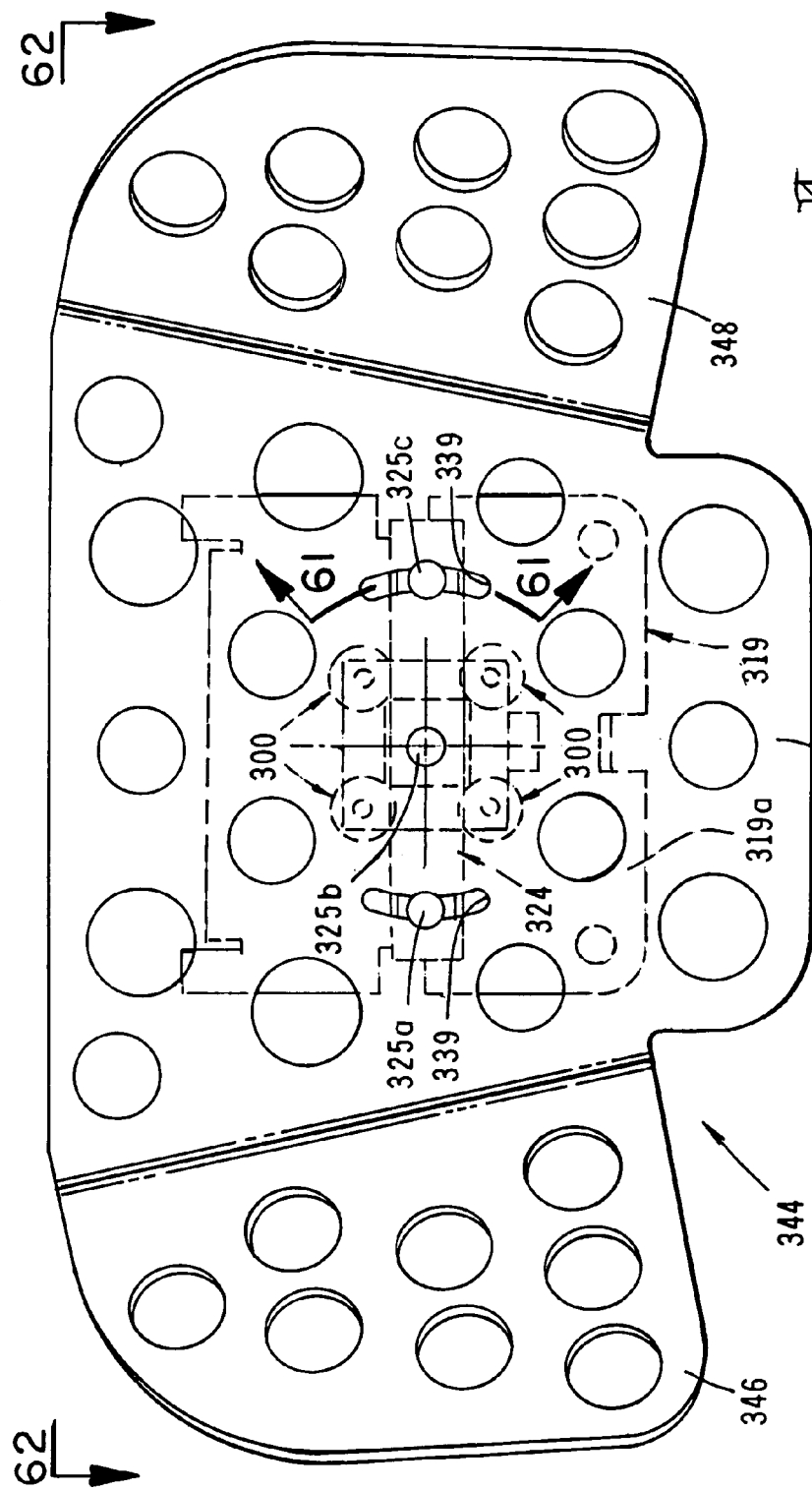
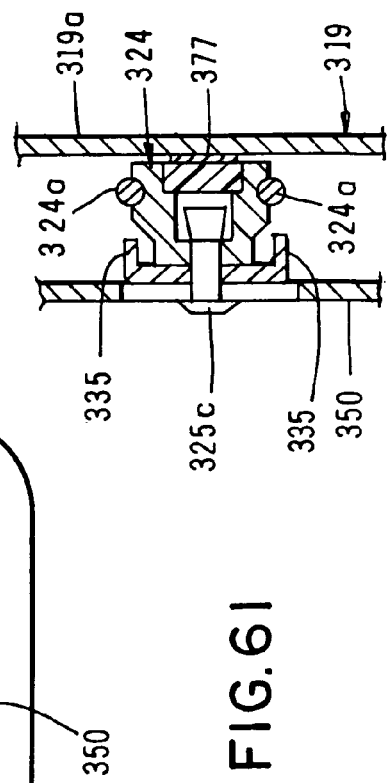
FIG. 60
FIG. 61

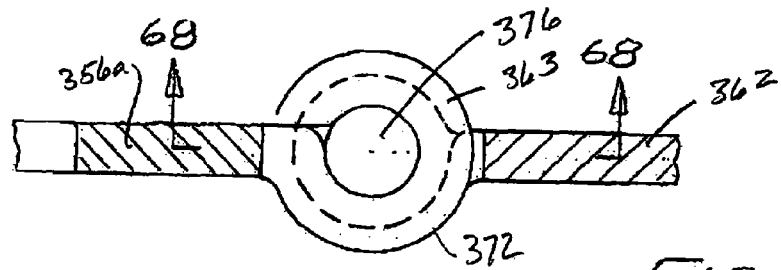
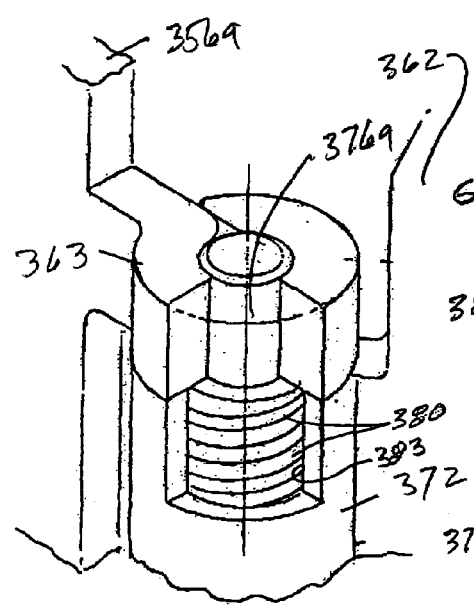
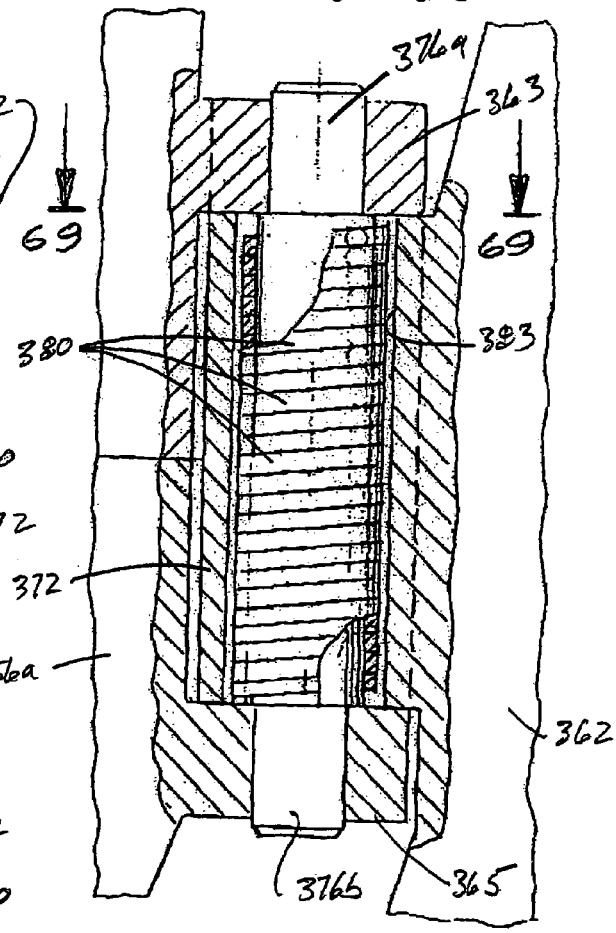
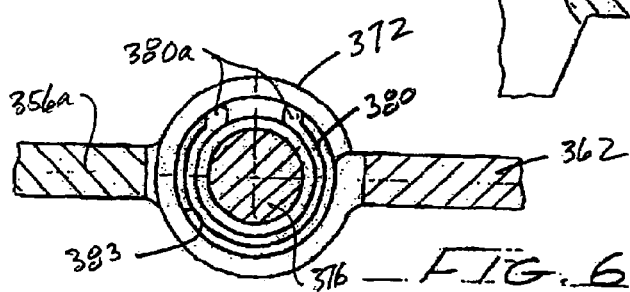

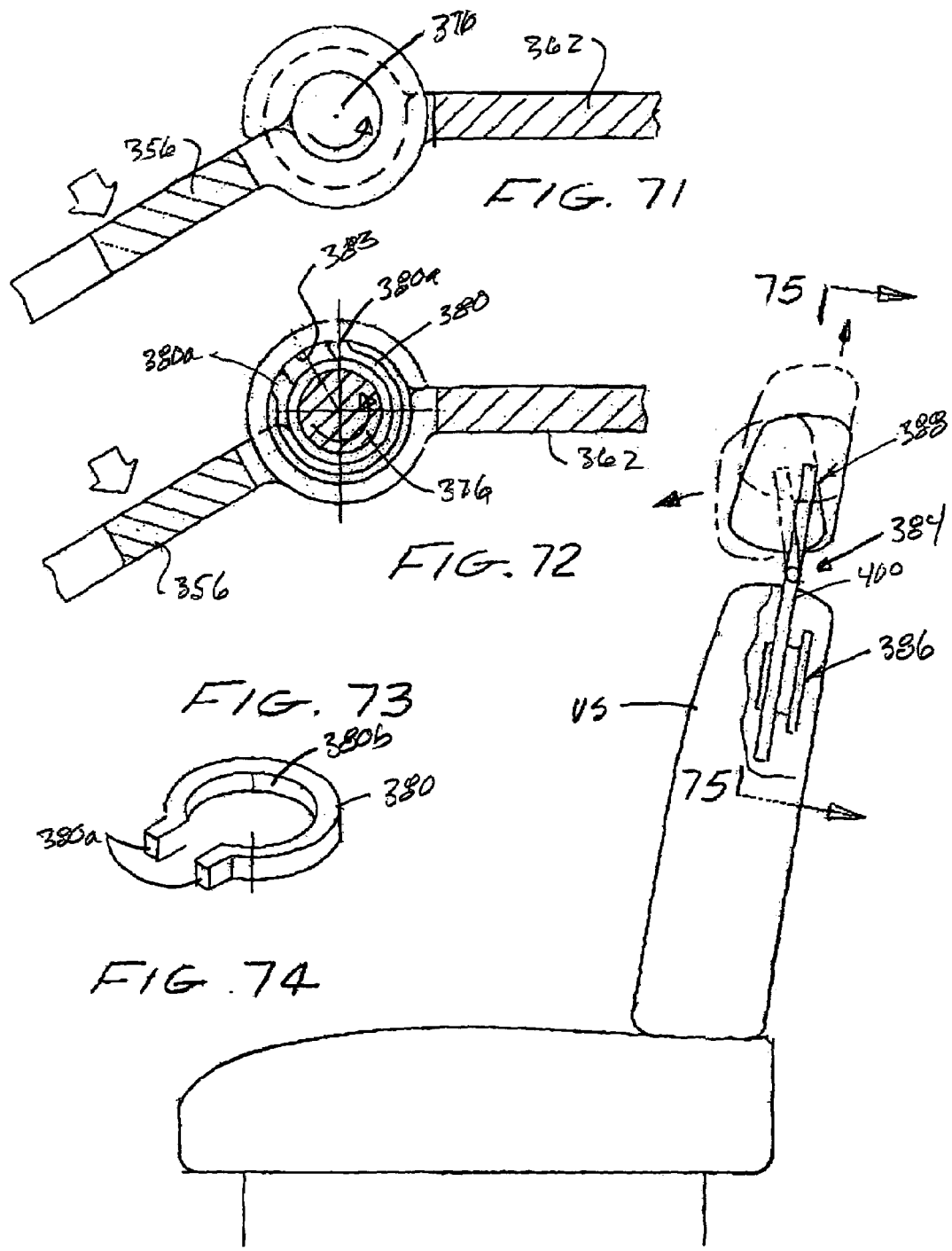

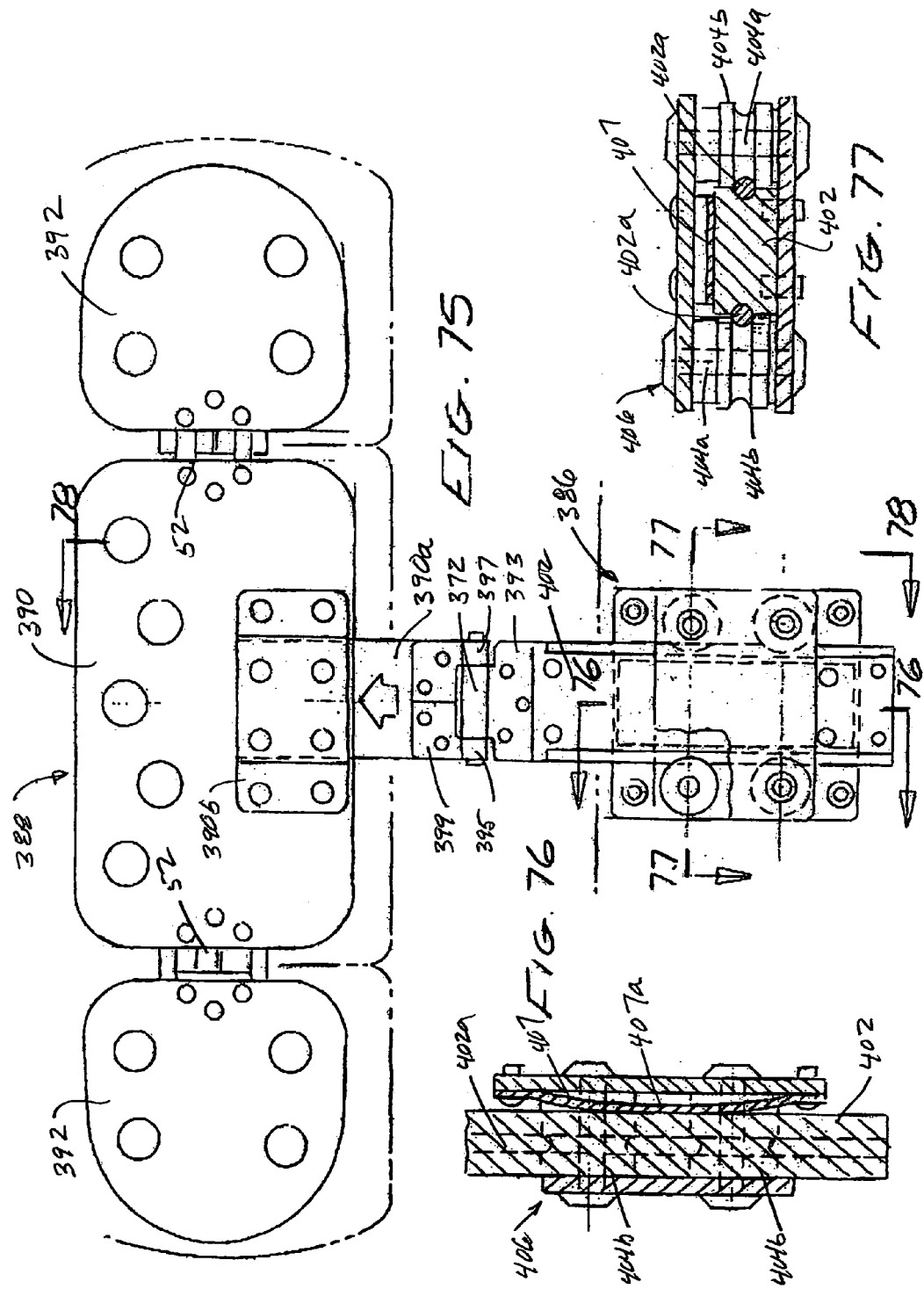

SEAT HEADREST

This is a Continuation-In-Part application of application Ser. No. 10/744,808 filed Dec. 22, 2003 now U.S. Pat. No. 7,040,705, which is Continuation-In-Part application of application Ser. No. 10/172,477 filed Jun. 14, 2002, now U.S. Pat. No. 6,666,517, which is a Continuation-In-Part application of application Ser. No. 09/886,924, filed Jun. 20, 2001, now U.S. Pat. No. 6,467,846, which is a Continuation-In-Part of application Ser. No. 09/665,992, filed Sep. 20, 2000, now U.S. Pat. No. 6,250,716.

BACKGROUND OF THE INVENTION

1. Field of the Invention

The present invention relates generally to headrests for seats. More particularly, the invention concerns a fully adjustable headrest for use in connection with furniture and with passenger vehicles such as aircraft, trains and busses.

2. Discussion of the Prior Art

Various types of headrests for use in passenger vehicles have been suggested in the past. As the general rule, these headrests are designed primarily to satisfy safety aspects rather than to provide a comfortable seating posture. Typically, the prior art vehicle headrests comprise only a vertically adjustable head support member designed to provide protection against injury in the event of an accident. However, some vehicle headrests have also been provided with lateral headrest elements. Exemplary of such a headrest is that described in U.S. Pat. No. 5,997,091 issued to Rech et al.

In addition to passenger vehicle headrests, a number of headrests have been designed for use in emergency vehicles. These types of headrests are of a more complicated design and some include greater adjustability features. Exemplary of these types of headrests are those disclosed in U.S. Pat. No. 5,275,462 and in U.S. Pat. No. 5,934,749 both issued to Pond et al.

Even more complex headrests have been designed for use in military aircraft and, more particularly in military aircraft for use in conjunction with ejection seats. Typical of this class of headrest design are those disclosed in U.S. Pat. No. 4,883,243 and U.S. Pat. No. 4,899,961 both issued to Herndon. another such headrest design is disclosed in U.S. Pat. No. 4,466,662 issued to McDonald et al.

In addition to the development of headrests for use in military aircraft, significant advances have been made in recent years in the design of headrests for use in commercial aircraft. Many of these headrests are designed for personal comfort and include pivotally movable back and lateral supports. In these latter types of headrests, the head support members are typically slidably mounted on spaced apart rods that extend upwardly from the back of the seat and rely on friction to maintain the headrest in an elevated position.

As will become clear from the discussion that follows, the headrests of the present invention represents a substantial improvement over the prior art headrests provide significantly greater adjustability and therefore greater support and comfort to the user.

SUMMARY OF THE INVENTION

It is an object of the present invention to provide an adjustable headrest that provides both support and comfort to the user and can be used in connection with furniture including household and office furniture and also in connection with various types of passenger vehicles.

Another object of the invention is to provide a headrest of the aforementioned character that includes slide means for permitting easy height adjustment of the headrest and also includes locking means for securely locking the headrest in a desired elevated position.

Another object of the invention is to provide easily adjustable, wing like, side support members that are pivotally connected to a centrally located, vertically adjustable head support member by means of constant torque hinges.

Another object of the invention is to provide a headrest of the aforementioned character that includes means for permitting pivotal movement of the entire headrest relative to the seat connector.

Another object of the invention is to provide a headrest as described in the preceding paragraph that is also slideably adjustable relative to the seat connector.

Another object of the invention to provide easily adjustable chin support members that are pivotally connected to the side support members by means of constant torque hinges.

Another object of the invention is to provide an adjustable headrest construction of the character described that includes strategically positioned comfort cushions for engagement by the user's neck, head and chin.

Another object of the invention is to provide an adjustable headrest construction of the type described in the preceding paragraphs in which the cushions are readily inflatable and deflatable.

Another object of the invention is to provide a headrest construction of the class described that is of a simple construction and one that can be inexpensively produced and easily installed.

BRIEF DESCRIPTION OF THE DRAWINGS

FIG. 8A is a view similar to FIG. 8, but showing the support assembly raised and the pawl type locking mechanism thereof in a locked position preventing downward movement of the support assembly.

FIG. 9 is a cross-sectional view taken along lines 9-9 of FIG. 8.

FIG. 10 is a front view of one form of the slide mechanism of the invention.

FIG. 11 is a cross-sectional view similar to FIG. 7, but showing the head support assembly in an intermediate upraised position.

FIG. 13 is an enlarged, cross-sectional view taken along lines 13-13 of FIG. 12.

FIG. 19 is a cross-sectional view taken along lines 19-19 of FIG. 17.

FIG. 20 is a cross-sectional view taken along lines 20-20 of FIG. 17.

FIG. 21 is a greatly enlarged, generally prospective view of one of the hinge assemblies that connects the front and back portions of the headrest.

FIG. 22 is a generally prospective view of one form of the carriage assembly of the invention that interconnects the front portion of the headrest with the rear portion thereof.

FIG. 23 is an enlarged, cross-sectional view taken along lines 23-23 of FIG. 17.

FIG. 24 is a greatly enlarged, cross-sectional view taken along lines 24-24 of FIG. 23.

FIG. 25 is a cross-sectional view taken along lines 25-25 of FIG. 23.

FIG. 30 is a cross-sectional view taken along lines 30-30 of FIG. 27.

FIG. 34 is an enlarged, cross-sectional view taken along lines 34-34 of FIG. 33.

FIG. 35 is a generally perspective, fragmentary view of the roller guide component of this latest form of the invention.

FIG. 36 is front view of yet another form of the headrest assembly of the present invention.

FIG. 37 is a cross-sectional view taken along lines 37-37 of FIG. 36.

FIG. 38 is a cross-sectional view taken along lines 38-38 of FIG. 36.

FIG. 39 is an enlarged cross-sectional view taken along lines 39-39 of FIG. 36.

FIG. 40 is a cross-sectional view taken along lines 40-40 of FIG. 38.

FIG. 45 is front view of still another form of the headrest assembly of the present invention.

FIG. 46 is a cross-sectional view taken along lines 46-46 of FIG. 45.

FIG. 50 is front view of yet another form of the headrest assembly of the present invention.

FIG. 51 is a view taken along lines 51-51 of FIG. 50.

FIG. 52 is an enlarged cross-sectional view taken along lines 52-52 of FIG. 50.

FIG. 53 is an enlarged cross-sectional view taken along lines 53-53 of FIG. 50.

FIG. 54 is a cross-sectional view taken along lines 54-54 of FIG. 52.

FIG. 58 is a view a similar to FIG. 57, but showing the horizontal movement of the headrest assembly from a first position of shown in FIG. 57 to a second position and also showing in the phantom lines, the pivotal movement of the headrest assembly from a first position to a second position.

FIG. 59 is a view taken along lines 59-59 of FIG. 58.

FIG. 60 is front view of yet another form of the headrest assembly of the present invention.

FIG. 61 is an enlarged cross-sectional view taken along lines 61-61 of FIG. 60.

FIG. 67 is a greatly enlarged, cross-sectional view taken along lines 67-67 of FIG. 65.

FIG. 68 is an enlarged, cross-sectional view taken along lines 68-68 of FIG. 67.

FIG. 69 is a cross-sectional view taken along lines 69-69 of FIG. 68.

FIG. 70 is a fragmentary, generally perspective view illustrating the interconnection of the hinge shaft of the invention with one of the connector segments of the pivoting panels of the seat headrest assembly.

FIG. 71 is a cross-sectional view similar to FIG. 67, but showing the pivotal movement of one of the side panels of the seat headrest assembly.

FIG. 72 is a cross-sectional view similar to FIG. 71, but showing the interaction of the generally U-shaped friction imparting hinge members with the barrel portion of the hinge assembly.

FIG. 73 is a generally perspective view of one of the generally U-shaped friction imparting elements of the hinge assembly.

FIG. 74 is a side elevational view, partly broken away to show internal construction, of yet another form of the seat headrest of the present invention that is especially adapted for use in connection with automobiles and like vehicles.

FIG. 75 is a greatly enlarged cross-sectional view taken along lines 75-75 of FIG. 74.

FIG. 76 is a greatly enlarged, cross-sectional view taken along lines 76-76 of FIG. 75.

FIG. 77 is a greatly enlarged, cross-sectional view taken along lines 77-77 of FIG. 65.

DESCRIPTION OF THE INVENTION

Figure 1:
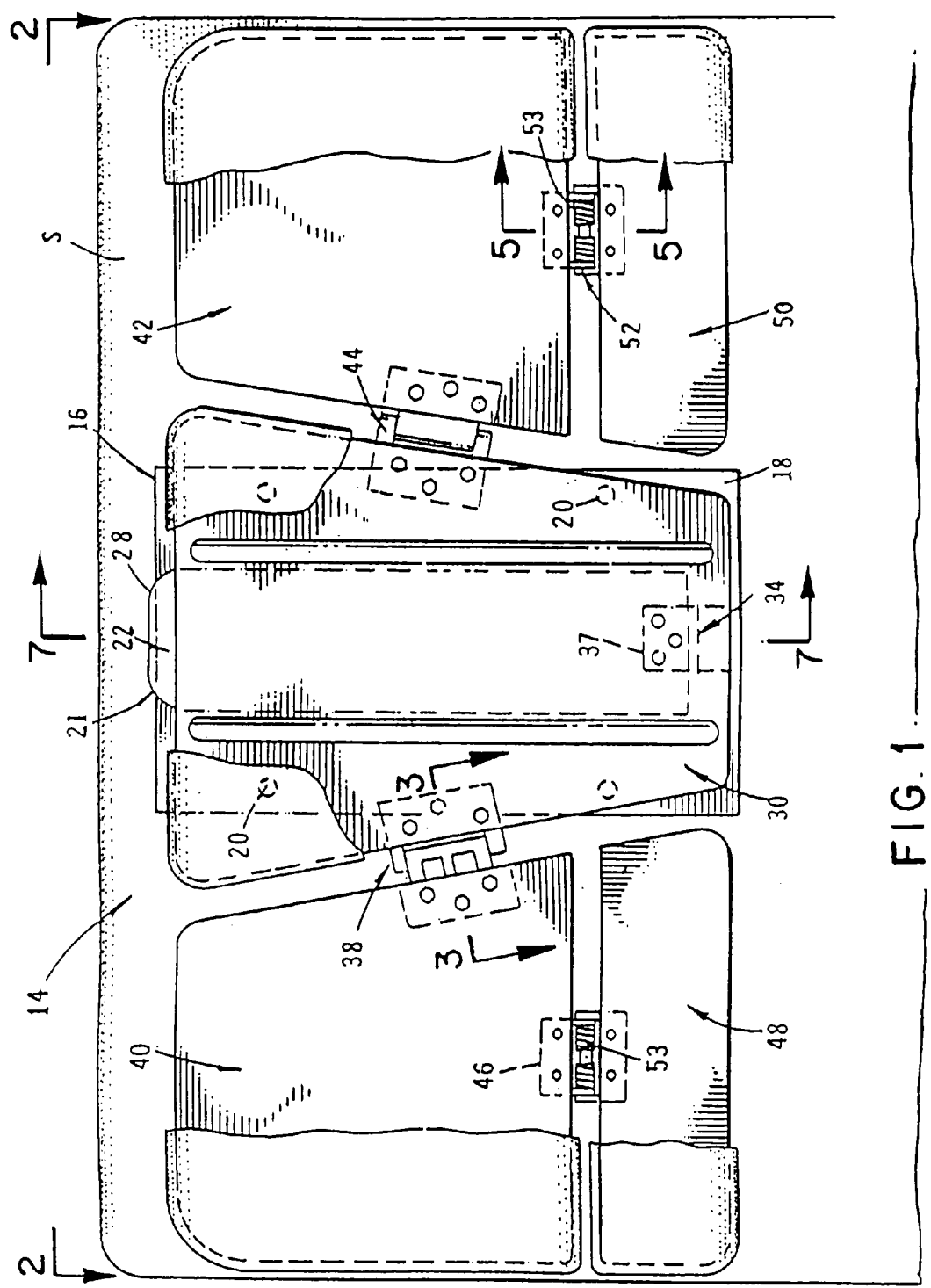
FIG. 1 is a front view of one form of the seat headrest apparatus of the invention partly broken away to show internal construction.
Figure 2:
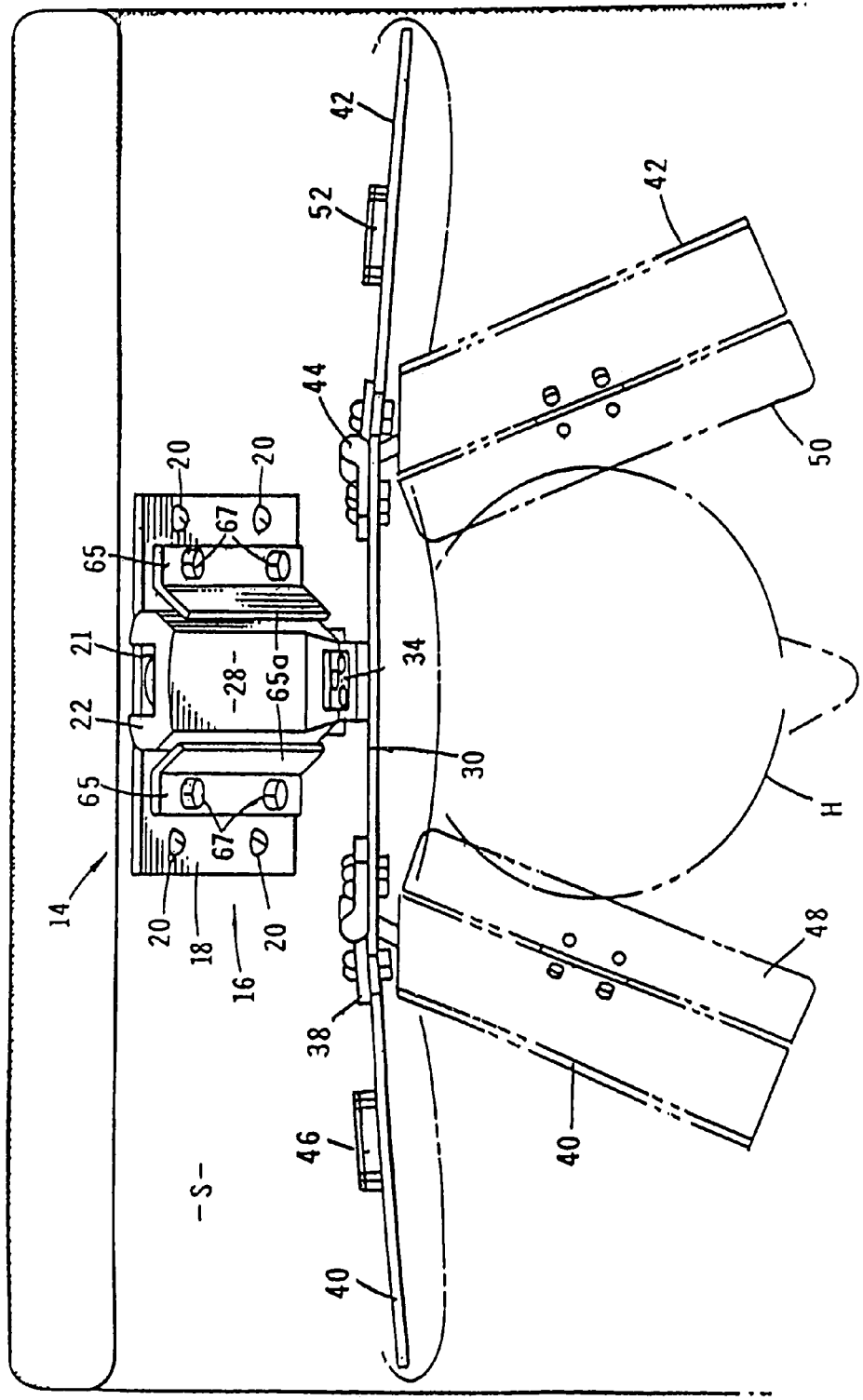
FIG. 2 is a view taken along lines 2-2 of FIG. 1.
Figure 3:
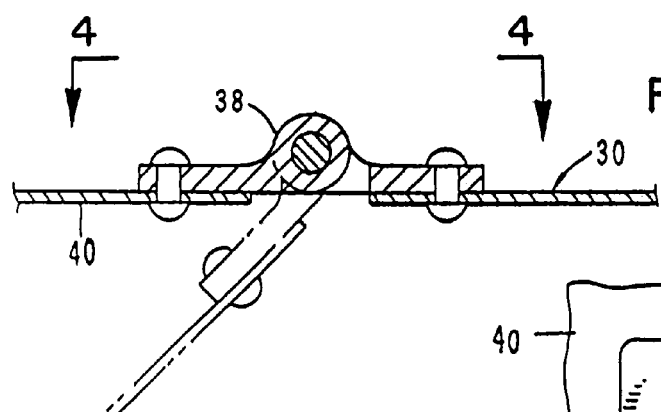
FIG. 3 is an enlarged, cross-sectional view taken along lines 3-3 of FIG. 1.
Figure 4:
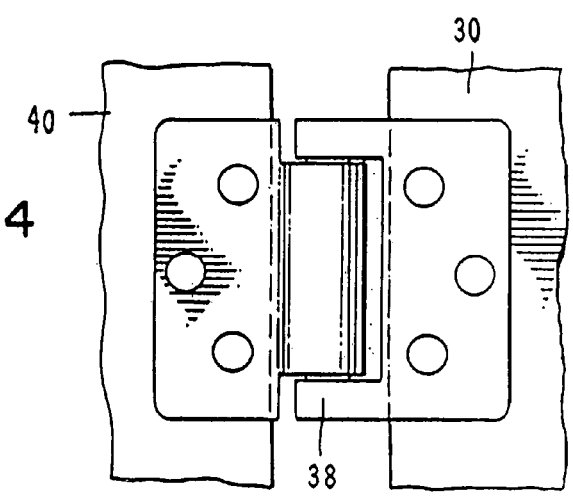
FIG. 4 is a view taken along lines 4-4 of FIG. 3.
Figure 5:
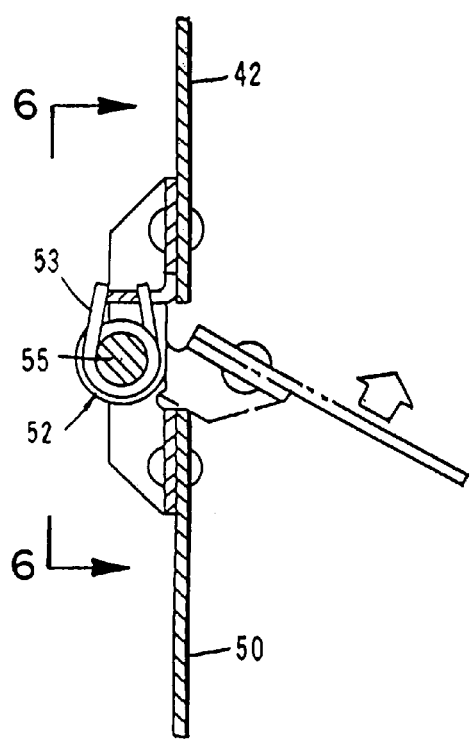
FIG. 5 is an enlarged, cross-sectional view taken along lines 5-5 of FIG. 1.
Figure 11A:
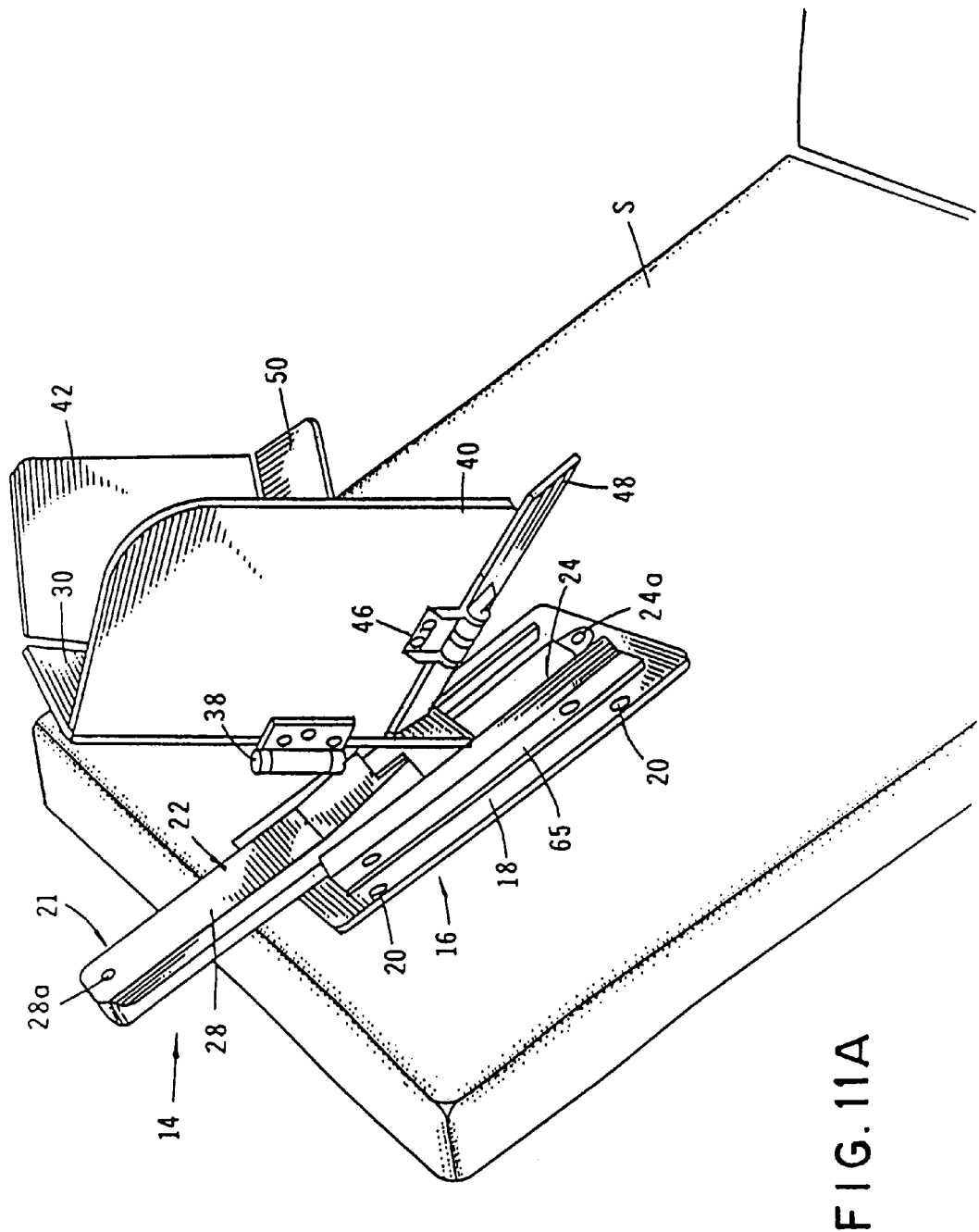
FIG. 11A is a generally perspective view of the apparatus of the invention shown affixed to the seat and illustration the articulation of the various support components of the headrest assembly of the apparatus.

Referring to the drawings and particularly to FIGS. 1, 2, and 11A, one form of the seat headrest of the invention is there illustrated and generally designated by the numeral 14. The seat headrest here comprises a seat connector assembly 16 that includes a connector member 18 that is connected to the seat "S" by any suitable means such as threaded connectors 20 (FIGS. 2 and 8). A support assembly 21 is slidably connected to connector member 18 for movement between a first position shown in FIG. 7 to an intermediate position shown in FIG. 11 and to an upraised position shown in FIG. 11A.

Figure 7:
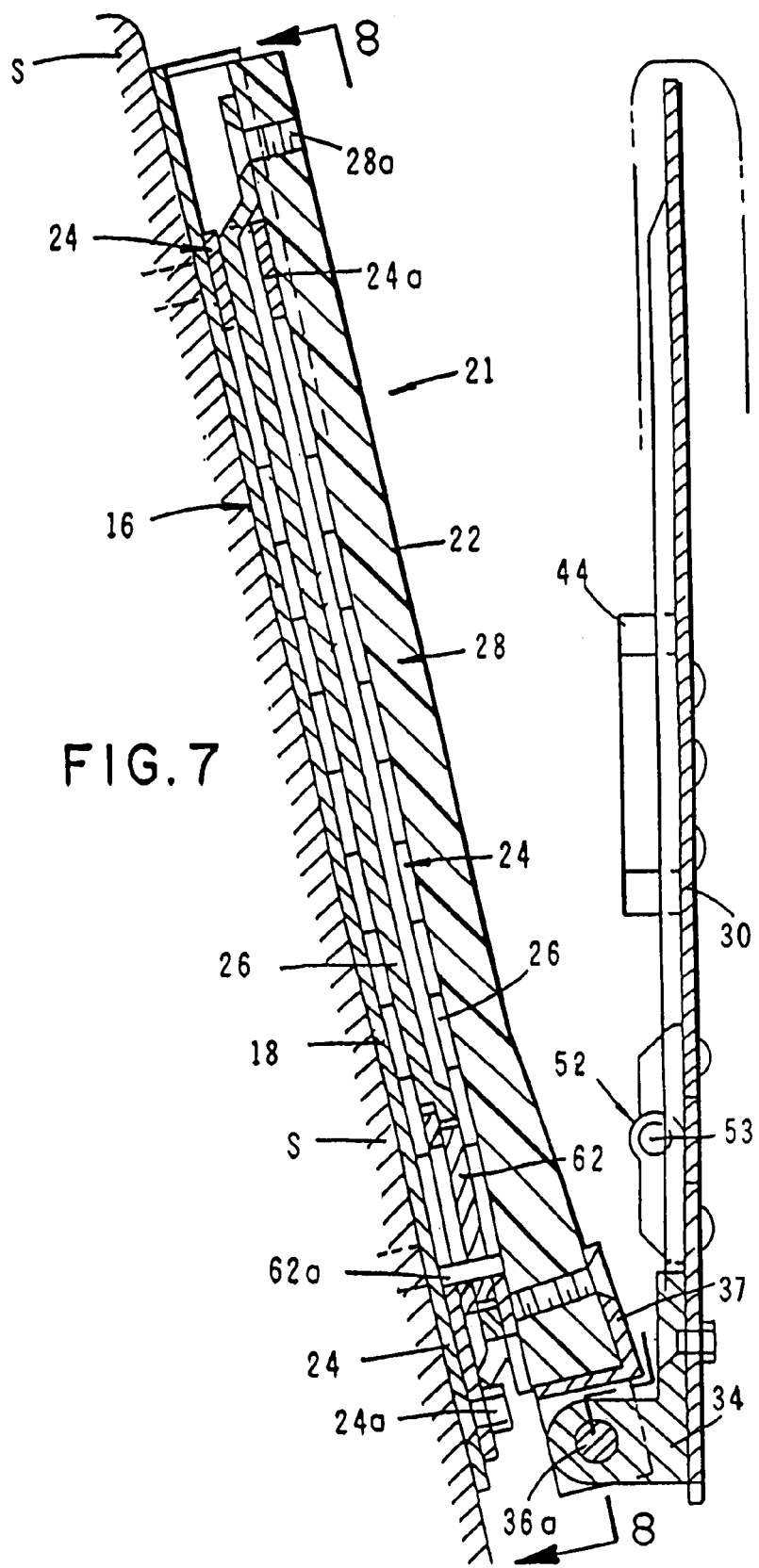
FIG. 7 is an enlarged, cross-sectional view taken along lines 7-7 of FIG. 1.
Figure 8:
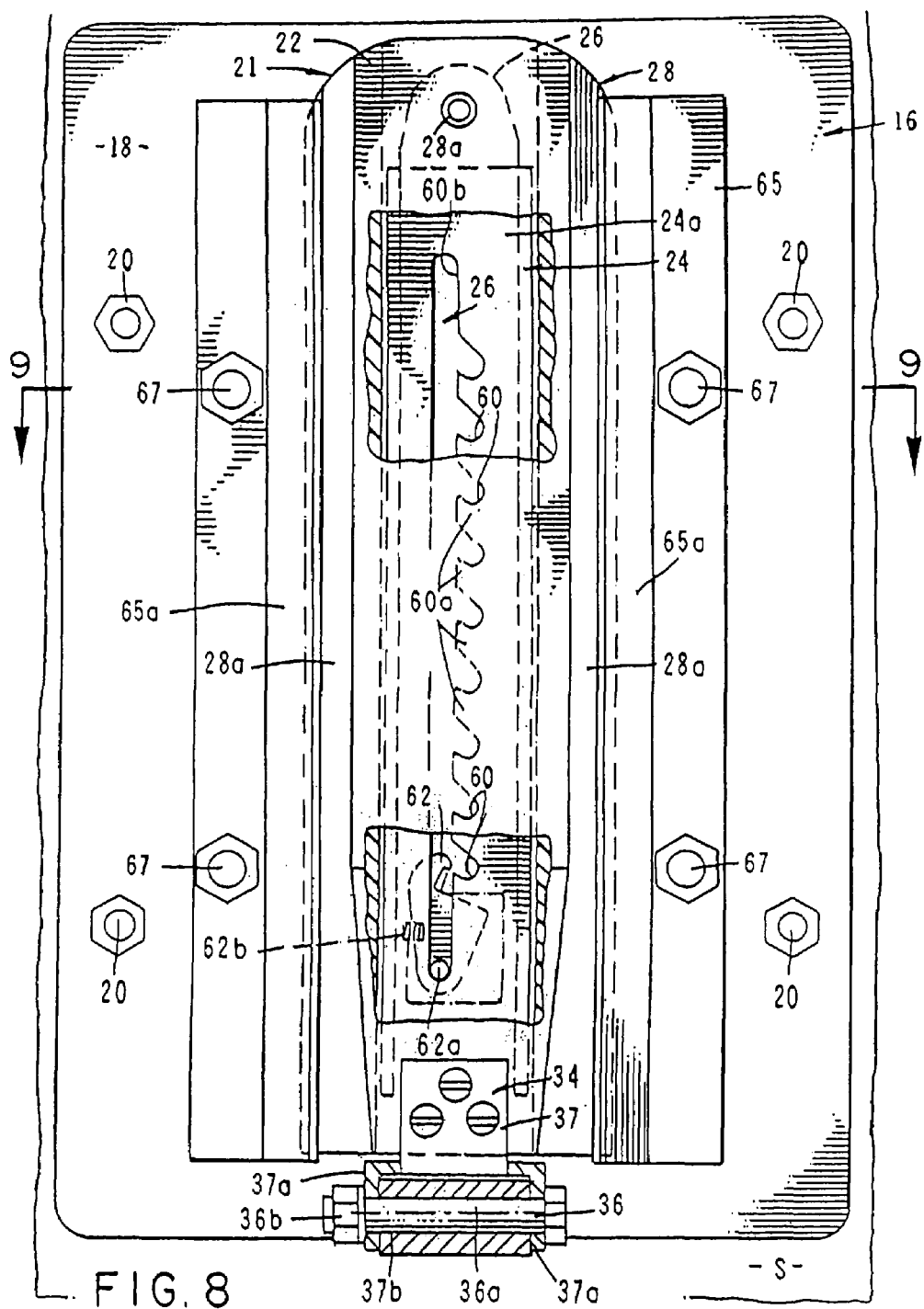
FIG. 8 is a view taken along lines 8-8 of FIG. 7.

Support assembly 21 here comprises a slide mechanism 22, including a track 24, that is connected to connector member 18 by a suitable connector such as connector 24a (FIGS. 7 and 10). Slide mechanism 22 also includes a slide assembly 26 that slides within track 24 in a manner presently to be described. Connected to slide assembly 26 by a threaded connector 28a is a mounting member 28 (FIG. 7). A first head support member 30 is pivotally connected to member 28 by means of a friction hinge pivot assembly 34 that includes a transversely extending pivot pin 36 and a connector bracket 37 (FIGS. 7 and 8). With this construction, first support member 30 can be pivoted about the axis of the shaft 36a of a connector bolt 36 from a first position adjacent mounting member 28 to an angularly outwardly extending position as shown in FIGS. 7 and 11A. As best seen in FIG. 8, bracket 37 includes spaced apart apertured legs 37a that receive the shaft of bolt 36. Disposed between legs 37a is a bearing 37b having a transverse bore that receives shaft 36a of bolt 36. With this construction, when nut 36b is snugged down against one of the legs, pivoting of support member 30 will be controllably frictionally resisted.

Pivotally connected to first head support member 30 by a constant torque hinge 38 is a first lateral, or side wing 40 that is pivotally movable from the position shown in FIGS. 1 and 2 wherein it is substantially coplanar with head support member 30 to a second angularly extending forward position shown by the phantom lines in FIG. 2. In similar fashion, a second, or lateral side wing 42 is connected to the opposite side of support member 30 by a constant torque hinge 44 that is of identical construction to constant torque hinge 38. Side wing 42 is also pivotally movable from the substantially coplanar position shown in FIG. 2 to the angularly outwardly extending position shown by the phantom lines in FIG. 2. When side wings 40 and 42 are pivoted into the position shown by the phantom lines in FIG. 2, they can provide a comfortable lateral support to the passenger's head "H" in the manner shown in FIG. 2.

Figure 6:
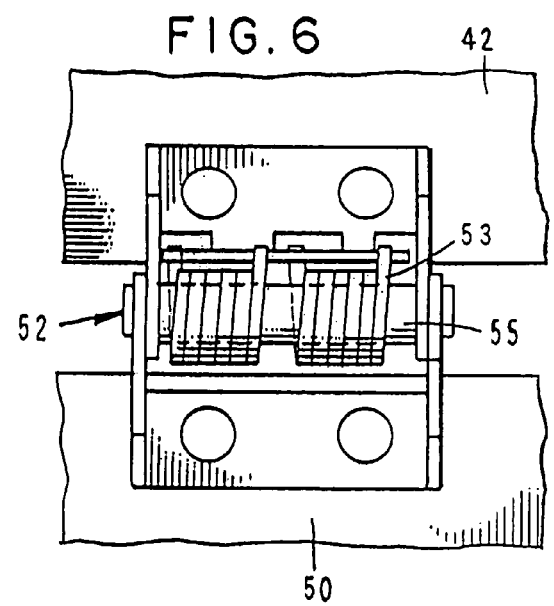
FIG. 6 is a view taken along lines 6-6 of FIG. 5.

Hingedly connected to side wing 40, by means of a constant torque, friction imparting hinge 46 is a first chin support 48. Similarly, a second chin support 50 is hingedly interconnected with side wing 42 by means of a constant torque hinge 52 that is of identical construction to hinge 46 (FIG. 1). Constant torque hinges 38, 44, 46 and 52, which are readily commercially available from sources such as Reel Precision Manufacturing of St. Paul, Minn. function to maintain the side wings and chin supports in a selected position until a substantial force is exerted on the hingedly connected member to positively move it into a different position. More particularly, as best seen in FIG. 6, each of the constant torque hinges includes a torsion spring 53 that circumscribes pivot pin or rod 55 and engages the leaves of the hinge in a manner such that relative pivotal movement of the leaves of the hinges produce a constant torque tending to continuously resist the relative pivotal movement of the leaves. In this way, movement of one of the hingedly support members relative to the other is continuously, positively resisted. The use of the constant torque spring hinges in this manner uniquely overcomes a common drawback of prior art head rest construction in which the hingedly connected members tend to undesirably move as a result of vibration and other environmental forces. It is to be understood that a friction-imparting, constant-torque hinge could also be used to hingedly connect first head support member 30 to member 28.

Referring particularly to FIGS. 7, 8, 9, 10, and 11, the novel slide means of the invention for slidably interconnecting the support assembly 21 with seat connector member 18 is there illustrated. In the present form of the invention, this slide means comprises the previously identified slide mechanism 22 which is of conventional construction and is readily commercially available from sources such as Dirak Gmbh & Co. of Ennepetal, Germany. As previously mentioned slide assembly 26 is controllably movable within track 24 from the position shown in FIG. 7 wherein slide member is substantially enclosed within the hollow housing portion of track 24 to a second extended position wherein the slide assembly extends outwardly from the track housing 24 a substantial distance.

As best seen by referring to FIGS. 9, 10 and 11, the hollow housing of track 24 includes having an upper surface 24a that is provided with a plurality of spaced-apart, angularly, downwardly extending notches 60 that are configured to receive the locking pin 62a of a pawl 62 that is carried by track 24 for pivotal movement between a first retracted position shown in FIGS. 8 and 10 to a second position shown in FIG. 8A wherein pin 62a is urged into a selected notch by means of a biasing spring 62b. With this construction, as slide 26 moves upwardly within track 24, locking pin 62a will ride over the tooth-like portions 60a located intermediate to notches 60. However, due to the urging of spring 62b, pin 62a will drop into a selected notch when upward movement of the slide assembly ceases. When locking pin 62a has thusly been urged into a selected notch downward movement of slide assembly will be positively prevented. However, when the slide assembly reaches its uppermost position, pawl 62 will enter slot 60b (FIG. 10) where it will once again move into a retracted position permitting the support assembly to move downwardly toward its starting position. As indicated in FIG. 9, mounting member 28, which is interconnected with slide assembly 26 and moves therewith, is guided by guide means shown here as a pair of spaced-apart guide brackets 65 that are connected to connector member 18 by threaded connectors 67. Each of the brackets 65 includes an angularly outwardly extending segment 65a that guidingly engage the sloping side walls 28a of mounting member 28.

Figure 12:
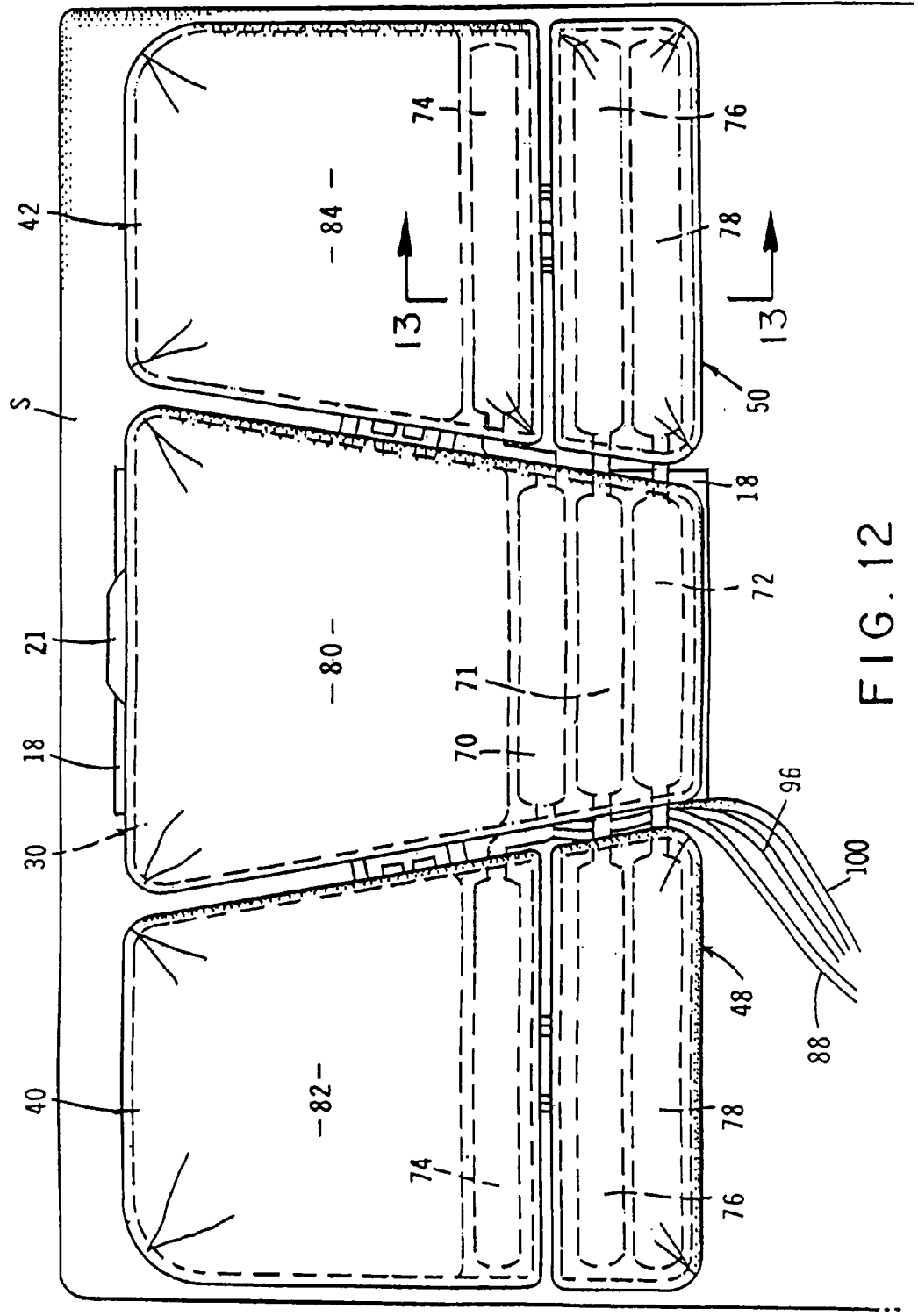
FIG. 12 is a front view of an alternate form of the headrest apparatus of the invention having inflatable cushions or air bags affixed to the various support members of the apparatus.
Figure 15:
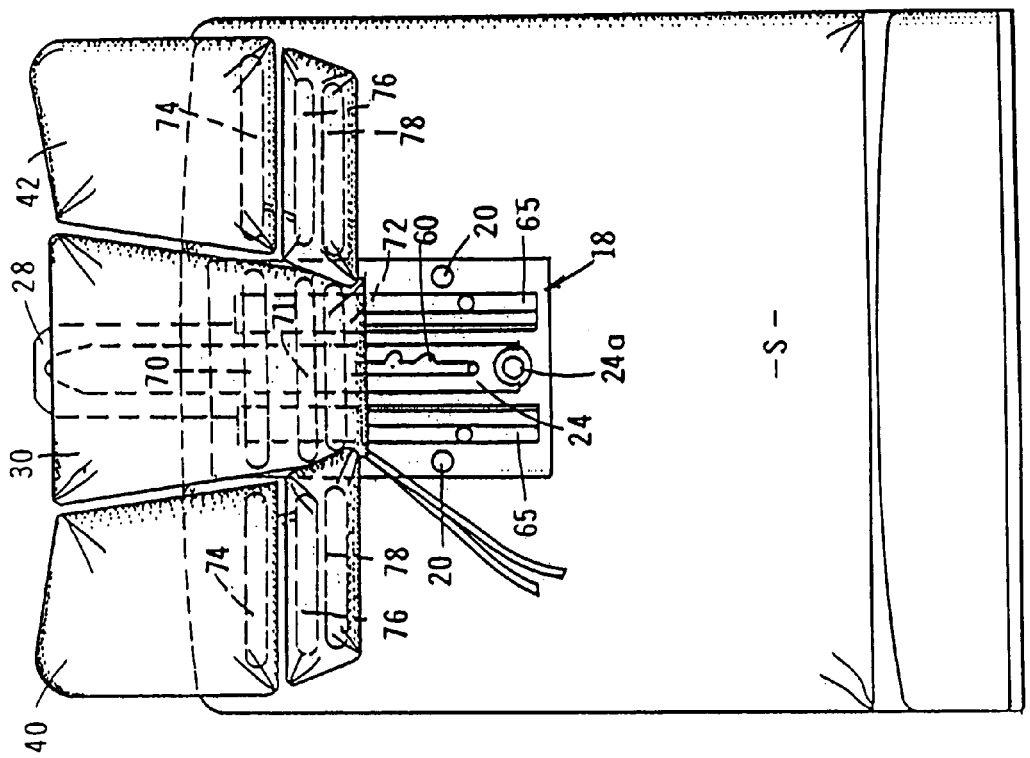
FIG. 15 is a view similar to FIG. 14 but showing the support assembly in a raised position.
Figure 14:
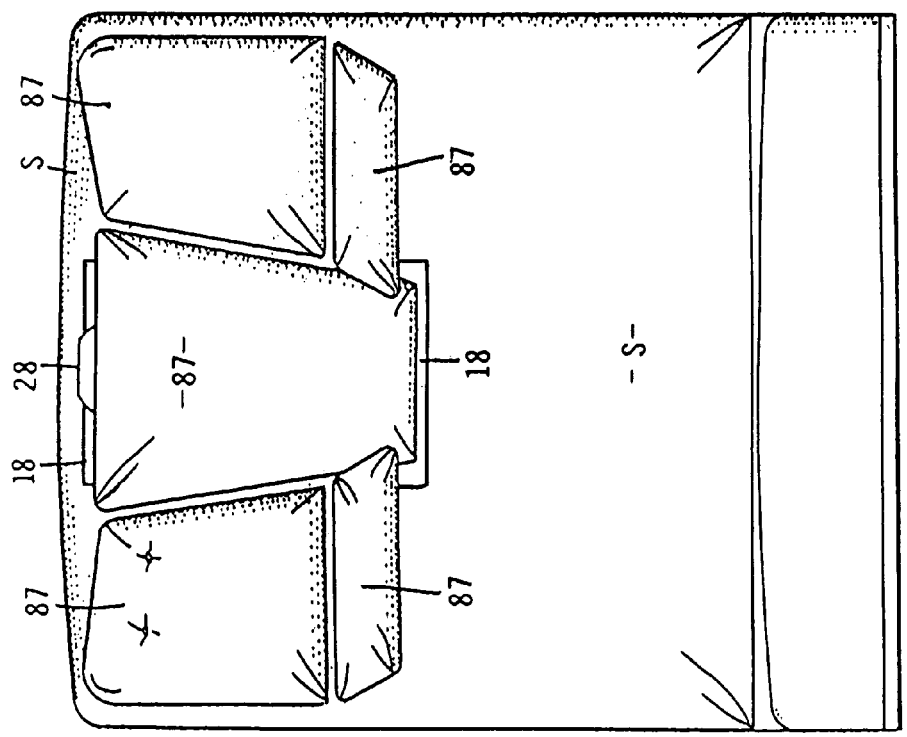
FIG. 14 is a front view of the apparatus shown in FIG. 12 as it appears when affixed to a seat.

Turning next to FIGS. 12 through 16, an alternate form of the headrest apparatus of the present invention is there illustrated. This form of the invention is similar in many respects to that illustrated in FIGS. 1 through 11 and previously described herein. Because of the similarity of these embodiments, like numbers are used in FIGS. 12 through 16 to identify like components. The principal difference between this latest embodiment of the invention and that earlier described resides in the fact that inflatable cushions or air bags are attached to the various support components that make up the headrest assembly. More particularly, as shown in FIG. 12, three inflatable air bags or bladders 70, 71, and 72 are interconnected with the lower portion of support member 30, while a single air bag 74 is affixed to each of the side panels 40 and 42. In similar fashion, first and second air bags or bladders 76 and 78 are attached to each of the chin support members 48 and 50. Air bags 70, 71, and 72 are disposed below a main cushion 80 that is affixed to the upper portion of support member 30. Similarly, air bag 74 is positioned below a larger support cushion 82 that is affixed to side wing 40 while inflatable air bag 74 is disposed beneath a larger cushion 84 that is affixed to side wing 42. Cushions 82 and 84 can be of a conventional padded cushion construction, or, if desirable, could also be inflatable bladder components. When installed to the support component in the manner illustrated in FIG. 12, the supporting cushions and inflatable air bags are covered by a conventional upholstery cover 87 so that the assembly takes on the finished configuration shown in FIG. 14. Covering 87 can be of fabric or vinyl material and is suitably flexible to enable the inflation and deflation of the bladder component without unduly stressing the cover material. FIG. 15 illustrates the support assemblage shown in FIG. 14 in the upraised position wherein the support assembly has been moved to the uppermost position by sliding it along the sliding mechanism which is of the character previously described.

Figure 16:
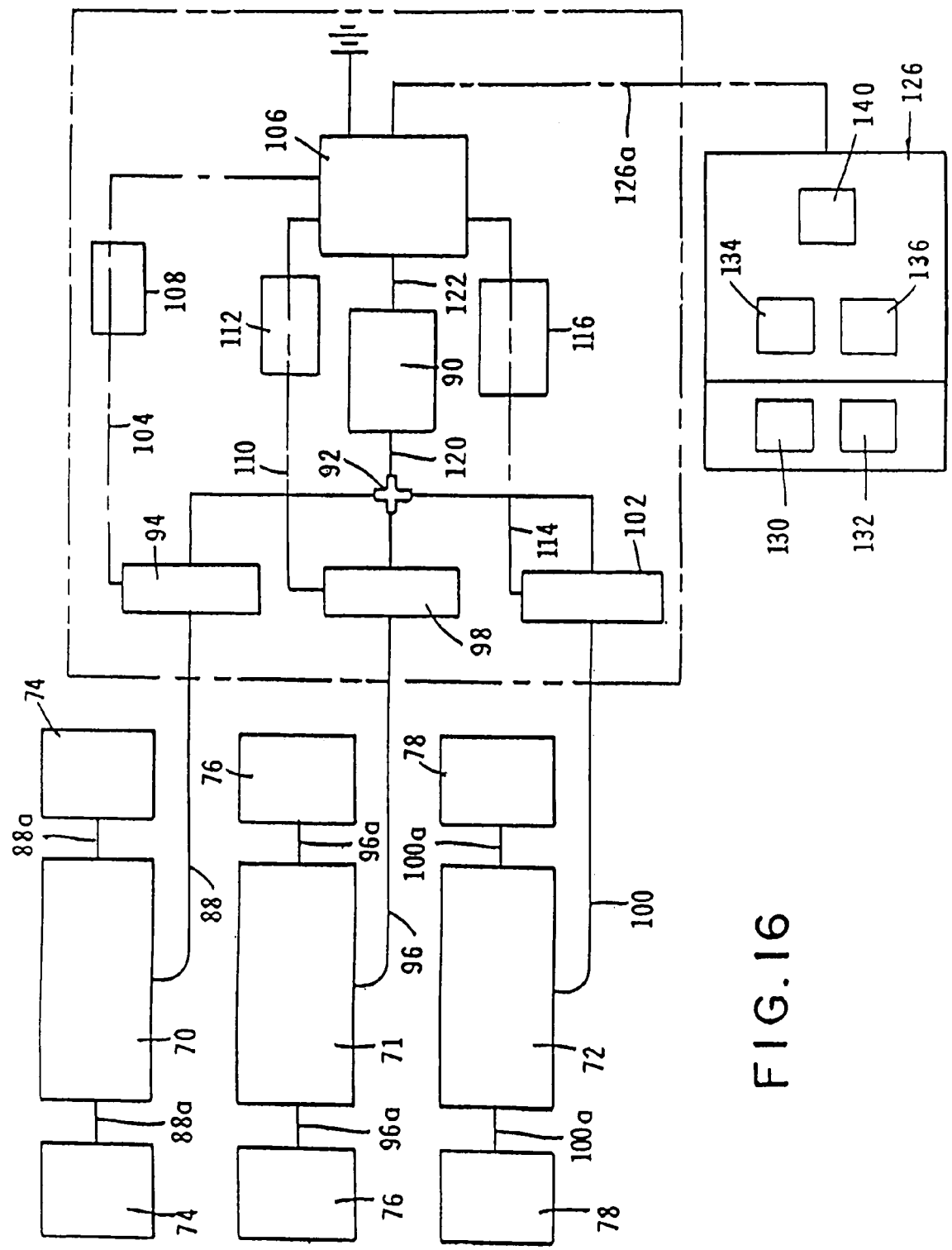
FIG. 16 is a generally schematic, block diagram view showing the various components that make up the control means of the apparatus for inflating and deflating the air bags.

Referring to FIG. 16, one form of the control system, or control means of the invention for operating the air bags, or inflatable cushions, is there illustrated in schematic form. Shown in the left-hand portion of FIG. 16 are the inflatable bladders that have been previously identified and that are connected to the left, center and right support members. As indicated in FIG. 16, central bladder 70 is interconnected by means of a pneumatic hose 88 with an air pump 90 via a pneumatic junction 92 and a first solenoid valve 94. Bladders 74 are, in turn, connected to bladder 70 by pneumatic hoses 88a. Similarly, inflatable bladder 71 is interconnected by means of a pneumatic hose 96 with pump 90 via pneumatic junction 92 and a second solenoid valve 98. Bladders 76 are, in turn, connected to bladder 71 by pneumatic hoses 96a. In similar manner, inflatable bladder 72 is interconnected by means of a pneumatic hose 100 with air pump 70 via pneumatic junction 92 and a third solenoid valve 102. Bladders 78 are, in turn, connected to bladder 72 by pneumatic hoses 100a. First solenoid valve 94 is interconnected by means of an electric connector 104 with the central processing unit 106 of the apparatus via a first relay 108. Similarly, second solenoid 98 is interconnected by means of an electrical conduit 110 with central processing unit 106 via a second relay 112. In similar manner third solenoid valve 102 is interconnected by means of an electrical conduit 114 with central processing unit 106 via a third relay 116. Air pump 90 is interconnected with pneumatic junction 92 by means of an air hose 120. Motor pump 90 is also operably interconnected with central processing unit 106 by an electrical connector 122. Central processing unit 106 is of a conventional construction that is readily commercially available and is powered by a conventional external power source. Similarly pump 90, pneumatic junction 92, as well as the solenoids and relays that make up the control system are well understood by those skilled in the art and are also readily commercially available.

Central processing unit 106 is operably interconnected by an electrical connector 126a with an occupant control means, shown here as a control panel 126. In the form of the invention shown in FIG. 16, occupant control panel 126 includes an inflate switch 130 for use in inflating the bladders and a deflate switch 132 for use in deflating the bladders. Also provided on occupant panel 126 is an on/off massage switch 140 that can be manipulated to cause a massaging type action to be imparted to the passenger by the sequential inflation and deflation of the air bags or bladders that are affixed to the various support members. Switch 140 is operably coupled with switches 134 and 136 to enable faster and slower massage cycle rates. With the construction shown in FIG. 16, the inflatable air bags, or bladders, can be inflated or deflated independently either in series or in parallel for the purpose of controlling bladder firmness or for performing an upper back, neck, face and head message cycle for a preprogrammed time in accordance with a program contained within central processing unit 106. Once again, switches 130, 132, 134, and 136 are of a conventional design well understood by those skilled in the art.

Motor pump 90 can be powered by an existing seat power supply as, for example, a seat controller lumbar controller, seat motor controller or the like, or it may be powered by a power supply interconnected with and dedicated to motor pump 90. It is to be understood that the electrical and pneumatic interconnection shown schematically in FIG. 16 is well understood by those skilled in the art as is the necessary programming of central processing unit 106 to accomplish the desired inflation and deflation sequencing of the various air bags or bladders.

For certain end use application, central support member 30 can be provided with a greater or lesser number of inflatable air bags. Similarly, side panels 40 and 42 may have more than one air bag and chin support member 48 can be provided with one, two or more inflatable bladders as may be desired by the system designer. Similarly the occupant control panel can be designed to accommodate more or less inflatable bladders and may also be designed to cooperate with the central processing unit to accomplish various other inflation/deflation and message type cycles as may be desired for the particular vehicle in which the apparatus is installed.

Figure 17:
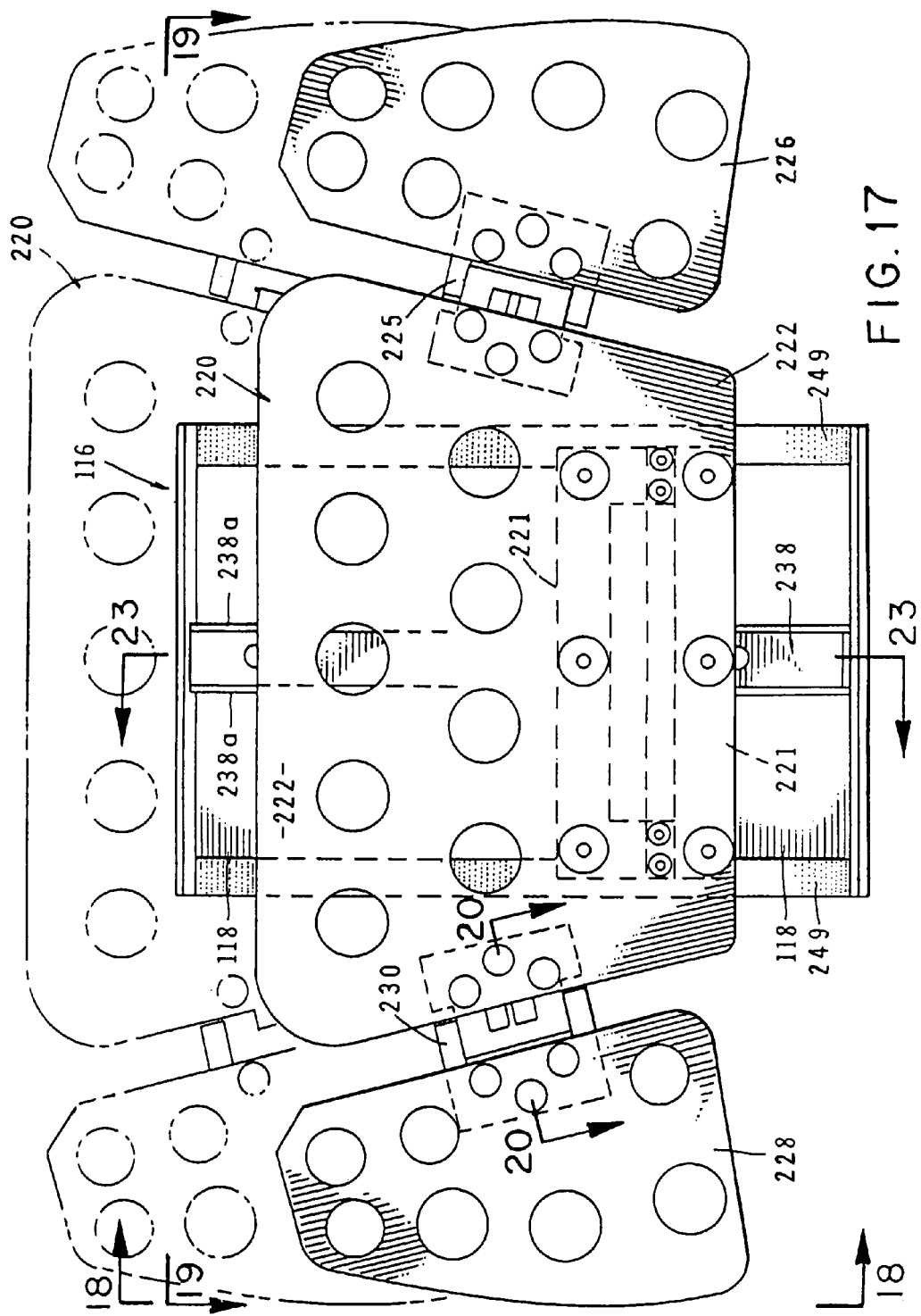
FIG. 17 is a front view of an alternate form of seat headrest construction of the present invention.

Referring next to FIGS. 17 through 26, an alternate form of seat headrest of the invention is there illustrated and generally designated by the numeral 114. This latest embodiment of the invention comprises a seat connector assembly 116 that includes a generally planar first connector member 118 that is connected to the seat "S" by any suitable means. Slidably connected to first connector member 118 for movement between a first lowered position shown by the solid lines in FIG. 17 to an upraised position shown by the phantom lines in FIG. 17 is a head support assembly 220 (see also FIG. 26).

As best seen in FIG. 24, head support assembly 220 includes a carriage assembly 221 to which a generally planar central support member or panel 222 is pivotally connected by means of a constant torque hinge 224 (FIG. 19). Connected to central support panel 222 by a constant torque hinge 225 is a first lateral or side panel 226, which is pivotally movable, a first position wherein it is substantially coplanar with central support panel 222 to a second angularly extending forward position. In similar fashion a second or lateral side panel 228 is connected to the opposite side of central support member 222 by a constant torque hinge 230 that is of identical construction to constant torque hinge 225. Side panel 228 is also pivotally movable from a substantially coplanar position with central support panel 222 to an angularly outwardly extending position. When side panel's 226 and 228 are pivoted into the angularly outwardly extending position, they provide a comfortable lateral support to the passenger's head "H" in the manner shown in FIG. 2. Constant torque hinges 225 and 230 are readily commercially available and function to maintain the side panels in a position desired by the user until a substantial force is exerted on the hingedly connected member to positively move it into a different position. As before, use of these constant torque hinges overcomes a common drawback of prior art headrest construction in which the hingedly connected members tend to undesirably move as a result of vibration or other environmental forces.

Figure 18:
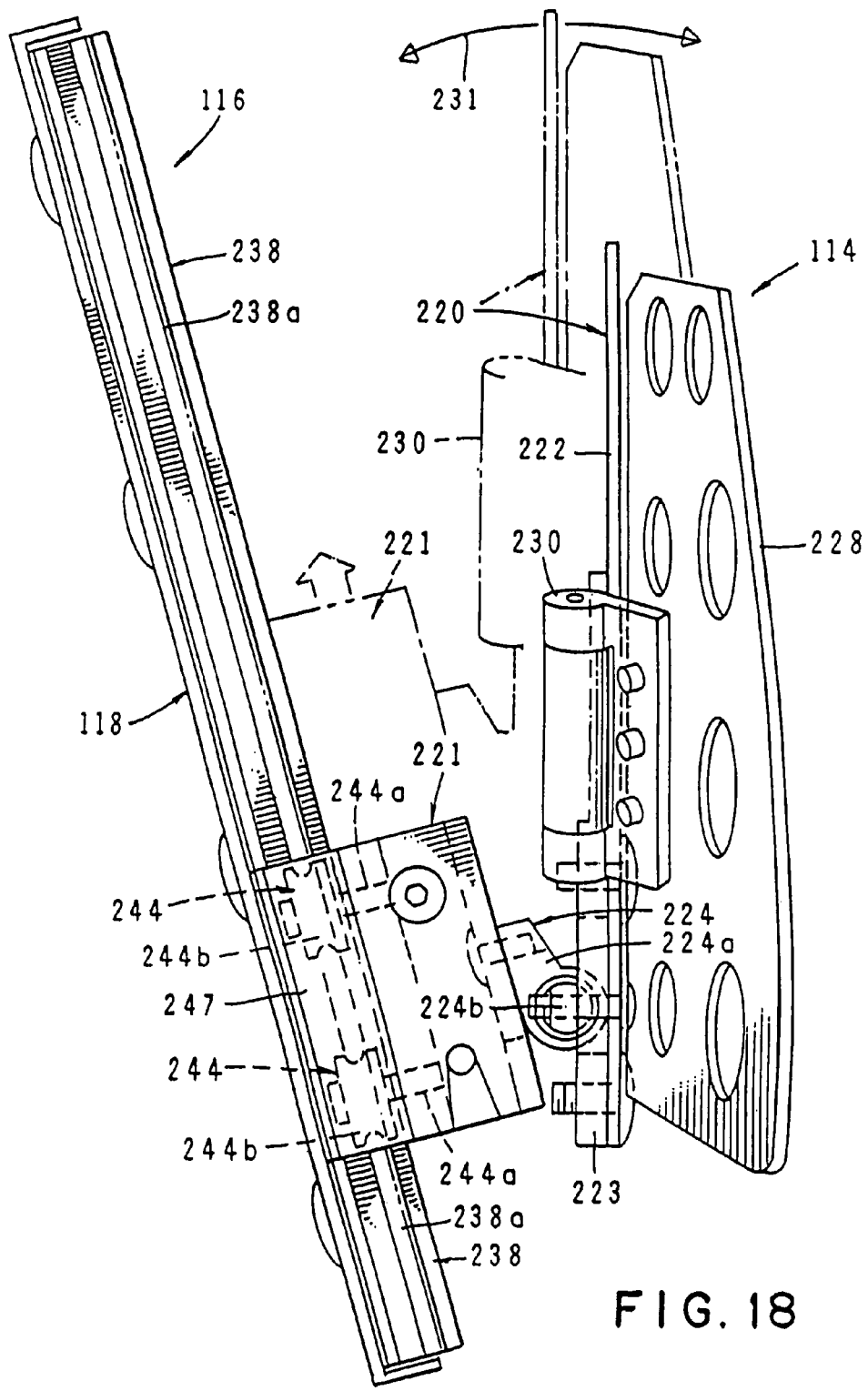
FIG. 18 is a view taken along lines 18-18 of FIG. 17.

As indicated by the arrow 231 in FIG. 18, constant torque hinge 224 permits the headrest assembly 220 to be adjustably pivoted both forwardly and rearwardly relative to the seat connector assembly 116. Constant torque hinge 224, which is readily commercially available from several commercial sources, including Torqmaster, International of Stamford, Conn., functions to maintain the headrest assembly 220 in a position desired by the user until a substantial force is exerted on the headrest assembly to positively move it into a different position. As shown in FIGS. 20 and 23, hinge 224 is mounted on a plate 233 and includes a housing 224a that carries a steel shaft 224b that, in turn, carries a plurality of spring steel friction bands 224c that function to controllably resist rotation of plate 223 and panel 222 that is attached thereto relative to connector assembly 116.

Connected to seat connector member 118 is an elongated guide 238 that includes oppositely disposed guide rails 238a (FIG. 19) that are adapted to be rollably engaged by two pairs of spaced apart roller assemblies 244 that are mounted on carriage assembly 221. The roller assemblies 244, each of which are of identical construction, include a threaded connecting shaft 244a that is threadably connected to carriage assembly 221 and a grooved roller 244b that is rotatably mounted on shaft 244a. With this construction, carriage assembly 221 along with headrest assembly 220 can be adjustably moved upwardly and downwardly relative to seat connector member 118 so as to enable the desired adjustment in the height of the headrest assembly relative to the seat connector member.

Forming and important aspect of the headrest assembly of this latest form of the invention is resistance imparting means for imparting resistance to the movement of headrest assembly 220 upwardly and downwardly relative to connector member 118. In the present form of the invention, this novel resistance imparting means comprises a uniquely configured leaf spring designated in the drawings by the numeral 247. As best seen in FIGS. 22 and 24, spring 247 includes a central portion 247a that is affixed to carriage assembly 221 in the manner shown in the drawings. Spring member 247 also includes a pair of outwardly extending yieldably deformable side members 274b that are connected to central portion 247a. Each of the side members 247b terminates in a surface engaging portion 247c. As best seen in FIG. 24, when the resistance means is fully assembled portions 247c are substantially parallel to central portion 247a. With this construction, when carriage assembly 221 is interconnected with seat connector member 118 in the manner shown in FIG. 24, spring member 247 will be yieldably deformed in the manner shown in FIG. 24 so that surface engaging portions 247 are brought into pressural engagement with seat connector member 118. As the headrest assembly is moved upwardly and downwardly in the manner indicated in FIG. 26, surface engaging portions 247c will frictionally engage the outer surface of connector member 118 and will yieldably resist sliding movement of carriage assembly 221 relative to seat connector member 118. In the preferred form of the invention a plastic film 249 is disposed between surface engaging portions 247c and connector member 118 so as to insure smooth sliding of the headrest assembly relative to the connector member.

Figure 27:
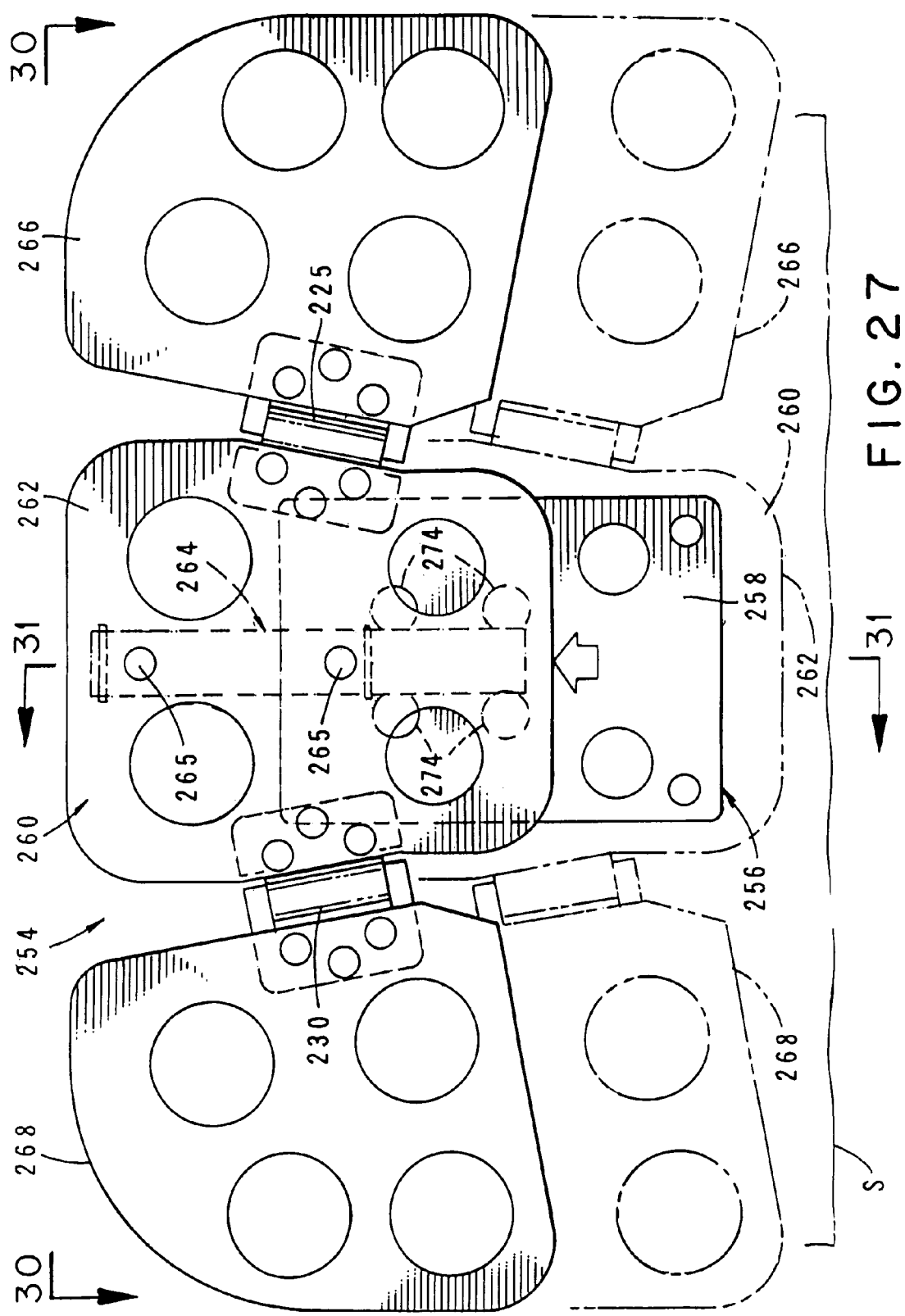
FIG. 27 is front view of an alternate form of the headrest assembly of the present invention.
Figure 28:
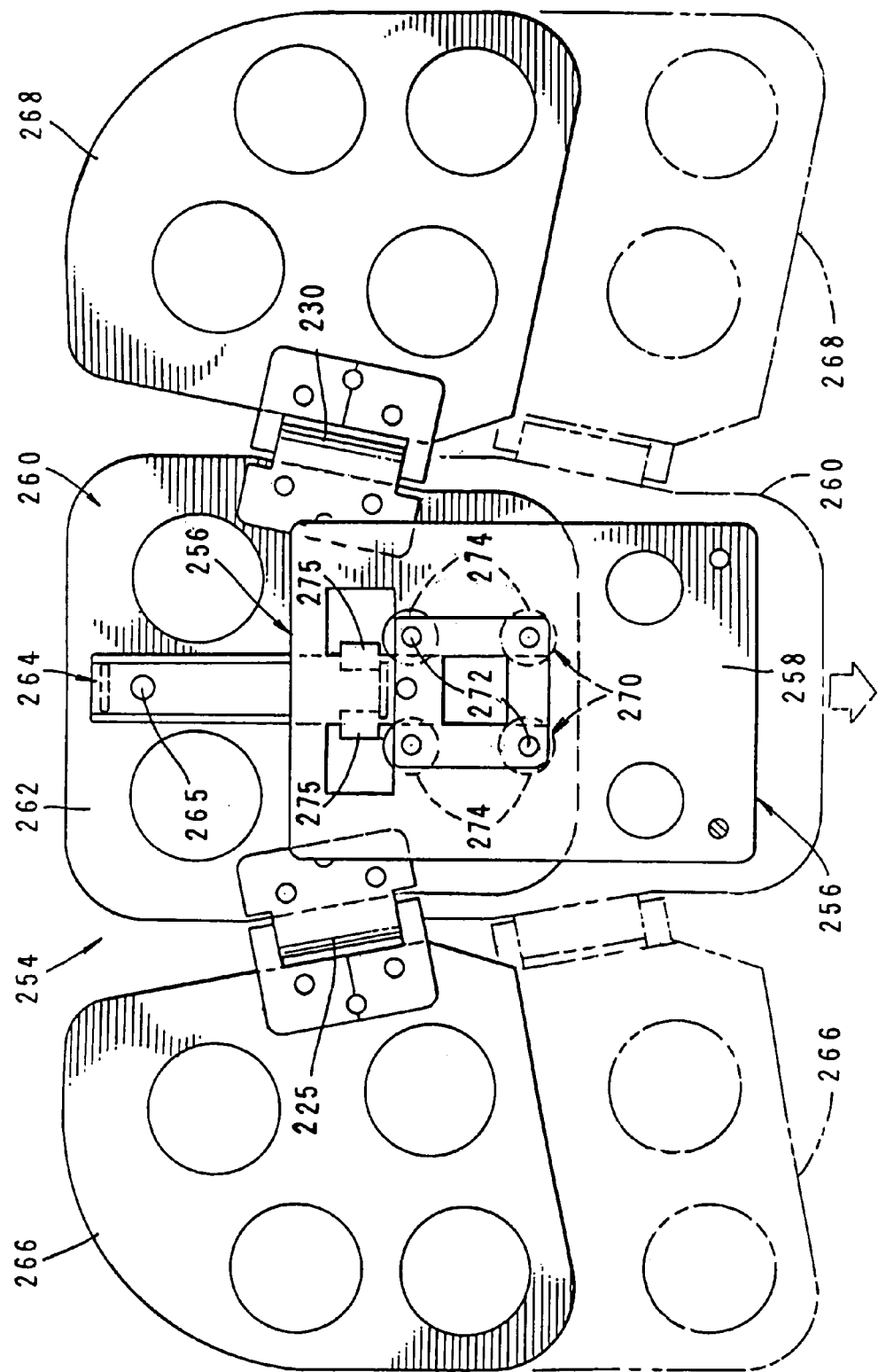
FIG. 28 is a rear view of the alternate form of the headrest assembly of the invention shown in FIG. 27.
Figure 29:
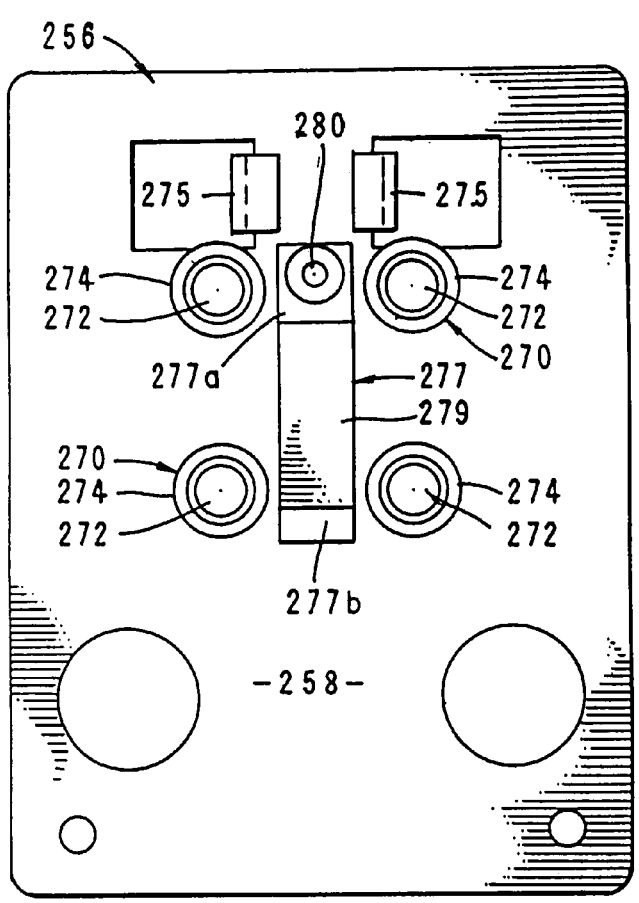
FIG. 29 is a plan view of the seat connector assembly of the apparatus that interconnects the headrest assembly with the aircraft seat.

Turning now to FIGS. 27 through 35, still another form of seat headrest of the invention is there illustrated and generally designated by the numeral 254. This latest embodiment of the invention is similar and several respects to the earlier described embodiments and like to numerals are used in FIGS. 27 through 36 to identify like components. This latest embodiment of the invention comprises a seat connector assembly 256 (FIG. 29) that includes a generally planar first connector member 258 that is connected to the seat "S" by any suitable means. Slidably connected to first connector member 258 for movement between a first lowered position shown by the phantom lines in FIGS. 27 and 28 and an upraised position shown by the solid lines in FIGS. 27 and 28 is a head support assembly 260 (see also FIG. 31).

Figure 31:
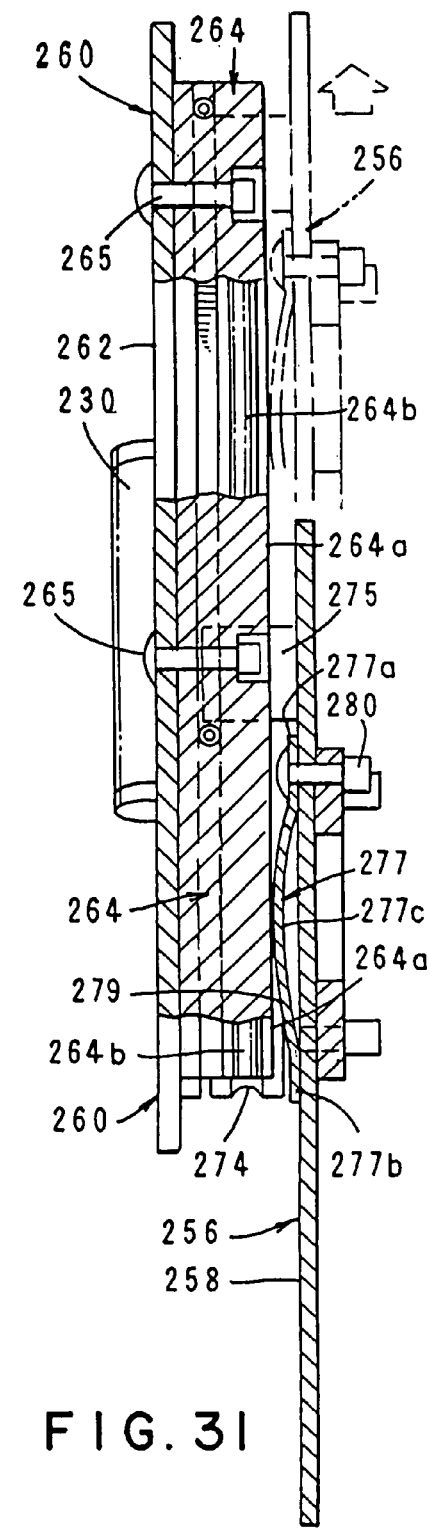
FIG. 31 is a cross-sectional view taken along lines 31-31 of FIG. 27.
Figure 33:
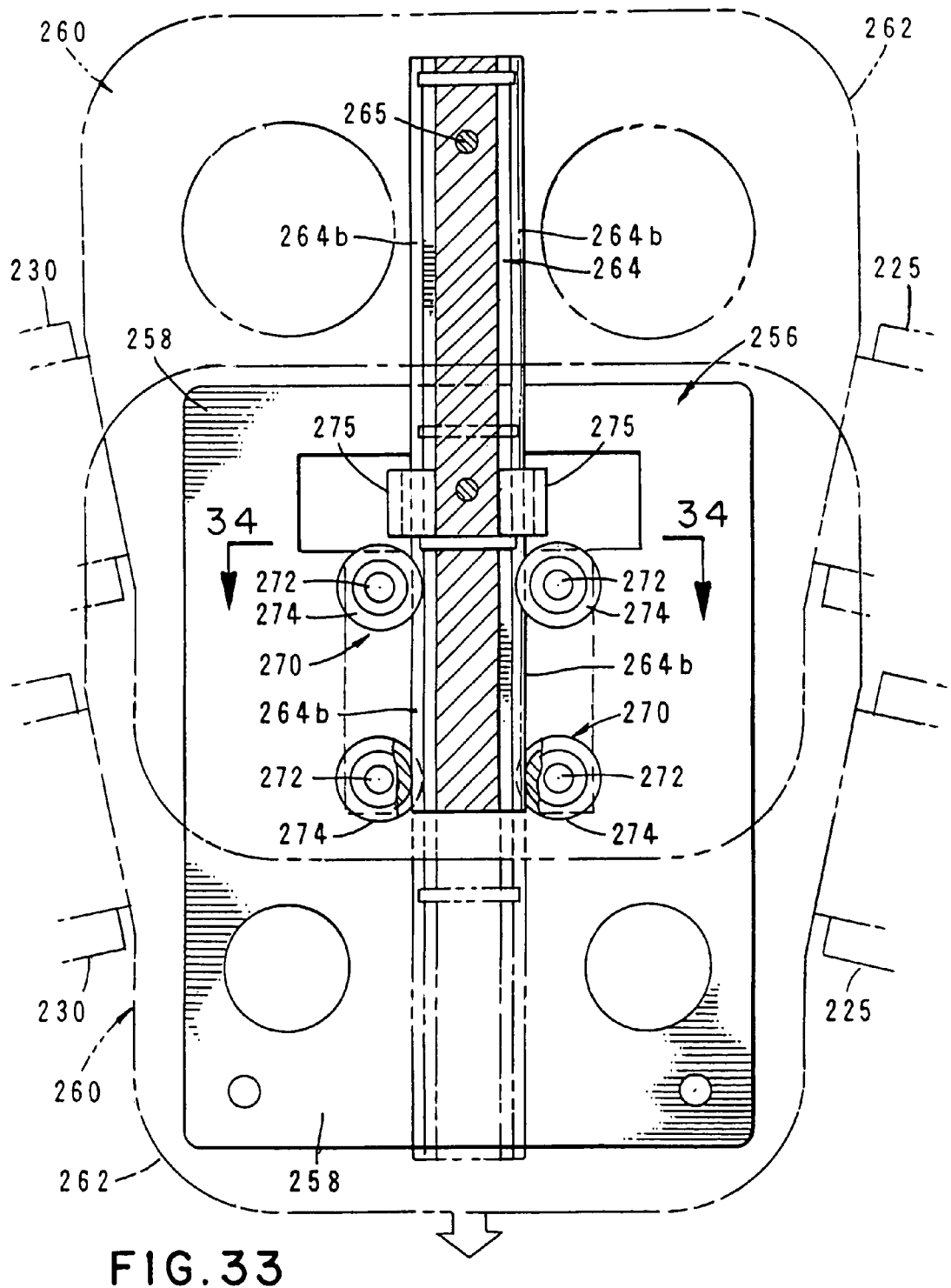
FIG. 33 is a cross-sectional view taken along lines 33-33 of FIG. 30.

As best seen in FIGS. 27, 28 and 30, head support assembly 260 includes a generally planar central support member or panel 262 to which an elongated guide member 264 is connected by means of connectors 265 (FIG. 31). A first lateral or side panel 266 is pivotally connected to the central support member by means of a constant torque hinge 225. Also connected to central support panel 262 by a constant torque hinge 230 is a second lateral or side panel 268. As indicated in FIG. 30, side panels 266 and 268 are pivotally movable, a first position shown by solid lines in FIG. 30 wherein they are substantially coplanar with central support panel 262 to a second angularly extending forward position shown by phantom lines in FIG. 30. When side panel's 266 and 268 are pivoted into the angularly outwardly extending position, they provide a comfortable lateral support to the passenger's head in the manner previously described and as shown in FIG. 2.

The earlier identified elongated guide member 264 includes oppositely disposed guide rails 264a (FIGS. 33, 34 and 35) that are adapted to be rollably engaged by two pairs of spaced apart roller assemblies 270 that are mounted on connector member 258. The roller assemblies 270, each of which are of identical construction, include a connecting shaft 272 that is connected to connector member 258 and a grooved roller 274 that is rotatably mounted on shaft 272 (FIG. 34). With this construction the headrest assembly 260 can be adjustably moved upwardly and downwardly relative to seat connector member 258 so as to enable the desired adjustment in the height of the headrest assembly relative to the seat connector member. As the headrest assembly is moved upwardly and downwardly, guide means, shown here as a pair of internal ears 275 formed on support member 258 (FIG. 30), slidably engage guide member 267 to guide the travel of the headrest assembly.

Figure 32:
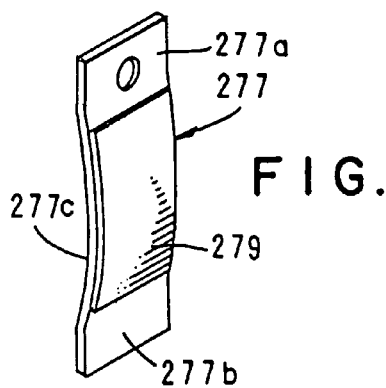
FIG. 32 is a generally perspective view of the resistance imparting means of this latest form of the invention.

Forming and important aspect of the headrest assembly of this latest form of the invention is resistance imparting means for imparting resistance to the movement of head rest assembly 260 upwardly and downwardly relative to connector member 258. In the present form of the invention, this novel resistance imparting means comprises a uniquely configured leaf spring designated in the drawings by the numeral 277. As best seen in FIGS. 31 and 32, spring 277 includes a first end portion 277a that is connected to support member 258 by a connector 280 (FIG. 31), a free end portion 277b and a yieldably deformable, outwardly curved central portion 277c. As indicated in FIG. 31, when the headrest assembly of the invention is fully assembled, central portion 277c of the spring is in pressural engagement with the front surface, or face, 264a of guide 264. More particularly, when the headrest assembly 260 is interconnected with seat connector member 258 in the manner shown in FIG. 31, spring member 277 will be yieldably deformed in the manner shown in FIG. 31 so that central portion 277c is brought into pressural engagement with face 264a of the elongated guide 264. With this construction, as the headrest assembly is moved upwardly and downwardly in the manner indicated in FIG. 28, spring 277 will yieldably resist sliding movement of headrest assembly 260 relative to elongated guide 264 and seat connector member 258. In the preferred form of the invention a plastic film 279 is disposed between the central portion 277c and the face 264a of elongated guide 264 so as to insure smooth sliding of the headrest assembly relative to the connector member.

Turning now to FIGS. 36 through 44, yet another form of seat headrest of the invention is there illustrated and generally designated by the numeral 284. This latest embodiment of the invention is similar in several respects to the embodiment of the invention illustrated in FIGS. 27 through 35 and like to numerals are used in FIGS. 27 through 44 to identify like components. The primary difference between this latest embodiment of the invention and that illustrated in FIGS. 27 through 35, resides in the fact that the head support assembly is both vertically and pivotally movable relative to the seat connector assembly.

As before, this latest embodiment of the invention comprises a seat connector assembly 286 (FIG. 40) that includes a generally planar first connector member 288 that is connected to the seat "S" by any suitable means. As before, a head support assembly 290 is slidably connected to first connector member 288 for movement between a first lowered position and an upraised position (see FIG. 44). As best seen in FIGS. 36 and 37, head support assembly 290 includes a generally planar central support member or panel 292 to which an elongated guide member 294 is connected by means of connectors 295a, 295b and 295c (FIG. 36). A first lateral or side panel 296 is pivotally connected to the central support member by means of a constant torque hinge 225. Also connected to central support panel 292 by a constant torque hinge 230 is a second lateral or side panel 298. As indicated by the phantom lines in FIG. 37, side panels 296 and 298 are pivotally movable, a first position shown by solid lines in FIG. 37 wherein they are substantially coplanar with central support panel 292 to a second angularly extending forward position shown by phantom lines in FIG. 37. When side panels 296 and 298 are pivoted into the angularly outwardly extending position, they provide a comfortable lateral support to the passenger's head in the manner previously described and as shown in FIG. 2.

Figure 44:
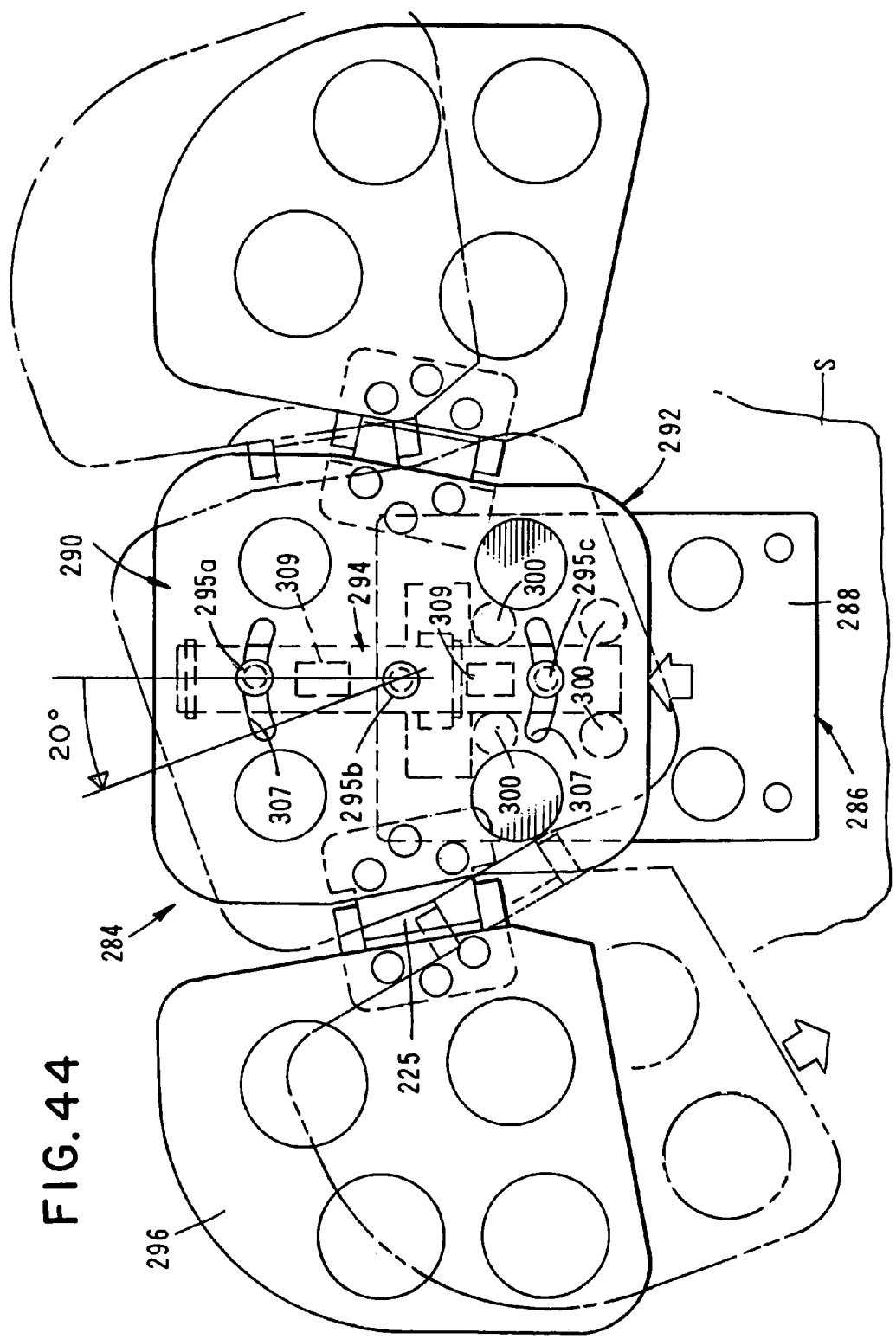
FIG. 44 is a front view similar to FIG. 43, further illustrating the pivotal movement of the headrest relative to the mounting component.

The earlier identified elongated guide member 294 includes oppositely disposed guide rails 294a (FIGS. 37 and 40) that are adapted to be rollably engaged by two pairs of spaced apart roller assemblies 300 that are mounted on connector member 288. The roller assemblies 300, each of which are of identical construction, include a connecting shaft 302 that is connected to connector member 288 and a grooved roller 304 that is rotatably mounted on shaft 302 (FIG. 37). With this construction, as depicted in FIG. 44, the headrest assembly 290 can be adjustably moved upwardly and downwardly relative to seat connector member 288 so as to enable the desired adjustment in the height of the headrest assembly relative to the seat connector member. As the headrest assembly is moved upwardly and downwardly, guide means, shown here as a pair of internal ears 275 formed on support member 288 (FIG. 37), slidably engage guide member 294 to guide the travel of the headrest assembly.

As in the earlier described embodiment of the invention, this latest form of the invention includes resistance imparting means for imparting resistance to the movement of head rest assembly 290 upwardly and downwardly relative to connector member 288. This resistance imparting means is identical in construction and operation to that previously described and comprises a uniquely configured leaf spring designated in the drawings by the numeral 277. When the headrest assembly of the invention is fully assembled, central portion 277c of the spring is in pressural engagement with the front surface, or face, 294a of guide 294(FIG. 38). With this construction, as the headrest assembly is moved upwardly and downwardly spring 277 will yieldably resist sliding movement of headrest assembly 290 relative to elongated guide 294 and seat connector member 288.

Figure 41:
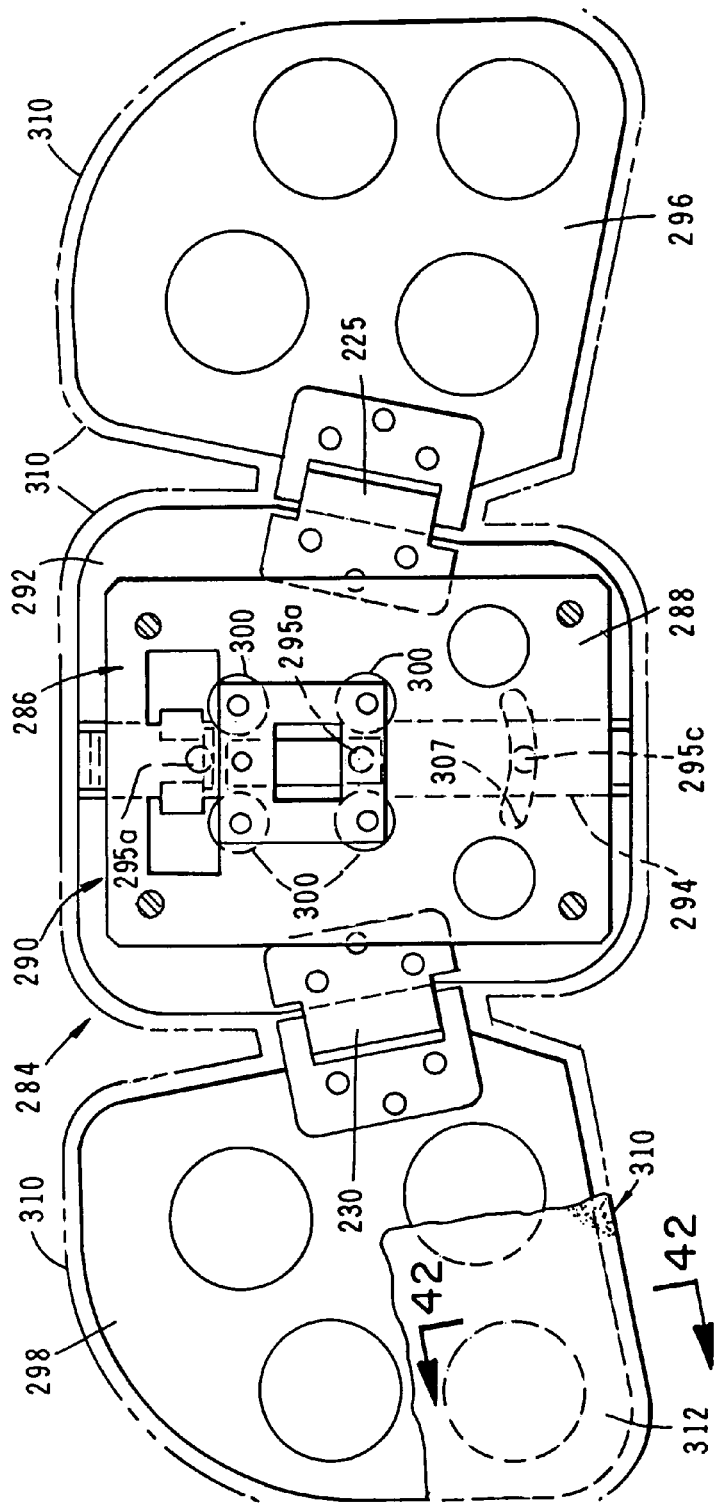
FIG. 41 is a rear view of the headrest assembly shown in FIG. 36. mounting component shown in FIG. 40.
Figure 42:
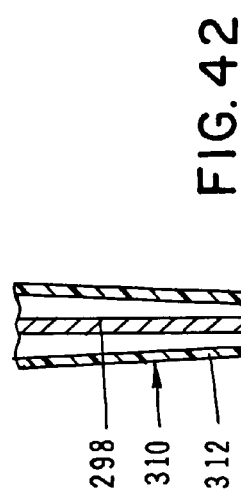
FIG. 42 is cross-sectional view taken along lines 42-42 of FIG. 41.
Figure 43:
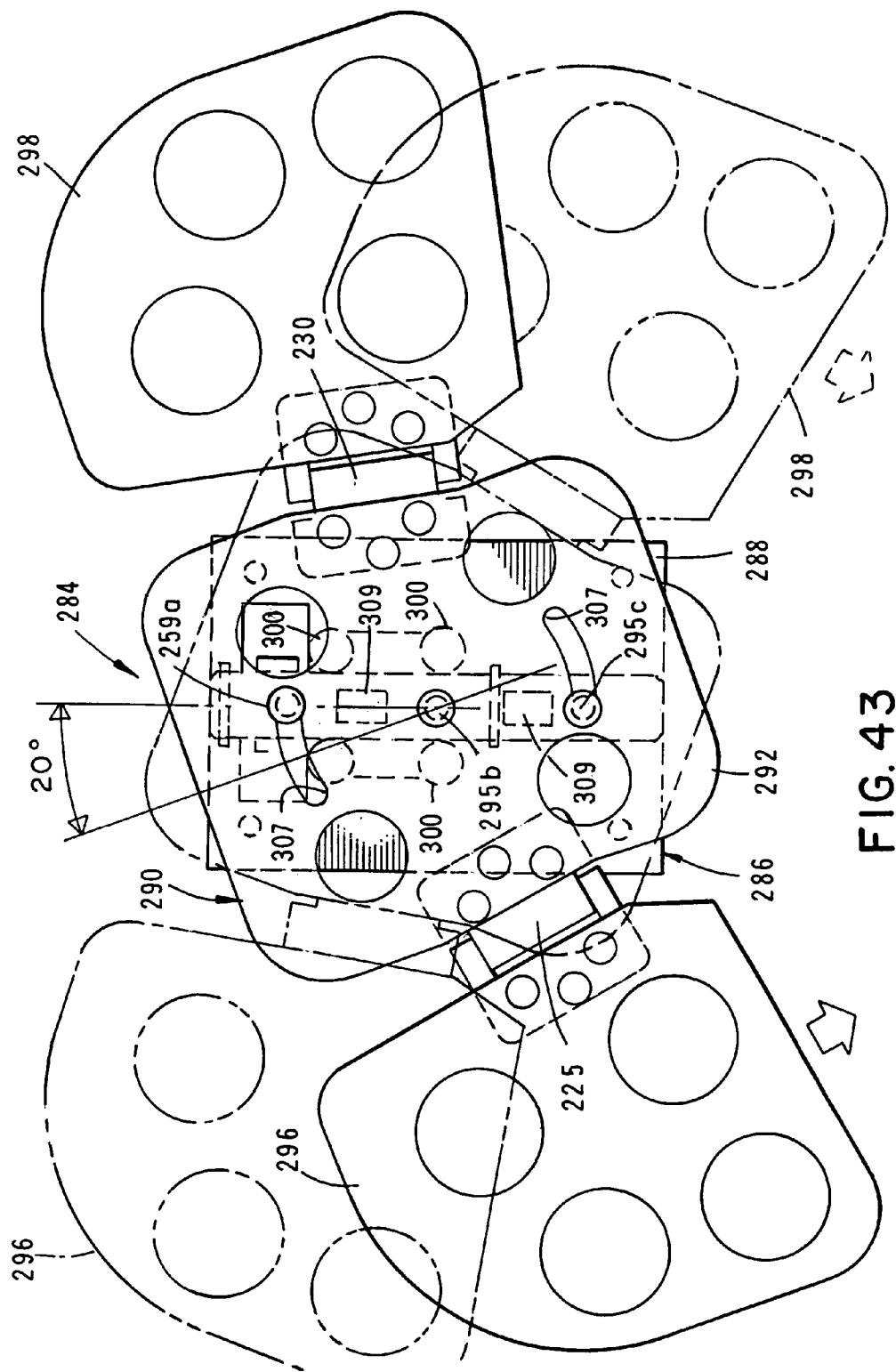
FIG. 43 is a front view similar to FIG. 36 illustrating the pivotal movement of the headrest relative to the mounting component.

As previously mentioned, an important feature of this latest form of the invention resides in the fact that the entire headrest assembly 284 is pivotally movable relative to guide 294 and relative to seat connector 288 from the first position shown in FIG. 41 to the second position shown by the solid lines in FIG. 43 and to the third position shown by the phantom lines in FIG. 43. More particularly, as illustrated in FIGS. 43 and 44 the entire headrest assembly 284 can be pivoted about connector member 295b through an angle of approximately 20 degrees. As the headrest assembly is so pivoted, connector members 295a and 295c travel within generally arcuate shaped slots 307 formed in plate 292. With this unique construction, the headrest assembly can be selectively positioned so that the passenger can comfortably rest his or her head on a selected one of the angularly inclined side wings 296 and 298.

As best seen in FIG. 38, a second resistance imparting means is provided to frictionally resist arcuate movement of the headrest assembly. This second resistance imparting means here comprises a plurality of spaced apart, uniquely configured leaf springs designated in the drawings by the numeral 309. When the headrest assembly of the invention is fully assembled, the central portions of these springs are in pressural engagement with the rear surface 292a of central panel 292 in the manner best seen in FIG. 38. With this construction, as the headrest assembly is pivoted about connector 295b, springs 309 will yieldably resist sliding movement of headrest panel 292 relative to elongated guide 294 and thereby ensure smooth arcuate travel of the headrest assembly.

In this latest embodiment of the invention, one form of the headrest assembly also uniquely incorporates a massage systems generally designated in the drawings by the numeral 310. These systems, which are commercially available from Inseat Solutions, LLC of Costa Mesa, Calif., include An Electronic Vibratory System 312 or of the character manufactured and sold by Cascade Designs, LTD of Seattle, Wash. As indicated in the drawings, these novel massage systems are affixed to and encompasses the central and side panels of the headrest assembly (see particularly FIG. 42). When the massage system is affixed to the headrest it can be operated by the passenger as desired to provide a stimulating and satisfying massage or to conform to the passengers head.

Turning now to FIGS. 45 through 49, still another form of seat headrest of the invention is there illustrated and generally designated by the numeral 314. This latest embodiment of the invention is similar in several respects to the embodiment of the invention illustrated in FIGS. 36 through 44 and like to numerals are used in FIGS. 45 through 49 to identify like components. The primary difference between this latest embodiment of the invention and that illustrated in FIGS. 36 through 44, resides in the fact that the lateral or side panels 316 and 318 are fixedly connected to the central support member 320 and are not adjustable. As best seen by referring to FIG. 46, in this latest form of the invention the side panels 316 and 318 are integrally formed with central panel 320 and extend the angularly outwardly there from.

The seat connector assembly 286 of this latest embodiment is identical in construction and operation to that previously described and includes a generally planar first connector member 288 that is connected to the seat "S" by any suitable means. As before, a head support assembly is slidably connected to first connector member 288 for movement between a first lowered position and an upraised position (see FIG. 49).

Figure 47:
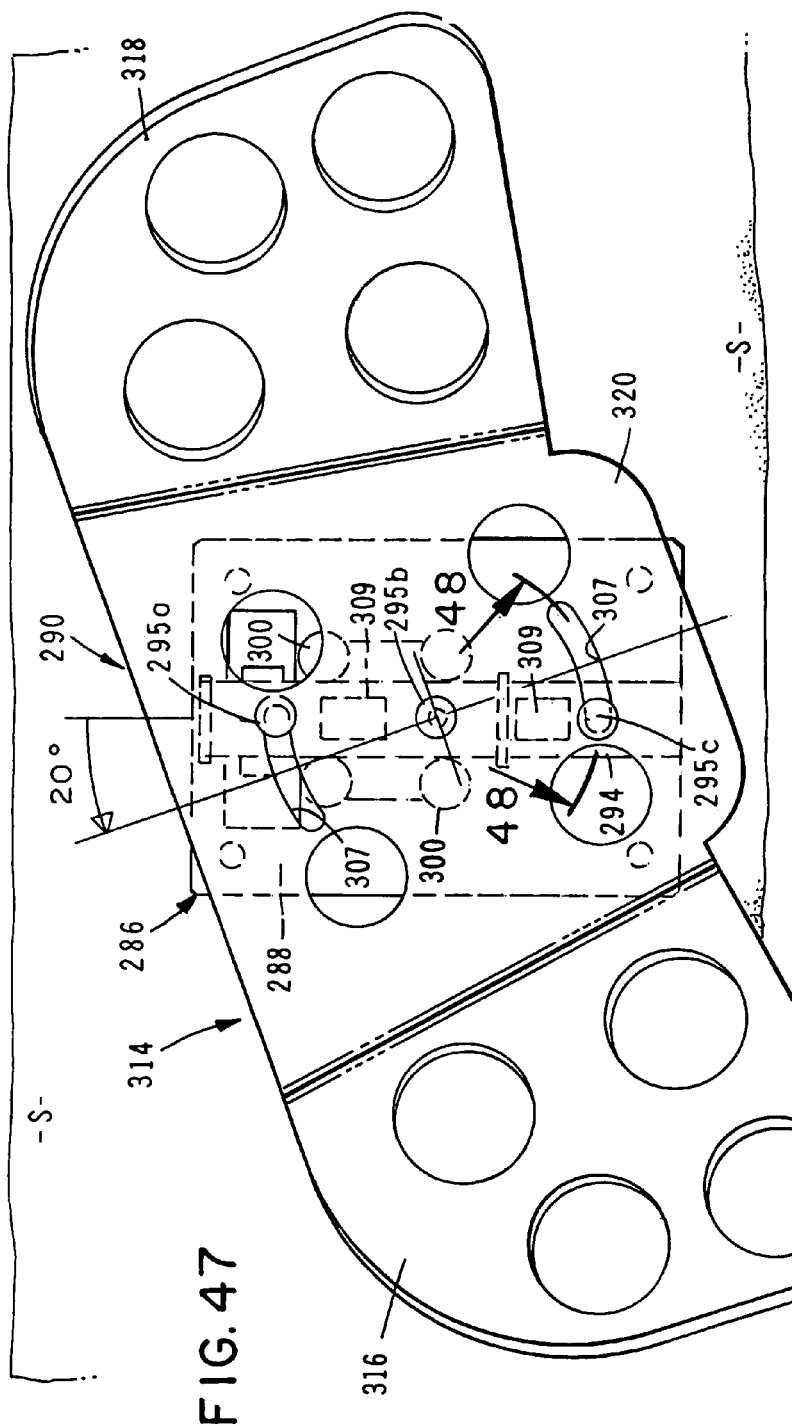
FIG. 47 is front view similar to FIG. 45 illustrating the pivotal movement of this latest form of the headrest relative to the mounting component.
Figure 48:
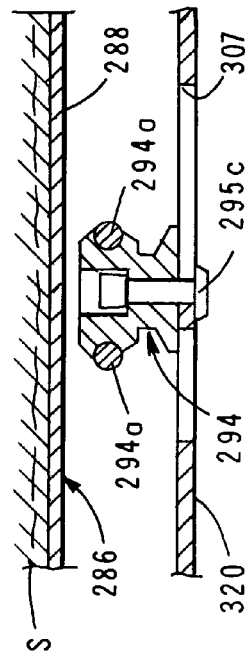
FIG. 48 is an enlarged cross-sectional view taken along lines 48-48 of FIG. 47.
Figure 49:
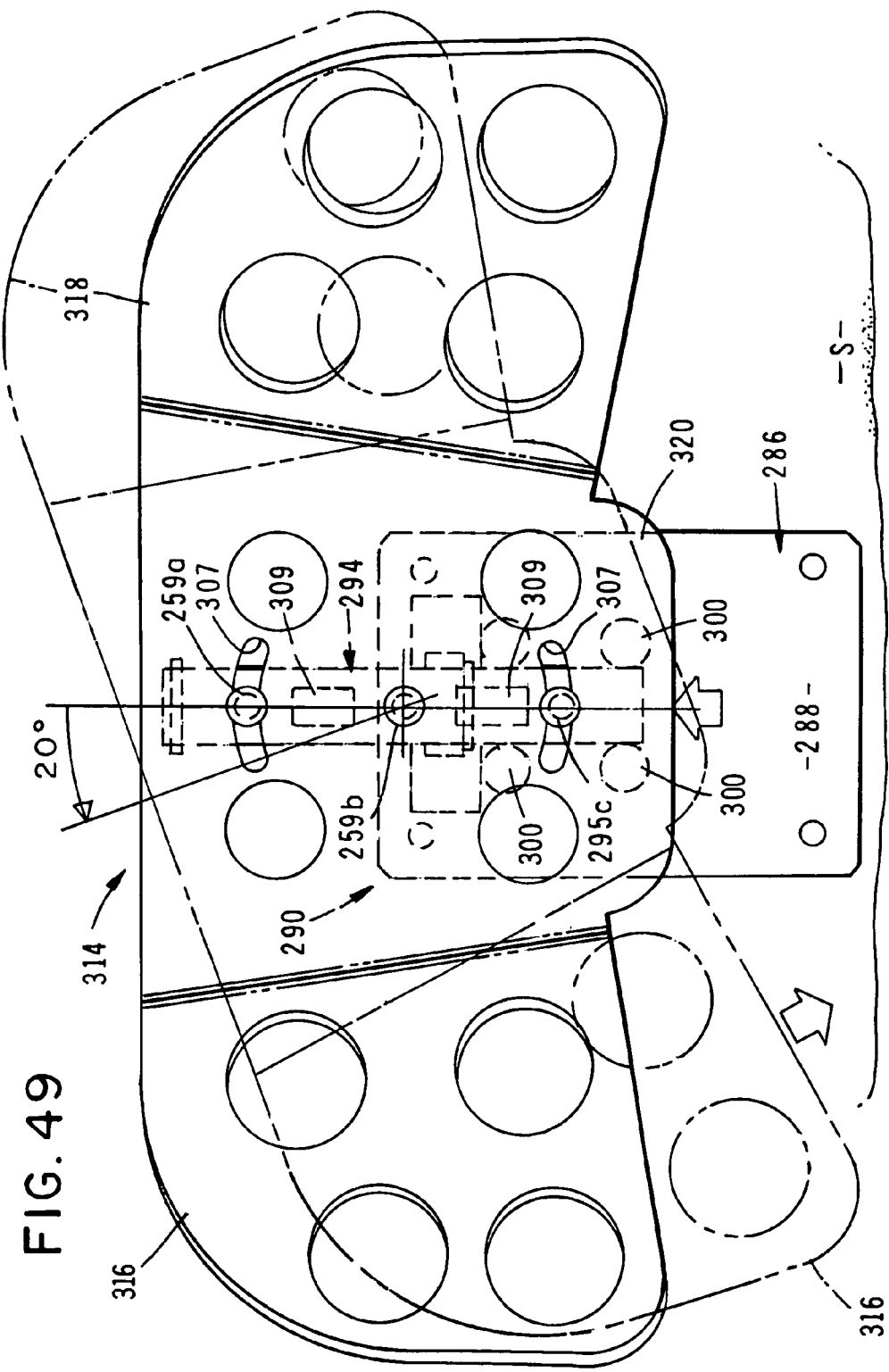
FIG. 49 is front view similar to FIG. 47 further illustrating the pivotal movement of this latest form of the headrest relative to the mounting component.
Figure 55:
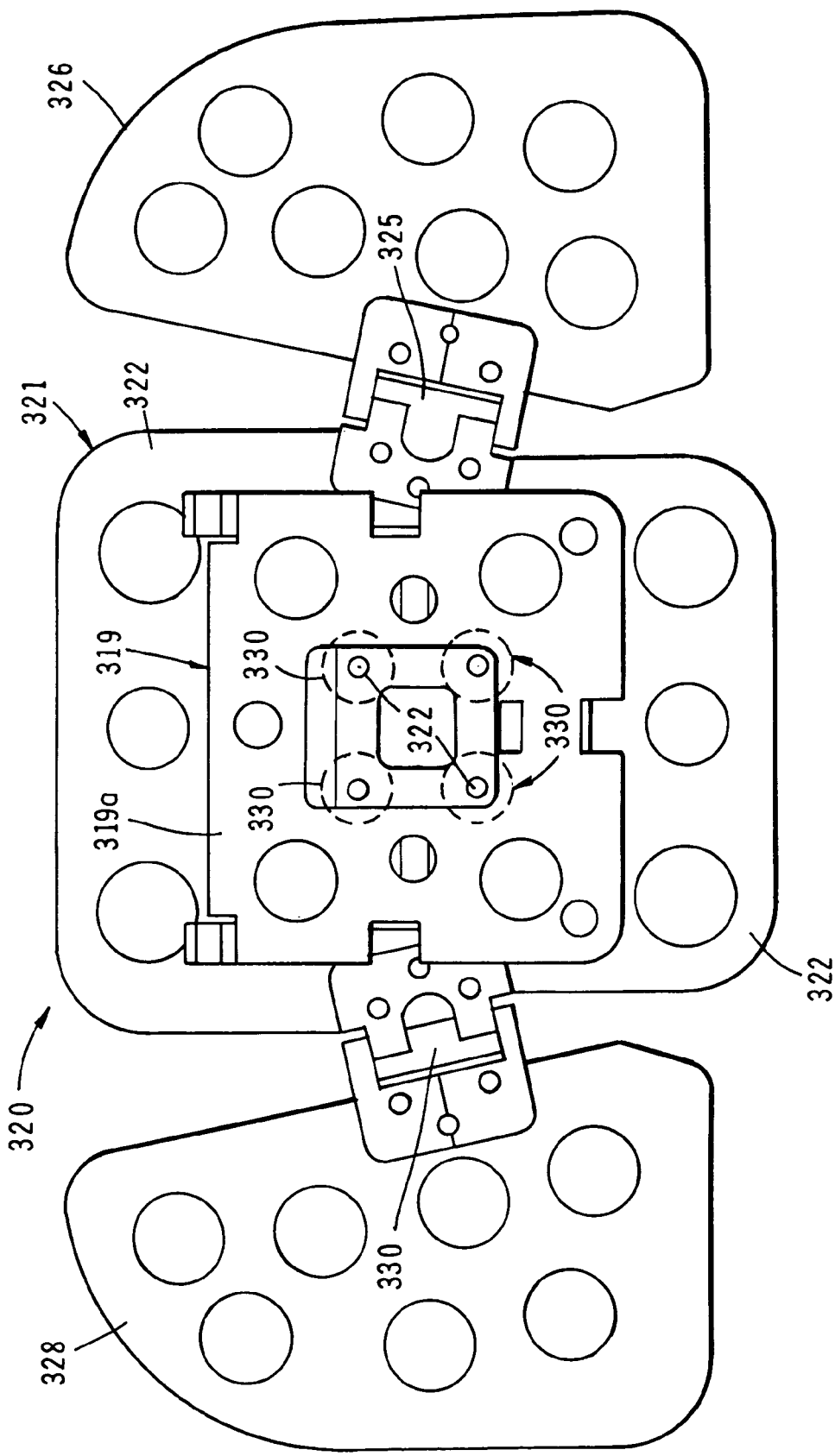
FIG. 55 is a rear view of the headrest assembly shown in FIG. 50.
Figure 56:
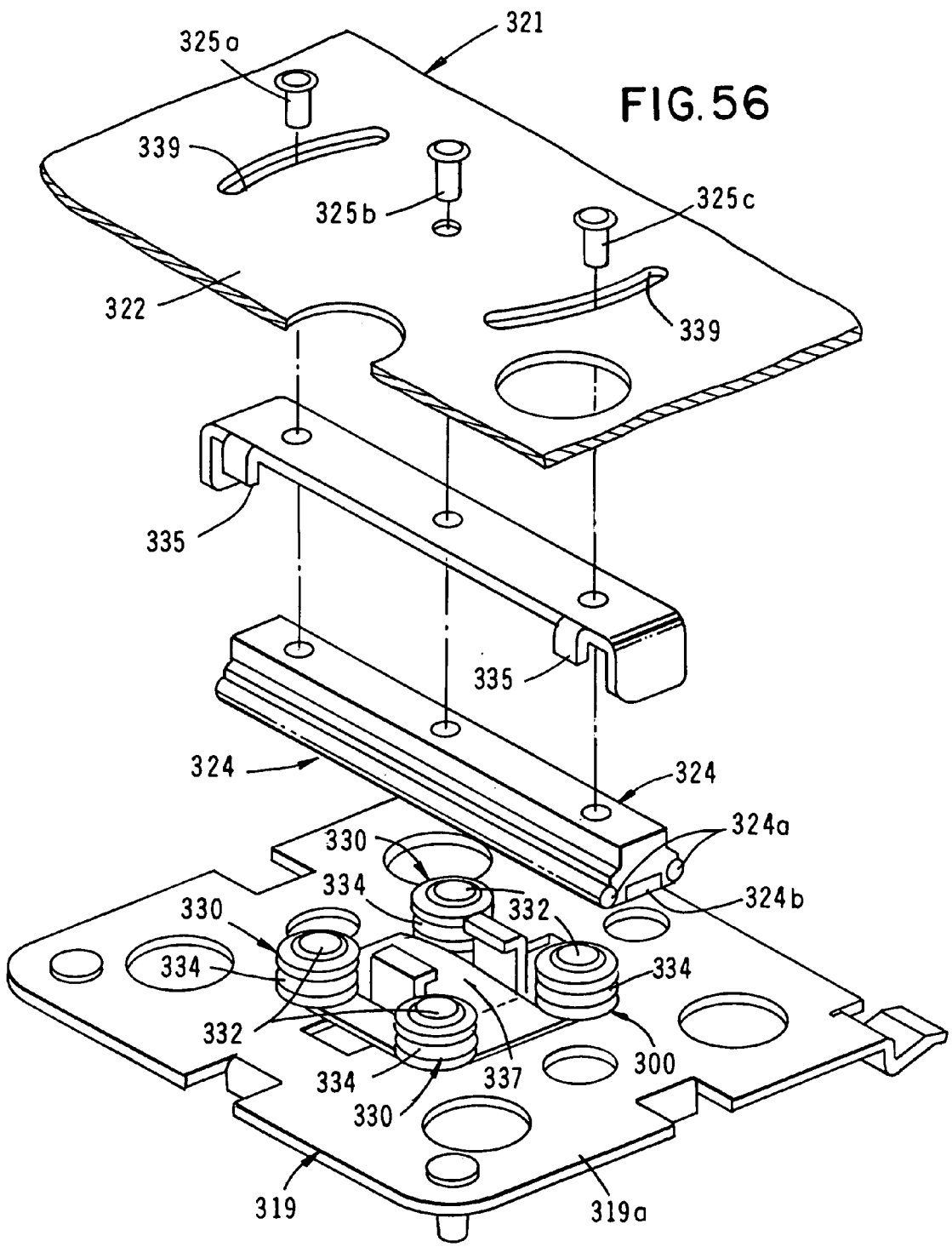
FIG. 56 is a fragmentary, generally perspective, exploded view of a portion of the headrest assembly of this latest form of the invention.

As in the last to be described embodiment of the invention the entire headrest assembly is pivotally movable relative to guide 294 and relative to seat connector 288 from the first position shown in FIG. 45 to the second position shown in FIG. 47. As before, the entire headrest assembly is also pivotally movable into third position in the manner previously described. shown by the phantom lines in FIG. 43. More particularly, as illustrated in FIGS. 47 and 49 the entire headrest assembly can be pivoted about connector member 295b through an angle of approximately 20 degrees. If desired, the headrest assembly can also incorporate a massage system or passage bladder of the character previously described.

As in the last to be described embodiment of the invention the entire headrest assembly is pivotally movable relative to guide 294 and relative to seat connector 288 from the first position shown in FIG. 45 to the second position shown in FIG. 47. As before, the entire headrest assembly is also pivotally movable into third position in the manner previously described. shown by the phantom lines in FIG. 43. More particularly, as illustrated in FIGS. 47 and 49.

Referring to FIGS. 50 through 59, still another form of seat headrest of the invention is there illustrated. This latest embodiment of the invention is similar in several respects to the previously illustrated embodiments of the invention and like to numerals are used in FIGS. 50 through 59 to identify like components. The primary difference between this latest embodiment of the invention and those previously illustrated, resides in the fact that the head support assembly is both horizontally and pivotally movable relative to the seat connector assembly. This novel feature of the apparatus of the invention permits the user to slide headrest assembly horizontally from one side to the other and then, if desired, pivot the headrest assembly from a first position to a second position and in this way achieve an optimum level of comfort.

As before, this latest embodiment of the invention comprises seat connector means, shown here as a seat connector assembly 319 (FIG. 56) that includes a generally planar first connector member 319a that is connected to the seat "S" by any suitable means. However, in this latest form of the invention, head support assembly 321 is slidably connected to first connector member 319 for horizontal, or side to side, movement between a first side position shown in FIG. 50 and a second, or left side position shown in the dotted lines in FIG. 58. It is to be appreciated that with the construction shown on the drawings, the head support assembly can also slidably be moved to a right side position relative to connector member 319.

Figure 57:
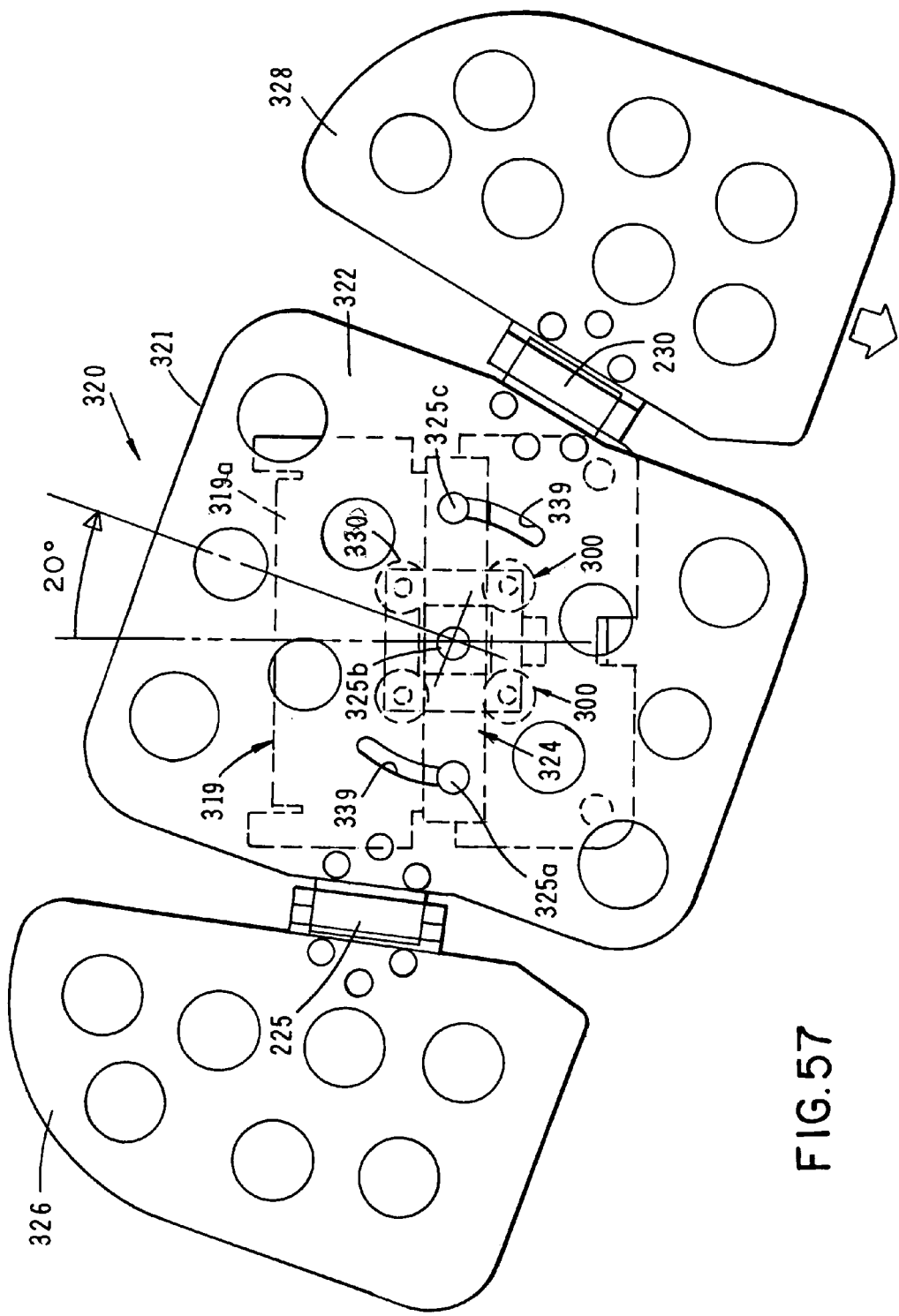
FIG. 57 is a view a similar to FIG. 50, but showing the headrest assembly pivoted from a first position of shown in FIG. 50 to a second position.
Figure 62:
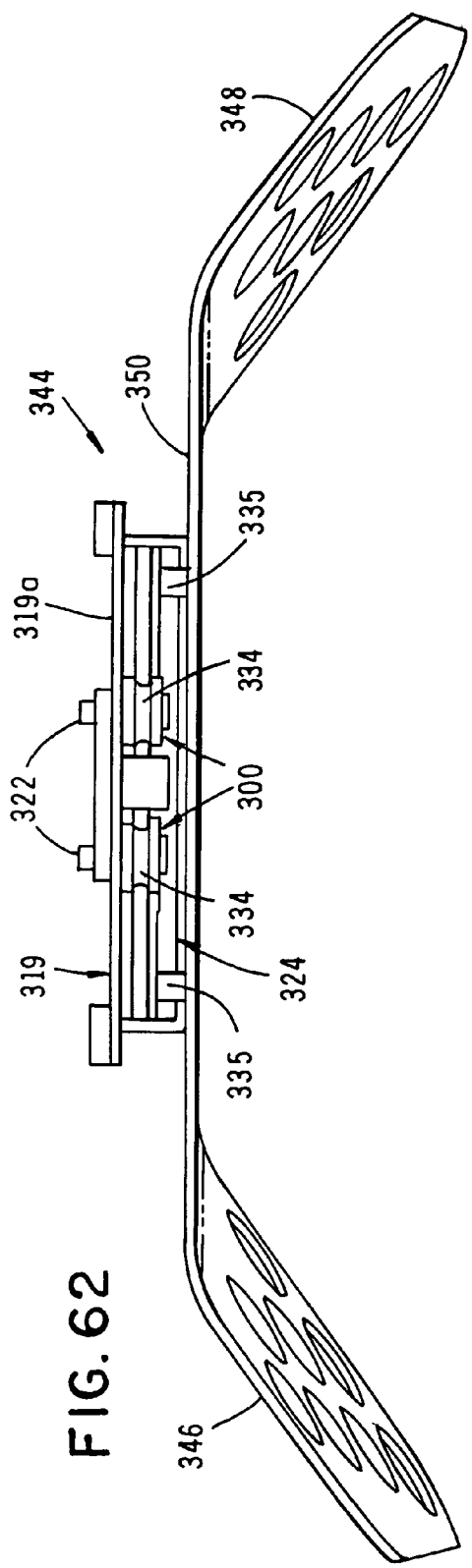
FIG. 62 is a view taken along lines 62-62 of FIG. 60.
Figure 63:
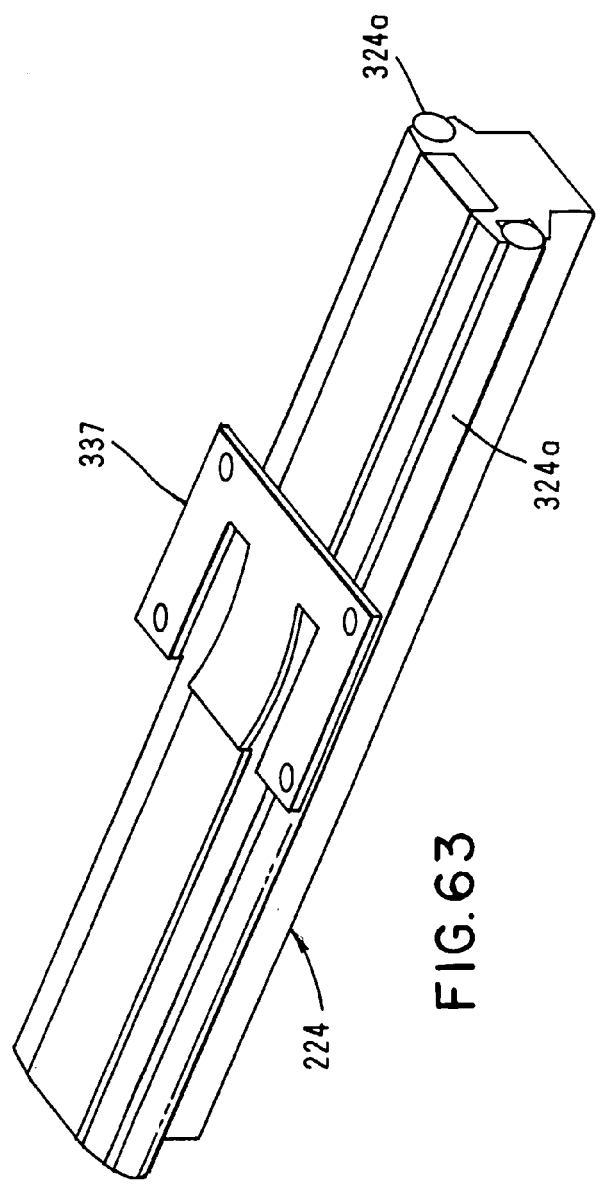
FIG. 63 is a generally perspective view of the guide member and friction imparting means of this latest form of the invention.

As best seen in FIGS. 50 and 57, head support assembly 321 includes a generally planar central support member or panel 322 to which an elongated, generally horizontally disposed guide member 324 is connected by means of connectors 325a, 325b and 325c (FIGS. 50 and 54). A first lateral or side panel 326 is pivotally connected to the central support member by means of a constant torque hinge 225. Also connected to central support panel 322 by a constant torque hinge 230 is a second lateral or side panel 328. As in the previously described embodiments of the invention, side panels 326 and 328 are pivotally movable, a first position wherein they are substantially coplanar with central support panel 322 to a second angularly extending forward position as shown by phantom lines in FIG. 37. When side panels 326 and 328 are pivoted into the angularly outwardly extending position, they provide a comfortable lateral support to the passenger's head in the manner previously described and as also shown in FIG. 2.

The earlier identified elongated guide member 324 includes oppositely disposed guide rails 324a (FIGS. 37 and 40) that are adapted to be rollably engaged by two pairs of spaced apart roller assemblies 330 that are mounted on connector member 319. The roller assemblies 330, each of which is of identical construction, include a connecting shaft 332 (FIG. 52) that is connected to connector member 319 and a grooved roller 334 that is rotatably mounted on shaft 322. With this construction, as depicted in FIGS. 58 and 59, the headrest assembly 320 can be adjustably moved from side to side relative to seat connector member 319 so as to enable the desired adjustment in the horizontal position of the headrest assembly relative to the seat connector member. As the headrest assembly is moved generally horizontally from side to side, guide means, shown here as a pair of ears 335 (FIG. 56), slidably engage guide member 324 to guide the horizontal travel of the headrest assembly.

This latest form of the invention also includes resistance imparting means for imparting resistance to the movement of head rest assembly 320 from side to side relative to connector member 319. This resistance imparting means here comprises a uniquely configured leaf spring designated in FIG. 53 of the drawings by the numeral 337. When the headrest assembly of the invention is fully assembled, central portion of the spring is in pressural engagement with the front surface, or face, 324a of guide 324(FIG. 53). With this construction, as the headrest assembly is moved from side to side, spring 337 will yieldably resist sliding movement of headrest assembly in a manner to permit smooth horizontal sliding of the headrest assembly 290.

As previously mentioned, an important feature of this latest form of the invention resides in the fact that the entire headrest assembly 320 is also pivotally movable relative to guide 324 and relative to seat connector 319 from the first position shown in FIG. 50 to the second position shown by the solid lines in FIG. 57 and shown by the phantom lines in FIG. 58. More particularly, as illustrated in the drawings, the entire headrest assembly can be pivoted about connector member 325b through an angle of approximately 20 degrees. As the headrest assembly is so pivoted, connector members 325a and 325c travel within generally arcuate shaped slots 339 formed in plate 322. With this unique construction, after the headrest assembly has been moved horizontally to the selected side of the seat, the headrest assembly can be selectively pivotally positioned so that the passenger can comfortably rest his or her head on a selected one of the angularly inclined side wings 296 and 298. Because in this latest form of the invention, the headrest assembly is not movable vertically, the center and side panels 322, 326 and 328 are made slightly larger than the panels described in the previously discussed embodiments of the invention. In this way, a greater surface area is provided for the user to rest his or her head on a strategically horizontally and pivotally selected position.

If desired, the previously described massage system 310 of the invention can be incorporated into in this latest embodiment of the invention. As before, the novel massage system can be affixed to and encompass the central and side panels of the headrest assembly. When the massage system is affixed to the headrest it can be operated by the passenger as desired to provide a stimulating and satisfying massage.

Turning now to FIGS. 60 through 64, still another form of seat headrest of the invention is there illustrated and generally designated by the numeral 344. This latest embodiment of the invention is similar in several respects to the embodiment of the invention illustrated in FIGS. 50 through 59 and like to numerals are used in FIGS. 60 through 64 to identify like components. The primary difference between this latest embodiment of the invention and that illustrated in FIGS. 50 through 59, resides in the fact that the lateral or side panels 346 and 348 are fixedly connected to the central support member 350 and are not adjustable. As best seen by referring to FIG. 62, in this latest form of the invention the side panels 346 and 348 are integrally formed with central panel 350 and extend the angularly outwardly there from.

The seat connector assembly 319 of this latest embodiment is identical in construction and operation to that previously described and includes a generally planar first connector member 319a that is connected to the seat "S" by any suitable means. As before, a head support assembly is slidably connected to connector member 324 for horizontal movement between a first, or left side position and a second, or right side position (see FIG. 64).

Figure 64:
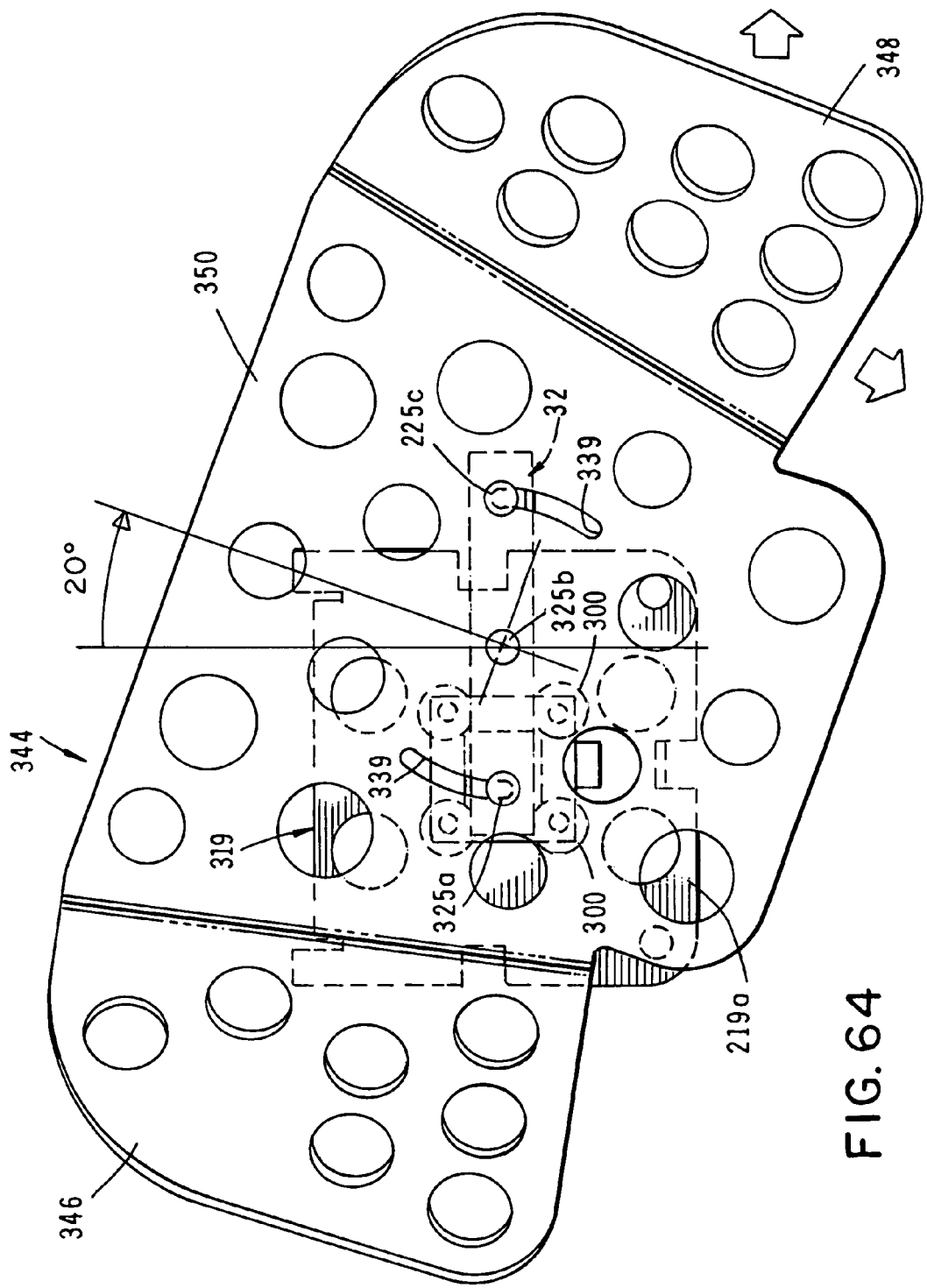
FIG. 64 is a view a similar to FIG. 60, but showing the horizontal movement of the headrest assembly from a first position of shown in FIG. 60 to a second position and also showing the pivotal movement of the headrest assembly from a first position to a second position.

As in the last to be described embodiment of the invention the entire headrest assembly is pivotally movable relative to guide 324 and relative to seat connector 288 from the first position shown in FIG. 60 to the second position shown in FIG. 64. As before, the entire headrest assembly is also pivotally movable into third position in the manner previously described. More particularly, as illustrated in FIG. 64 the entire headrest assembly can be pivoted about connector member 295b through an angle of approximately 20 degrees. If desired, this latest form of the headrest assembly can also incorporate a massage system of the character previously described.

Referring to FIGS. 65 through 73, yet another form of seat headrest of the invention is there illustrated and generally designated by the numeral 354. This latest embodiment of the invention is similar in several respects to the embodiment of the invention illustrated in FIGS. 17 through 26 and like numerals are used in FIGS. 65 through 73 to identify like components. The primary difference between this latest embodiment of the invention and that illustrated in FIGS. 17 through 26, resides in the differently configured side panels and hinge components. As best seen by referring to FIGS. 65 and 66, in this latest form of the invention the side panels 356 and 358 are each made up of separate upper and lower portions.

Figure 65:
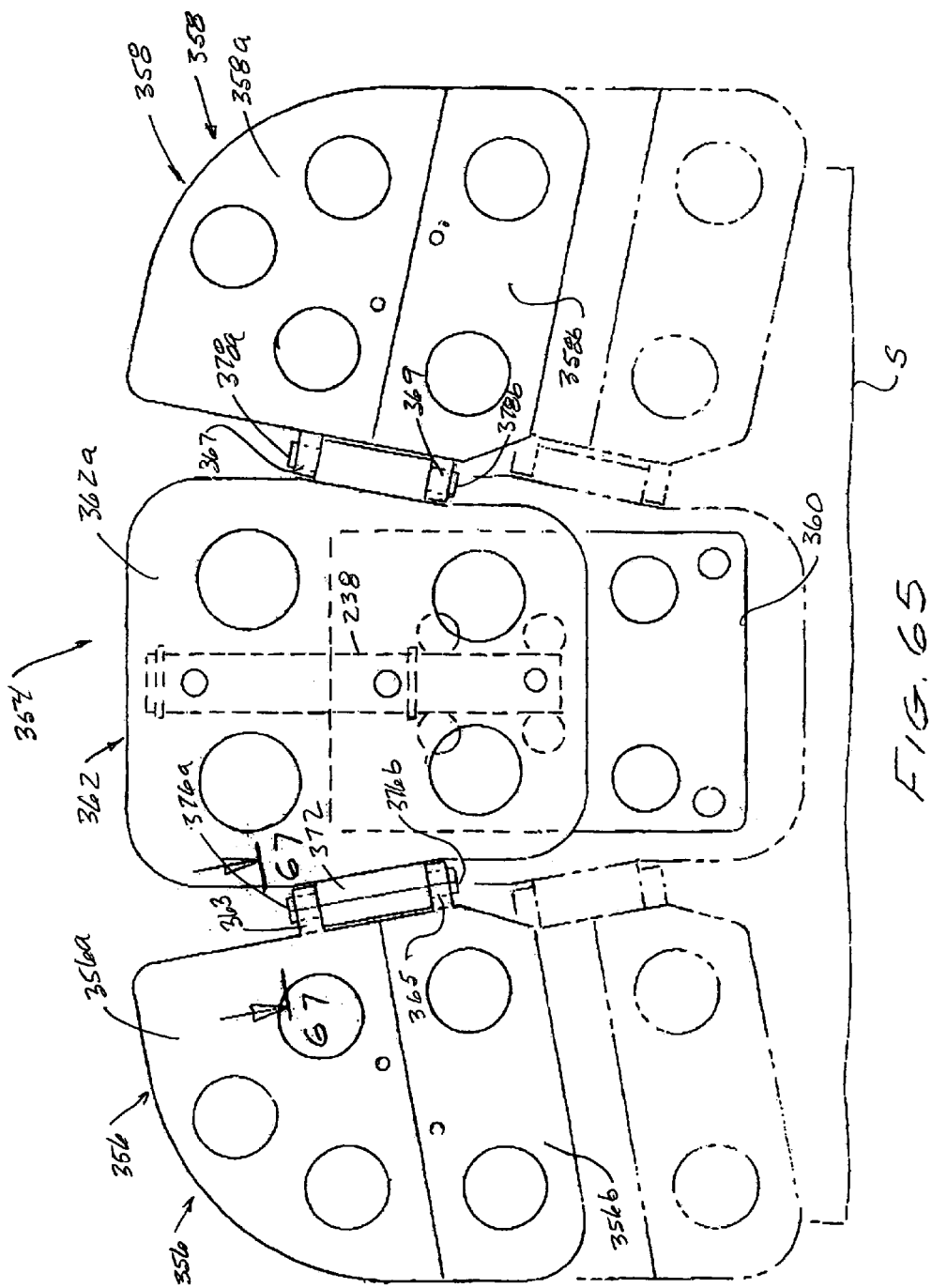
FIG. 65 is a front view of an alternate form of the seat headrest of the present invention.

As shown in FIG. 65, the seat headrest of this latest embodiment of the invention comprises a connector member 360, which is connected to the seat "S" and a headrest assembly 362 which is connected to the connector member. The headrest assembly 362 here comprises a central support panel 362a to which the side panels 356 and 358 are connected by hinge means, the character of which will presently be described. Side panel panel 356 comprises an upper portion 356a having a first connector segment 363 and a lower portion 356b having a second connector segment 365. Similarly, side panel 358 comprises an upper portion 358a having a third connector segment 367 and a lower portion 358b having a fourth connector segment 369.

Figure 66:
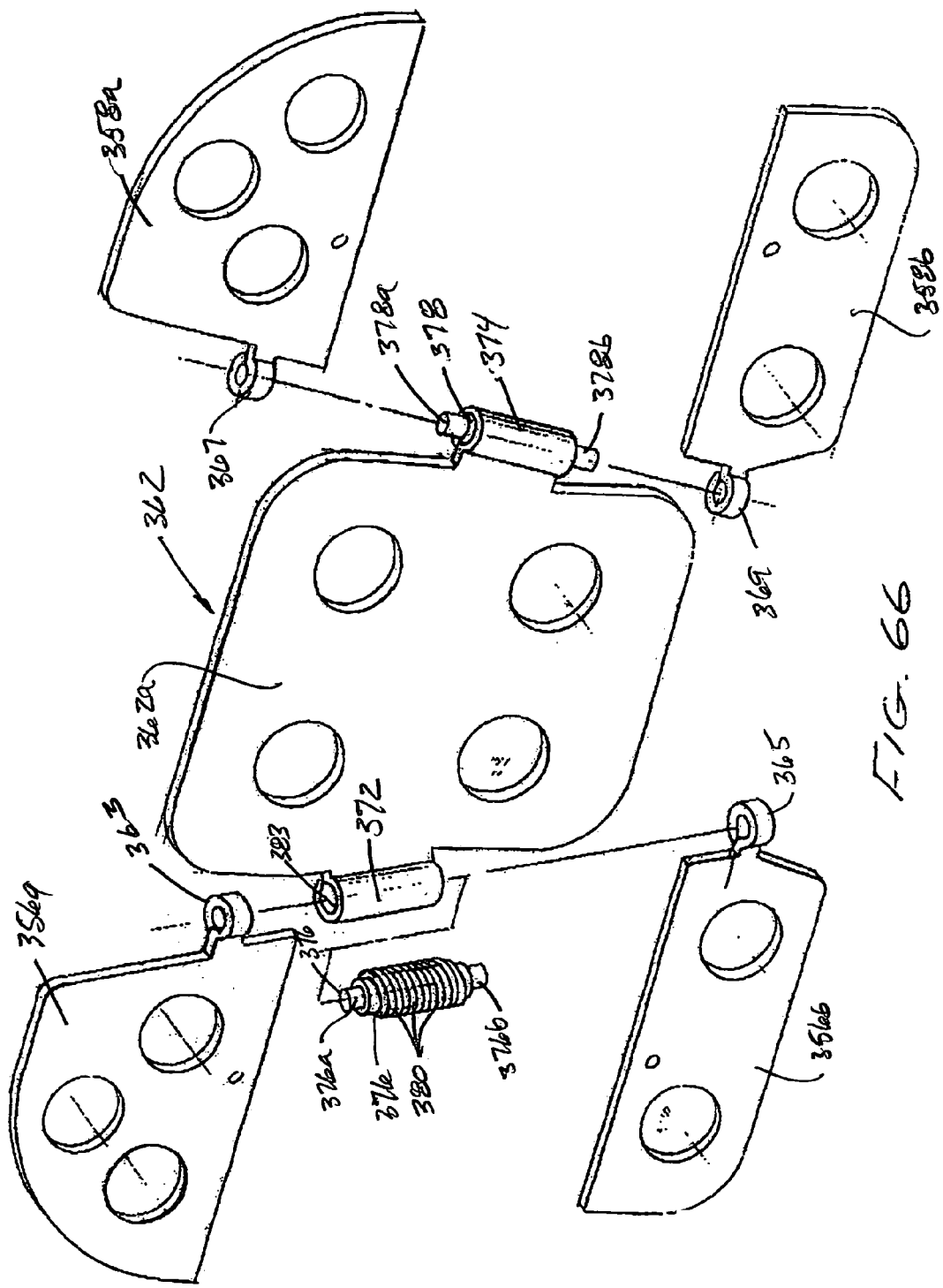
FIG. 66 is a generally perspective, exploded view of the headrest assembly of the seat headrest shown in FIG. 65.
Figure 78:
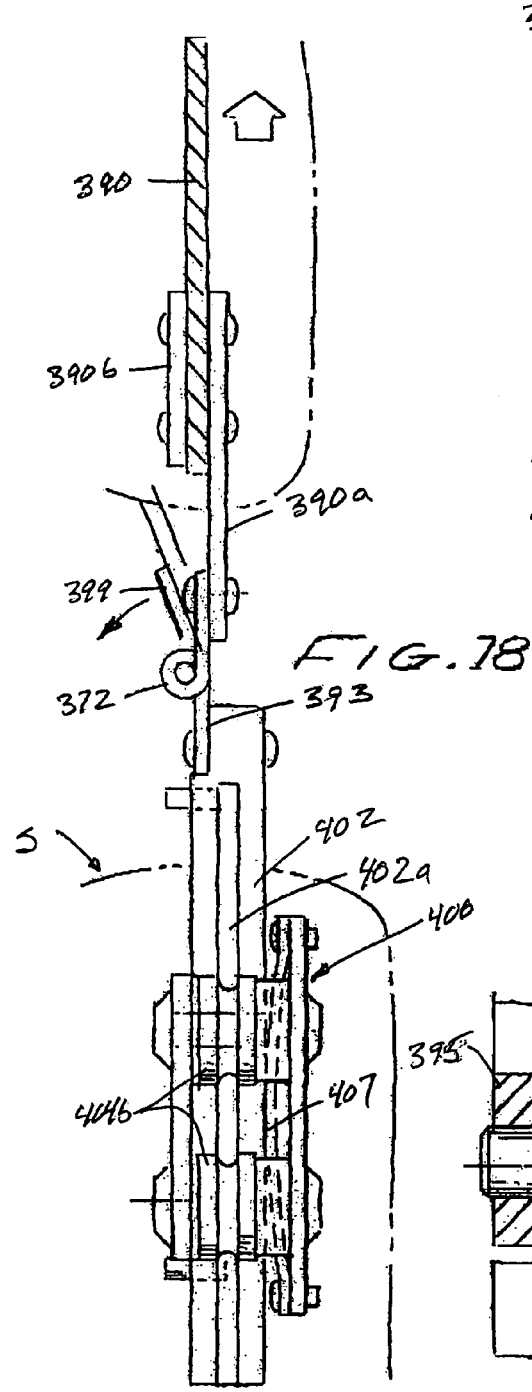
FIG. 78 is an enlarged, cross-sectional view taken along lines 78-78 of FIG. 75.
Figure 79:
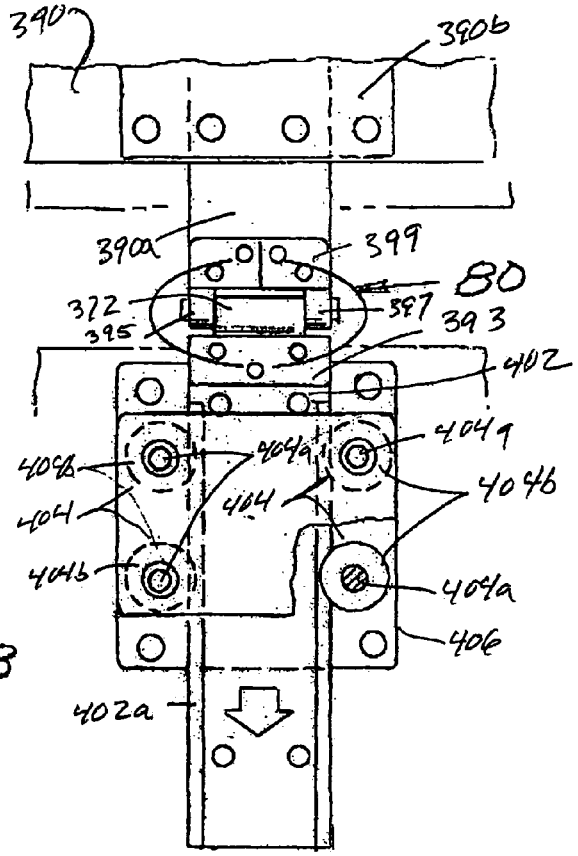
FIG. 79 is a fragmentary front view, partly broken away to show internal construction of the seat connector portion of the seat headrest of this latest form of the invention.

As best seen by referring also to FIG. 66, the hinge means of this latest form of the invention comprises a first barrel portion 372 connected to one side of central support panel 362 and a second barrel portion 374 connected to the opposite side of the central support panel. The hinge means further comprises a first shaft portion 376 rotatably carried by barrel portion 372 and a second shaft portion 378 rotatably carried by barrel portion 374. Shaft portion 376 has first and second ends 376a and 376b respectively while shaft portion 378 has first and second ends 378a and 378b respectively (FIG. 66). As indicated in FIGS. 65 and 68 first end 376a of shaft 376 is affixed to said first connector segment 363 and second end 376b is affixed to second connector segment 365. Similarly, first end 378a of shaft 378 is affixed to third connector segment 367 and second end of shaft 378 is affixed to fourth connector segment 369. Each of the first and second shaft portions 376 and 378 carries about its cylindrical body portion a plurality of generally U-shaped, friction imparting clips 380 which are of the configuration shown in FIG. 73 of the drawings (see also FIG. 68 and the left hand portion of FIG. 66). As illustrated in FIGS. 69 and 72, the friction imparting clips are strategically sized so that the outwardly extending legs 380a thereof will engage the inner surfaces 383 of the barrel portions of the hinges so as to cause the inner semicircular wall portion 380b of the clip to tightly grip the outer, cylindrical wall of the shaft portions 376 in a manner to yieldably resist rotation of the shaft portions within their respective barrel portions. With this construction, when the side panels are interconnected with the central panel in the manner shown in FIG. 65, the hinge means will frictionally resist rotation of the side panels relative to the central panel 362 (see FIGS. 68, 69, 70 and 72). The shaft portions, as well as the clip portions that comprise a part of the hinge means of the present invention are commercially available from sources such as the Reel Manufacturing Company of Saint Paul, Minn. Additional information concerning the construction and operation of these hinge components is available from the Reel Manufacturing Company.

As in the earlier described embodiments of the invention, with the construction described in the preceding paragraphs the side panels 356 and 358 are pivotally movable from a substantially coplanar position with central support panel 362 as shown in FIG. 67 to an angularly outwardly extending position (see FIGS. 71 and 72. When the side panels are pivoted into the angularly outwardly extending position, they provide a comfortable lateral support to the passenger's head.

Figure 26:
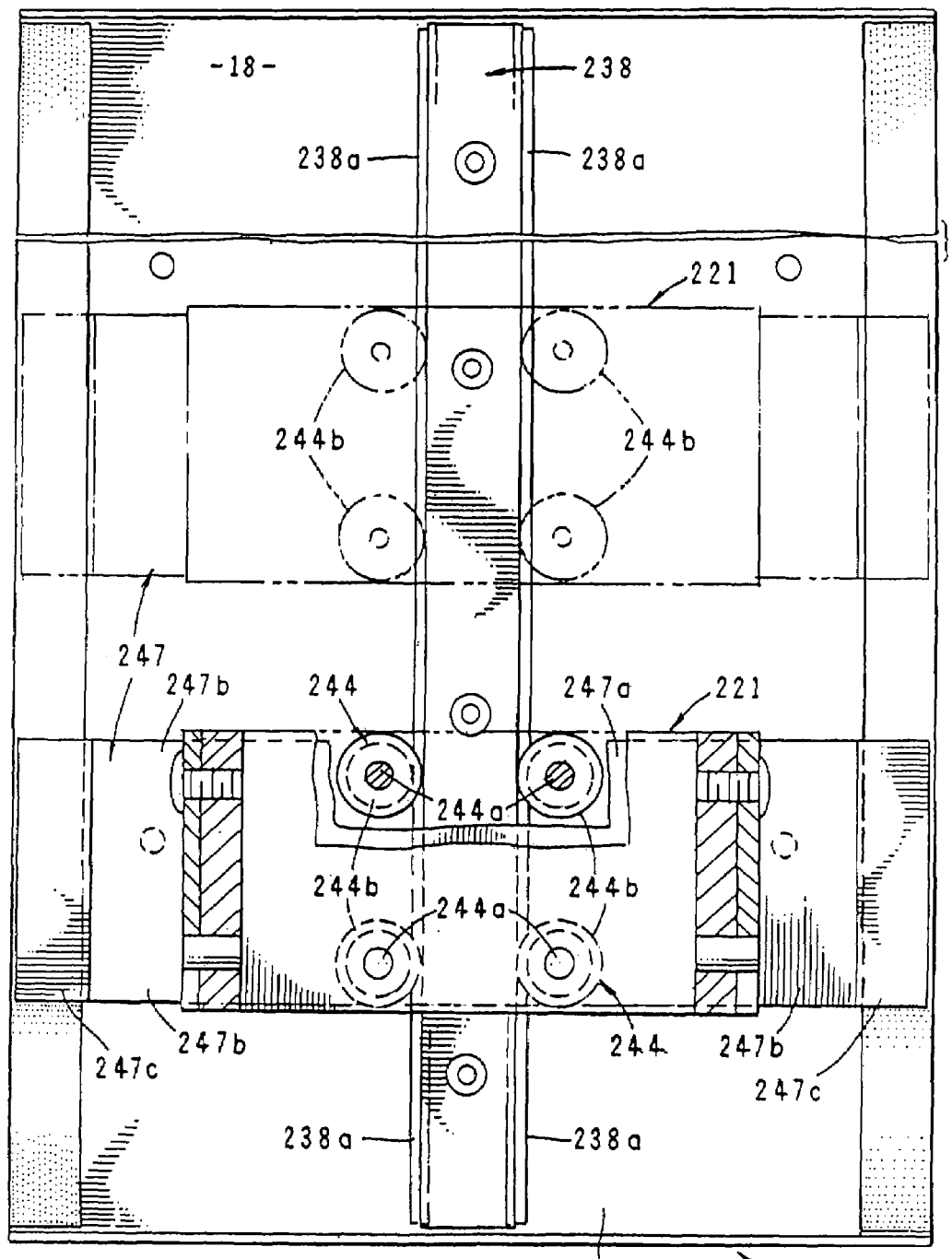
FIG. 26 is a cross-sectional view taken along lines 26-26 of FIG. 23.

Connected to seat connector member 362a is an elongated guide 238 that includes oppositely disposed guide rails that are adapted to be rollably engaged by two pairs of spaced apart roller assemblies 244 that are mounted on a carriage assembly 221 (see FIG. 26). The guide rails, the roller assemblies in the carriage assembly are of identical construction and operation to those described in connection with the embodiment of the invention shown in FIGS. 17 through 26 and the details of their construction will not be here repeated. Suffice to say that with this construction, the carriage assembly 221 along with headrest assembly can be adjustably moved upwardly and downwardly relative to seat connector member 360 so as to enable the desired adjustment in the height of the headrest assembly relative to the seat connector member. The headrest assembly of this latest form of the invention also includes resistance imparting means for imparting resistance to the upward and downward movement of the headrest assembly. This resisting imparting means is also identical in construction and operation to that previously described in connection with the embodiment of the invention shown in FIGS. 17 through 26 and comprises a spring element 277 connected to the connector member proximate the rollers (see FIGS. 31 and 32).

Turning next to FIGS. 74 through 80, still another form of seat headrest of the invention is there illustrated and generally designated by the numeral 384. This latest embodiment of the invention is also similar in some respects to the embodiment of the invention illustrated in FIGS. 17 through 73 and like numerals are used in FIGS. 74 through 80 to identify like components. The primary difference between this latest embodiment of the invention and that illustrated in FIGS. 17 through 73 resides in the fact that this latest seat headrest of the invention is specifically designed for use in connection with passenger vehicles such as automobiles and trucks.

As shown in FIGS. 74 and 75, the seat headrest of this latest embodiment of the invention comprises a seat connector assembly 386, which is connected to the vehicle seat "VS" and a headrest connector assembly 388 which is vertically spaced from the seat connector assembly and is pivotally connected thereto by a connector plate 390a the upper end of which is connected to panel 390 by a connector bracket 390b (FIG. 75). The headrest assembly 388 here comprises a central support panel 390 and a pair of generally planar side panels 392 which are connected to the central panel by hinge means, or constant torque hinges 52 of the character shown in FIGS. 4, 5 and 6 of the drawings. As in the earlier described embodiments of the invention, with the construction shown in FIG. 75, the side panels 392 are pivotally movable from a substantially coplanar position with central support panel 362 as shown in FIG. 75 to an angularly outwardly extending position. When the side panels are pivoted into the angularly outwardly extending position, they provide a comfortable lateral support to the passenger's head.

Figure 80:
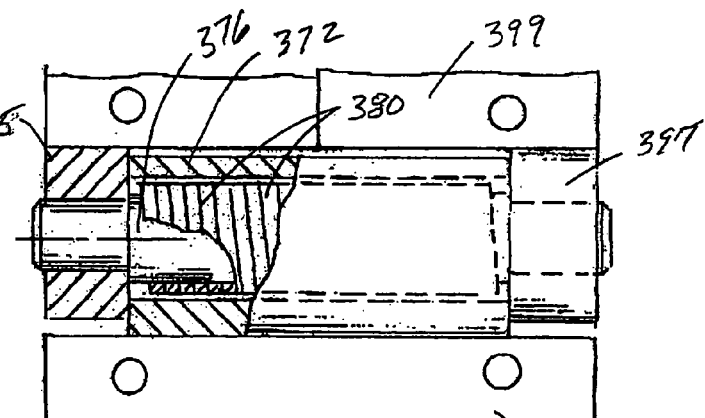
FIG. 80 is a greatly enlarged view, partly broken away to shown internal construction, of the area designated by the numeral 80 in FIG. 79.

As previously mentioned, the headrest connector assembly 388 is pivotally connected the seat connector assembly 386 by hinge means so that the headrest connector assembly can be readily adjusted forwardly and rearwardly in the manner shown in FIG. 74. As illustrated in FIG. 80 this hinge means is similar in construction and operation to the hinge means, or hinge assembly shown in FIG. 66 and comprises a barrel portion 372 connected to one leaf 393 of the hinge assembly, a shaft 376 rotatably carried by the barrel portion 376 and a plurality of generally U-shaped, friction imparting clips 380 which circumscribe the barrel portion and are of the configuration shown in FIG. 73 of the drawings. As shown in FIG. 80, the ends of the shaft are received within first and second connector segments 395 and 397 which are connected to leaf 399 of the hinge assembly. Leaf 393 is affixed to an elongated guide 402, which forms a part of seat connector assembly 386, while leaf 399 is affixed to connector plate 390a of headrest connector assembly 388

Elongated guide 402 includes oppositely disposed guide rails 402a (FIG. 79) that are adapted to be rollably engaged by two pairs of spaced apart roller assemblies 404 that are mounted on a carriage assembly 406. The guide rails, the roller assemblies in the carriage assembly are of similar construction and operation to those described in connection with the embodiment of the invention shown in FIGS. 17 through 26 The roller assemblies 404, each of which are of identical construction, include a threaded connecting shaft 404a that is threadably connected to carriage assembly 406 and a grooved roller 404b that is rotatably mounted on shaft 404a. With this construction, carriage assembly 406 along with headrest assembly 388 can be adjustably moved upwardly and downwardly so as to enable the desired adjustment in the height of the headrest assembly relative to the vehicle seat back.

Also forming and important aspect of the headrest assembly of this latest form of the invention is resistance imparting means for imparting resistance to the movement of headrest assembly upwardly and downwardly relative to the vehicle seat back. As before, this novel resistance imparting means comprises a uniquely configured leaf spring designated in the drawings by the numeral 407. As best seen in FIG. 76, spring 407 includes a central portion 407a that engages the back surface of guide 402 in the manner shown in the drawings. As discussed in connection with the earlier described embodiments, as the headrest assembly is moved upwardly and downwardly, spring 407 will yieldably resist sliding movement of carriage assembly relative to guide 402.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. A headrest for interconnection with a vehicle seat comprising:
    (a) a connector assembly connected to the seat, said connector assembly comprising:
        (i) an elongated guide;
        (ii) a carriage assembly connected to said elongated guide for movement with respect thereto; and
        (iii) resistance imparting means connected to said carriage assembly for engagement with said elongated guide for yieldably resisting movement of said carriage assembly relative to said elongated guide; and
    (b) a headrest assembly connected to said connector assembly by first hinge means for pivotal movement relative thereto between a first position and a second position and for substantially vertical movement relative thereto between a first position and a second position, said headrest assembly comprising central support panel and a pair of side panels connected to said central panel by second hinge means.

2. The seat headrest as defined in claim 1 in which said carriage assembly further comprises a plurality of rollers for rollable engagement with said elongated guide.

3. The seat headrest as defined in claim 1 in which said resistance imparting means comprises a spring carried by said carriage assembly and disposed in compressive engagement with said elongated guide.

4. The seat headrest as defined in claim 1 in which said first hinge means comprises a constant torque hinge.

5. The seat headrest as defined in claim 1 in which said second hinge means comprises a barrel portion, a shaft portion rotatably carried by said barrel portion and a plurality of generally U-shaped, friction imparting clips carried by said shaft portion for engagement with said barrel portion.

6. The seat headrest as defined in claim 5 in which said second hinge means further comprises a leaf connected to said barrel portion and to said elongated guide.

7. A seat headrest for interconnection with a seat comprising:
   (a) a connector member connected to the seat;
   (b) a headrest assembly connected to said connector member for movement between a first position and a second position, said headrest assembly comprising:
      (i) a central support panel;
      (ii) a pair of side panels connected to said central panel by hinge means, each of said pair of side panel panels comprising an upper portion having a first connector segment and a lower portion having a second connector segment, said hinge means comprising:
         a. a barrel portion connected to said central support panel;
         b. a shaft portion rotatably carried by said barrel portion, said shaft portion having first and second ends, said first end being connected to said first connector segment and said second end being connected to said second connector segment; and
         c. a plurality of generally U-shaped, friction imparting clips carried by said shaft portion for engagement with said barrel portion; and
      (iii) an elongated guide connected to said central support member;
   (c) a plurality of rollers connected to said connector member for rollable engagement with said elongated guide; and
   (d) resistance imparting means connected to said connector member for yieldably resisting movement of said headrest between said first position and said second position, said resistance imparting means comprising a spring disposed in compressive engagement with said elongated guide.

8. The seat headrest as defined in claim 7, in which said is connected to said connector member proximate said rollers.

9. The seat headrest as defined in claim 8 in which said plurality of rollers comprise two spaced apart pairs of rollers connected to said connector member.

10. A seat headrest for interconnection with a seat comprising:
   (a) a connector member connected to the seat;
   (b) a headrest assembly connected to said connector member for movement relative thereto between a first position and a second position, said headrest assembly comprising:
      (i) a central support panel;
      (ii) a pair of side panels connected to said central panel by hinge means, each of said pair of side panel panels comprising an upper portion having a first connector segment and a lower portion having a second connector segment, said hinge means comprising:
         a. a barrel portion connected to said central support panel;
         b. a shaft portion rotatably carried by said barrel portion, said shaft portion having first and second ends, said first end being connected to said first connector segment and said second end being connected to said second connector segment; and
         c. a plurality of generally U-shaped, friction imparting clips carried by said shaft portion for engagement with said barrel portion; and
      (iii) resistance means connected to said connector member for frictionally resisting vertical movement of said headrest assembly.
   (c) an elongated guide connected to said control support panel; and
   (d) a plurality of rollers connected to said connector member for rollable engagement with said elongated guide.

11. The seat headrest as defined in claim 10 in which said resistance means comprises a spring connected to said connector member and disposed in compressive engagement with said elongated guide.

* * * * *